US009533623B2

(12) United States Patent
Descoteaux

(10) Patent No.: US 9,533,623 B2
(45) Date of Patent: Jan. 3, 2017

(54) MODIFIABLE RACK SYSTEM

(71) Applicant: Timothy J Descoteaux, Harwinton, CT (US)

(72) Inventor: Timothy J Descoteaux, Harwinton, CT (US)

( * ) Notice: Subject to any disclaimer, the term of this patent is extended or adjusted under 35 U.S.C. 154(b) by 151 days.

(21) Appl. No.: 14/514,741

(22) Filed: Oct. 15, 2014

(65) Prior Publication Data

US 2015/0110594 A1 Apr. 23, 2015

Related U.S. Application Data

(60) Provisional application No. 61/892,030, filed on Oct. 17, 2013.

(51) Int. Cl.
| | |
|---|---|
| *B60R 9/06* | (2006.01) |
| *B62B 3/02* | (2006.01) |
| *B60P 3/14* | (2006.01) |
| *B62B 5/00* | (2006.01) |

(52) U.S. Cl.
CPC . *B60R 9/06* (2013.01); *B60P 3/14* (2013.01); *B62B 3/02* (2013.01); *B62B 5/0003* (2013.01); *B62B 2205/104* (2013.01); *B62B 2206/006* (2013.01); *B62B 2501/02* (2013.01)

(58) Field of Classification Search
CPC .... B60R 9/06; B62B 5/0003; B62B 2206/006; B62B 2205/104; B62B 2205/10
USPC ............... 280/30; 224/484, 485, 488, 511
See application file for complete search history.

(56) References Cited

U.S. PATENT DOCUMENTS

| | | | | |
|---|---|---|---|---|
| 3,734,525 | A * | 5/1973 | Rimbey ............... | B60P 3/34 280/30 |
| 4,593,840 | A * | 6/1986 | Chown ............... | B60R 9/06 224/484 |
| 4,596,347 | A * | 6/1986 | Hite ............... | B62D 49/0671 224/280 |
| 4,744,590 | A * | 5/1988 | Chesney ............... | B60R 9/06 224/520 |
| 5,018,651 | A * | 5/1991 | Hull ............... | B60R 9/06 224/280 |
| 5,368,209 | A * | 11/1994 | Hill ............... | B60R 9/065 224/402 |
| 6,039,227 | A * | 3/2000 | Stark ............... | B60R 9/06 206/315.3 |
| 8,505,932 | B1 * | 8/2013 | Piccirillo ............... | B62B 5/0003 280/30 |
| 2004/0100045 | A1 * | 5/2004 | Amacker ............... | B60R 9/06 280/30 |
| 2005/0242141 | A1 * | 11/2005 | Zhang ............... | B60R 9/065 224/499 |

(Continued)

*Primary Examiner* — Michael Safavi
(74) *Attorney, Agent, or Firm* — Carla Gannon Law

(57) ABSTRACT

A modifiable rack system can be connected to a vehicle such as a truck or a tractor, and includes a receptacle for holding a variety of items including materials and equipment. The rack system includes a variety of add-ons for organizing and retaining equipment, and a hinged tail gate for easy access. The rack system includes a trailer hitch so a rolling trailer, or the like, can be daisy-chained off the back end. Wheels can be mounted to the rack system so the rack system can used as a rolling cart. The rack system is able to withstand large forces during use because of a tow support spine, and associated structures, which impart tremendous strength.

17 Claims, 92 Drawing Sheets

(56) References Cited

U.S. PATENT DOCUMENTS

| | | | |
|---|---|---|---|
| 2006/0097482 A1* | 5/2006 | Cumbie | B60D 1/00 280/491.3 |
| 2006/0118586 A1* | 6/2006 | Heravi | B60R 9/0426 224/519 |
| 2006/0151556 A1* | 7/2006 | Eby | B60R 9/06 224/519 |
| 2008/0150253 A1* | 6/2008 | Crawford | B60D 1/00 280/477 |
| 2009/0140024 A1* | 6/2009 | McLemore | B60R 9/06 224/519 |
| 2009/0146394 A1* | 6/2009 | Seivert | B60R 9/06 280/504 |
| 2010/0066069 A1* | 3/2010 | Bradshaw | B60R 9/06 280/769 |
| 2010/0224663 A1* | 9/2010 | Butler, III | B60R 9/06 224/498 |
| 2011/0057417 A1* | 3/2011 | Crawford | B60D 1/00 280/478.1 |
| 2012/0001403 A1* | 1/2012 | Wydner | B60D 1/155 280/415.1 |
| 2012/0133112 A1* | 5/2012 | Myrant | B62B 1/208 280/655 |
| 2015/0203018 A1* | 7/2015 | Dechant | B60P 1/16 280/30 |

* cited by examiner

19

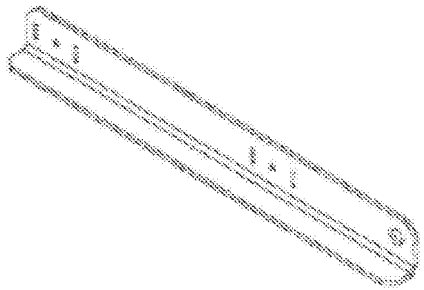
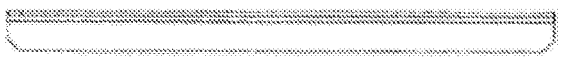
FIG. 85
FIG. 86
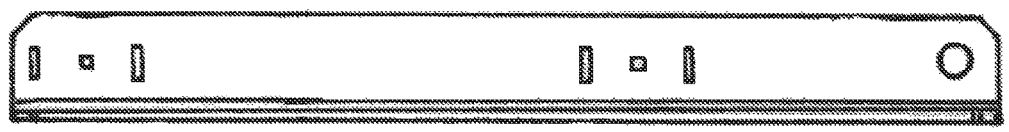
FIG. 87
FIG. 88

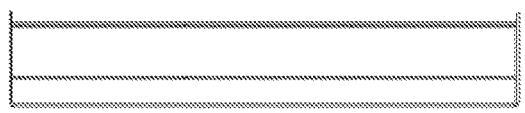
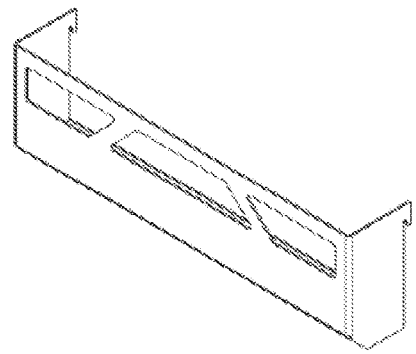
FIG. 89         FIG. 90
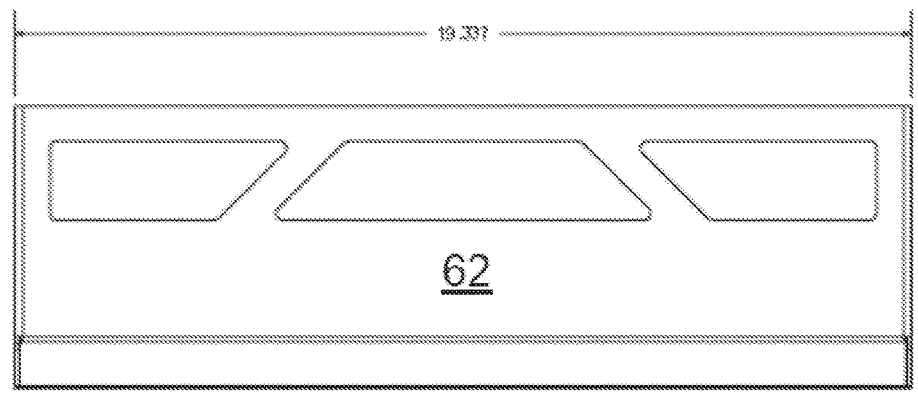
FIG. 91
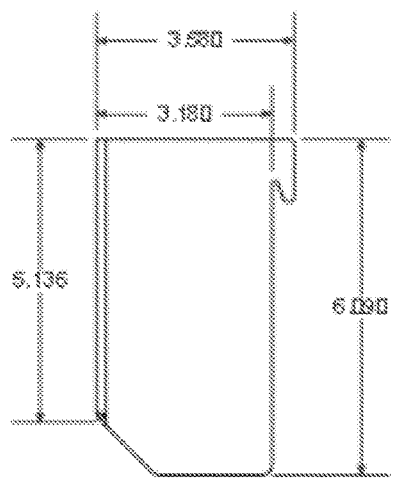
FIG. 92

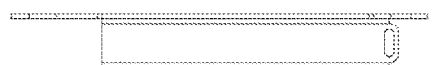
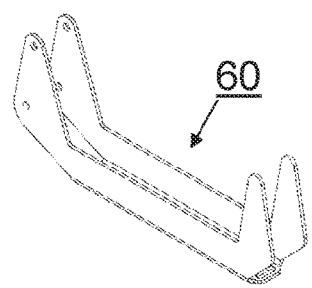
FIG. 112     FIG. 113
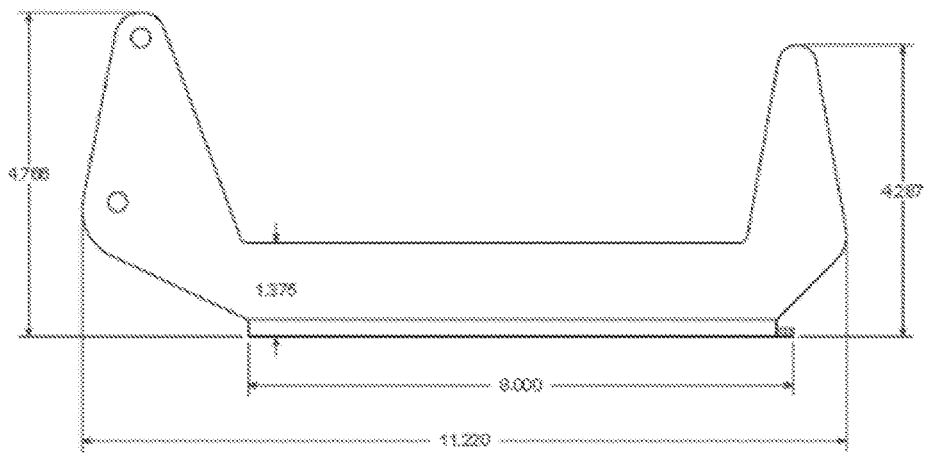
FIG. 114
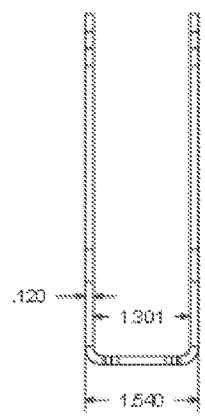
FIG. 115

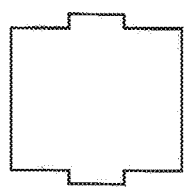
FIG. 179　　　　　　　　　　FIG. 180
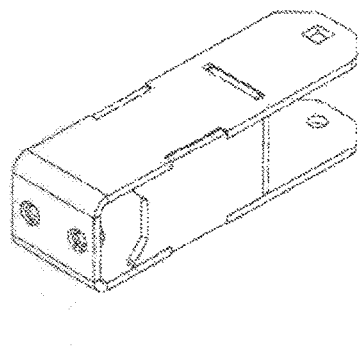
FIG. 182
FIG. 181
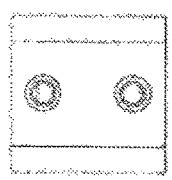
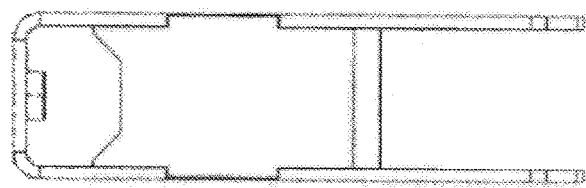
FIG. 183　　　　　　　　　　FIG. 184

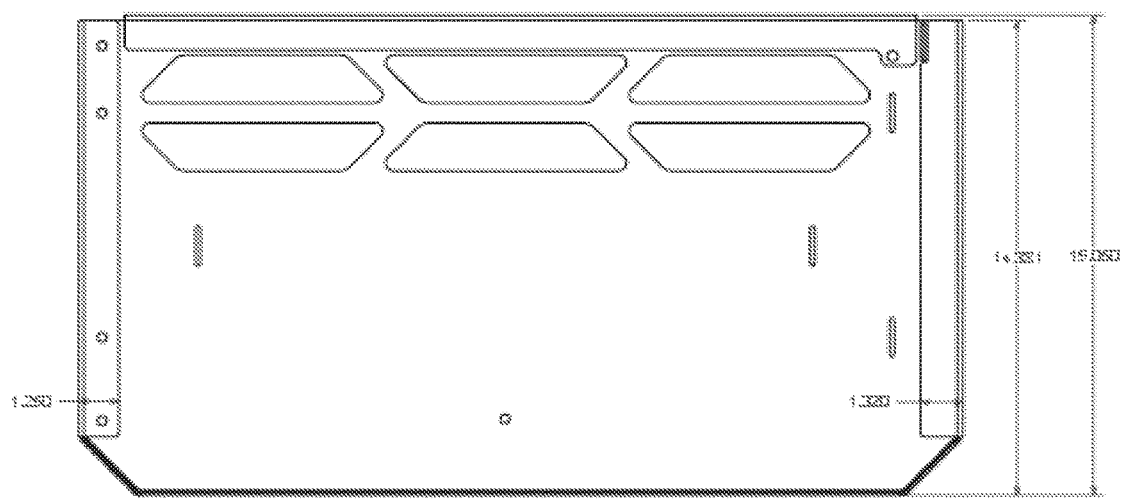
FIG. 245
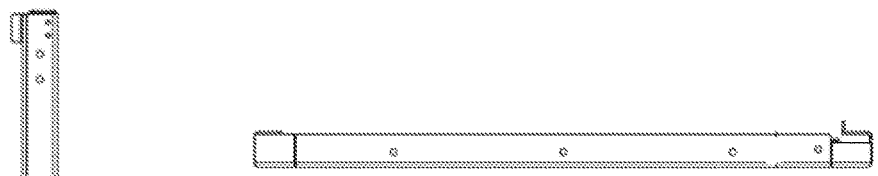
FIG. 247
FIG. 246
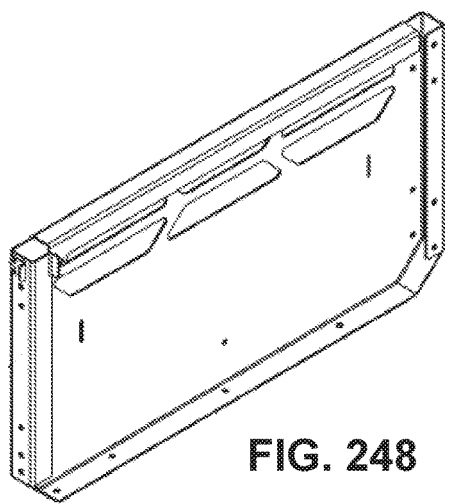
FIG. 248

 
FIG. 274    FIG. 275
FIG. 276
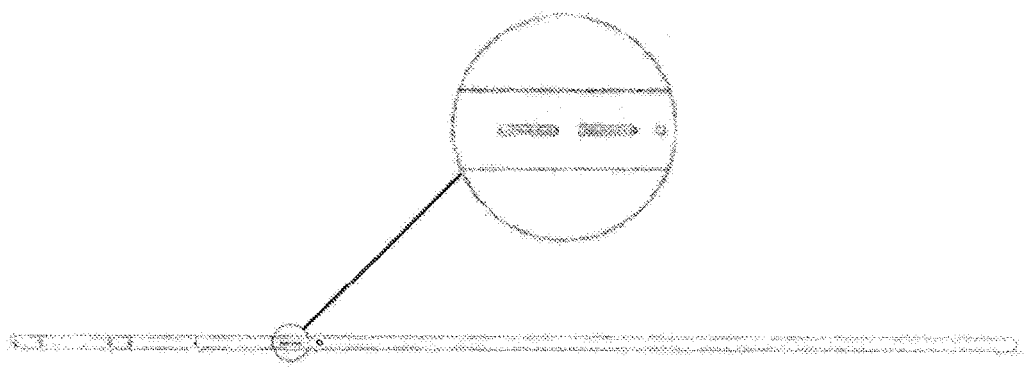
FIG. 277

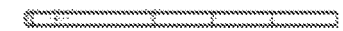
FIG. 278
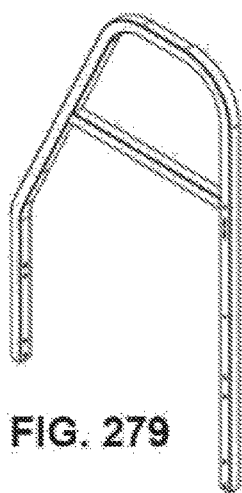
FIG. 279
FIG. 280
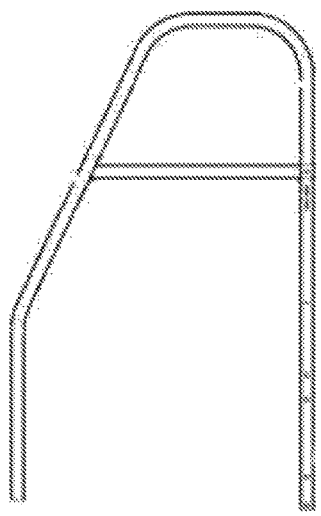
FIG. 281　　　FIG. 282　　　FIG. 283

MODIFIABLE RACK SYSTEM

CROSS-REFERENCE TO RELATED APPLICATIONS

This application claims priority from the U.S. provisional patent application entitled MODIFIABLE RACK SYSTEM, which was filed on Oct. 17, 2013, and assigned the Ser. No. 61/892,030.

BACKGROUND OF THE INVENTION

Field

The present invention relates to devices for the transportation and storage of various implements, and more specifically, to a multi-functional rack that is configured for connection to a vehicle, for free standing, and/or for rolling.

Related Art

There are a variety of devices for storing and/or transporting implements such as tools, lawn equipment, farm apparatus and so forth. These devices include simple trailers that connect to road vehicles (for example the CARRY-ON TRAILER 5-ft×8-ft Wire Mesh Utility Trailer with Ramp Gate); trailers that connect to tractors (for example the AGRI-FAB Light Duty Dump Cart); vehicle mounted tool racks (for example TRADESMAN 48" Steel Mid-Size Flush Mount Truck Box); and rolling toolboxes (for example CH ELLIS Rolling Tool Case Tele Handle with Bumpers and Wheels). However, all of these devices have limitations.

Trailers used with road vehicles are typically large and cumbersome, and therefore are limited in where they can be used. The fully enclosed styles are secure, but it is difficult to access the contents inside. Alternatively, the open styles, which typically include a platform floor and partial vertical walls, provide accessibility, but must be secured when not in use because the contents are vulnerable to theft and the environment. Also, because road vehicle trailers connect to the vehicle's tow ball, the vehicle is limited to towing just the trailer. Trailers that connect to tractors typically have the same limitations as road vehicle trailers. Vehicle mounted tool racks are typically lockable, and therefore secure. In addition, because they are mounted in the back of a truck, they don't occupy the trailer ball and the vehicle may tow. However, vehicle mounted tool racks are limited in space, and simply too small to hold certain equipment including most landscaping items with long handles. Moreover, it isn't practical to remove the vehicle mounted box and bring it to a location, for example inside a dwelling, in order to have all the tools readily available. Also, because the items are typically piled up in these boxes, accessibility is limited. Finally, while rolling toolboxes are useful insofar as they can easily be moved from one place to another, for example from one section of the garage to another, they are not easily transported by vehicle. Also, they are limited in storage space and can't reasonably store larger items such as landscaping tools.

As can be seen, there is a need for a system of storing and transporting tools, and in particular a modifiable rack system that is configured for connection to a vehicle, for free standing, and/or for rolling. It is desirable that this rack system provides free access to the implements that it is holding, is relatively compact, yet can secure both large and small items. It is desirable that this rack system can be towed, but allows for towing additional items. It is desirable that this rack system can be moved from one place to another by towing, or by rolling, and that it lends itself to a use as a semi-stationary system when not being transported. It is also desirable that the system is durable, and can withstand substantial dynamic load weight forces, up to 600 lbs., during use and transport. It is also desirable that the system is compatible for connection to 3 point hitch assemblies, or conventional vehicle trailer hitches.

SUMMARY OF THE INVENTION

A modifiable rack system can be connected to a vehicle such as a truck or a tractor such that the modifiable rack system protrudes from the back of the vehicle, but does not touch the ground. The rack system includes a trailer hitch on the back end so that a trailer can be "daisy chained" onto the end of the modifiable rack. In this manner there would be the vehicle connected to the modifiable rack connected to the trailer, with the modifiable rack in the center and not touching the ground.

The rack includes a receptacle for holding a variety of items including materials and equipment, a variety of add-ons for organizing and retaining equipment, and a hinged tail gate for easy access. Attachable rail tubes provide additional stability to the rack as well as additional attachment sites for add-ons.

Wheels can be mounted to the rack system so the rack system can used as a rolling cart. More specifically, it is possible to mount the wheels on the rack system while the rack system is engaged to a vehicle, and off the ground. In this manner the wheeled rack can be lowered to the ground and rolled to the desired location for use or storage.

The rack system is subjected to enormous forces while in use because it holds heavy equipment, bounces behind a moving vehicle, and is not supported underneath by wheels or such. However, the rack system is able to withstand these forces largely due to a tow support spine along the bottom side of the floor of the receptacle. The tow support spine is reinforced by a plurality of tow spine supports that extend perpendicularly from the spine, and a plurality of lift arm connectors that are positioned in parallel and equidistant from the spine on either side.

BRIEF DESCRIPTION OF THE DRAWINGS

FIG. 49 depicts a rack assembly including a chain saw holder add-on;

FIGS. 85-88 depict various views of the left-side lift arm connector;

FIGS. 89-92 depict various views of the side bin tool bracket;

FIGS. 112-115 depict various views of the lumber rack tool bracket;

FIGS. 171-180 depict various views of the tool bracket clamp assembly;

FIGS. 181-191 depict various views of the long tool bracket;

FIGS. 241-247 depict various views of the rack bed right side;

FIGS. 248-254 depict various views of the rack bed left side;

FIGS. 267-278 depict various views of the A Rib right side; and

FIGS. 279-290 depict various views of the A Rib left side.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

As used herein, the following terms shall refer to the stated structures among the various FIGS:

10—Rack assembly;
11—Upper portion;
12—Bottom portion;
13—Receptacle;
14—Latch;
15—Tail gate;
16—Slide;
17—Hinge;
18—Bed side;
19—Bed back;
20—Bed floor;
30—Trailer hitch;
31—Horizontal top link connector;
32—Lift arm connector;
33—Vertical top link connector;
34—Tow spine support;
35—Tow spine
40—Rail tube;
41—Short rib tube;
42—Cross bar;
50—Wheel;
51—Caster;

52—Legs;
53—Wheel mount plate;
54—Leg sleeve;
55—Aperture
60—Lumber rack tool bracket;
61—Ring tool bracket;
62—Side bin bracket;
63—Strap tool bracket;
64—J hook bracket;
65—Chainsaw holder;
110—Alternative rack assembly; and
140—Alternative rail tube.

Figure 1:
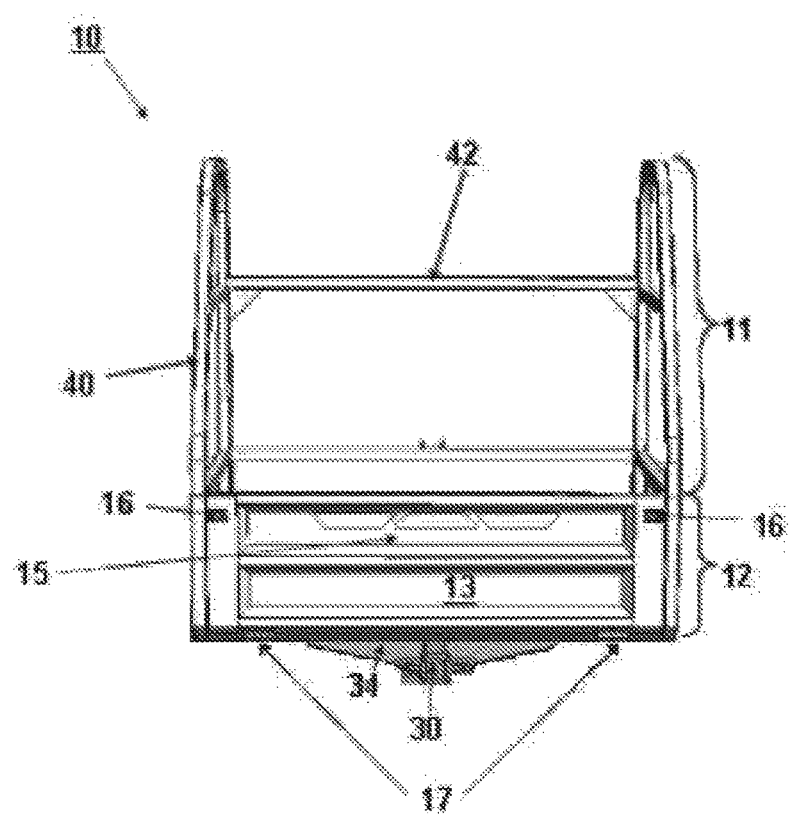
FIG. 1 is a front perspective view of an embodiment of the invention.
Figure 2:
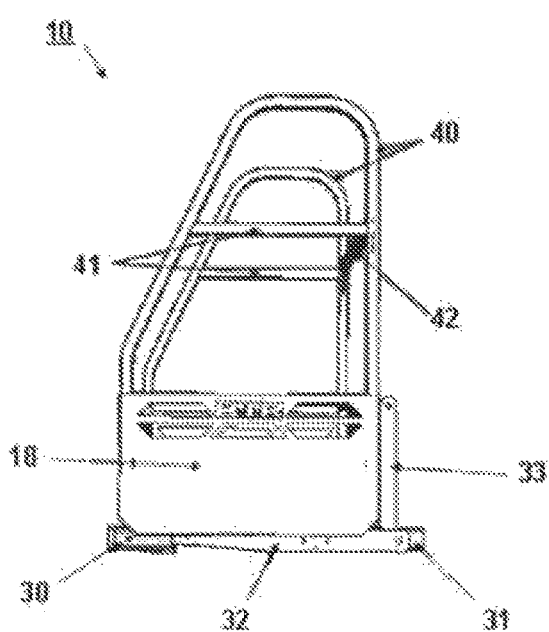
FIG. 2 is a side perspective view of the same embodiment of the invention from FIG. 1.
Figure 3:
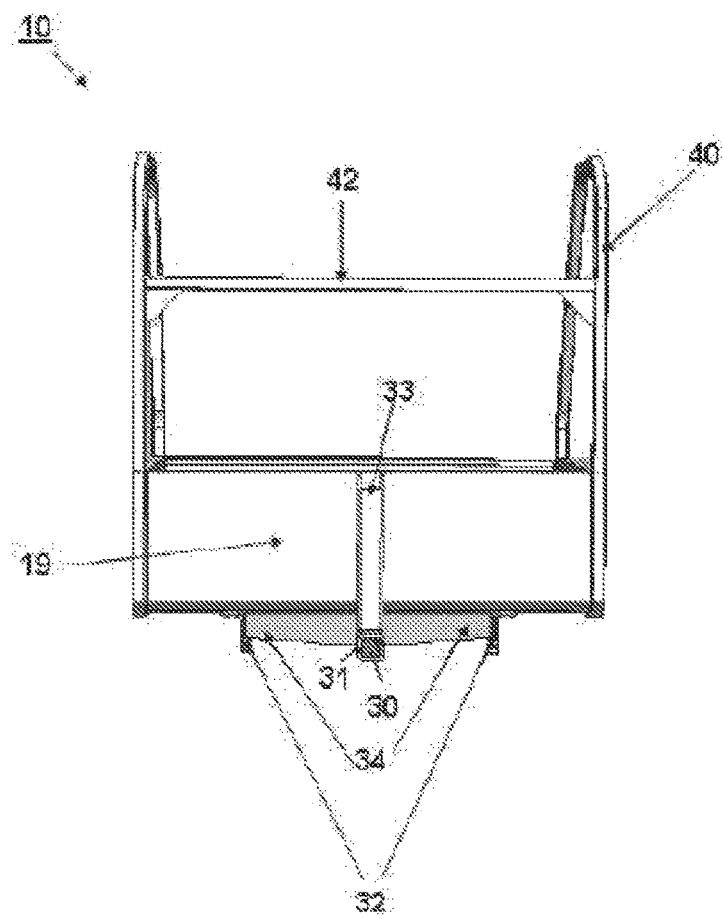
FIG. 3 is a back perspective view of the same embodiment of the invention from FIG. 1.
Figure 4:
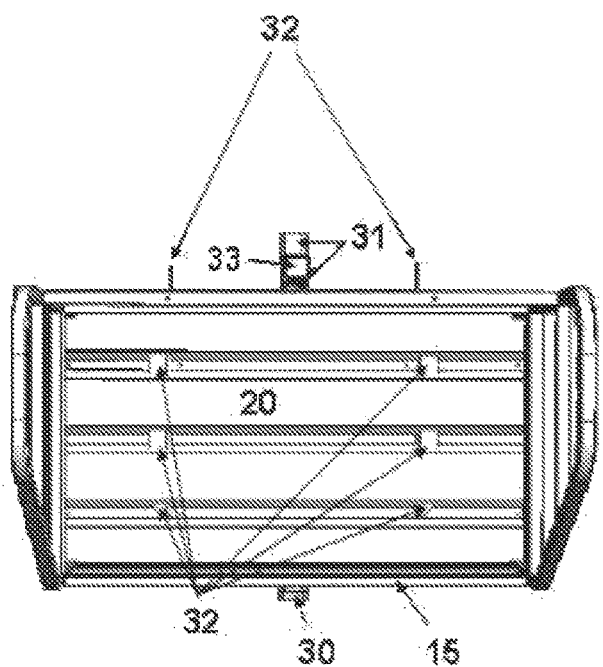
FIG. 4 is a top perspective view of the same embodiment of the invention from FIG. 1.
Figure 6:
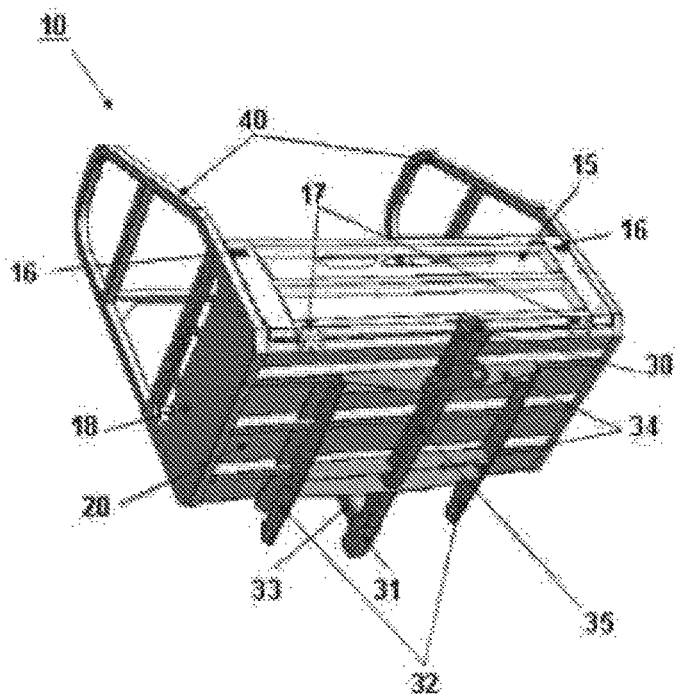
FIG. 6 is an alternate bottom perspective view of the same embodiment of the invention from FIG. 1.
Figure 13:
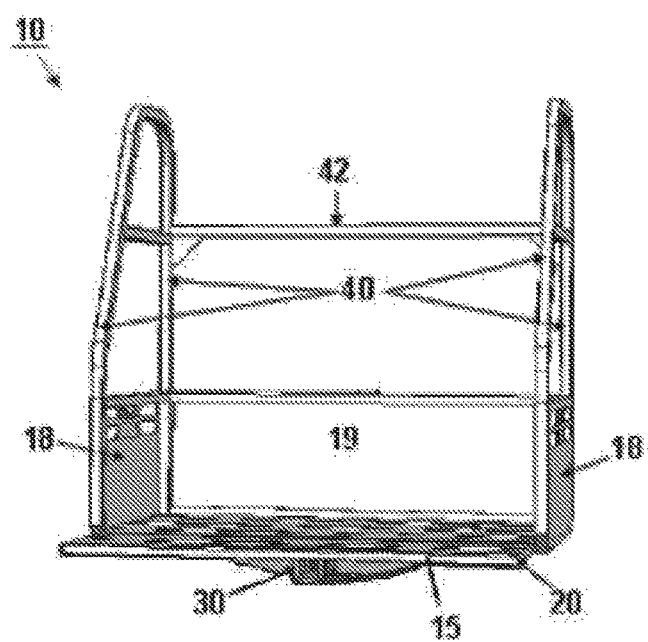
FIG. 13 depicts a front perspective view of the same embodiment of the invention from FIG. 1, with the pivoting tail gate in the open position.
Figure 21:
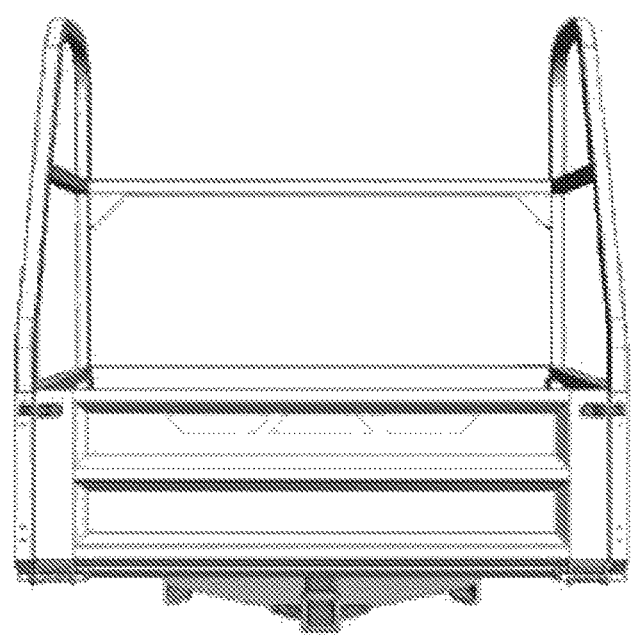
FIGS. 21-43 depict various embodiments both with and without a 3 point hitch assembly but having structural features such as latches on tail gate, and 4 separate legs.
Figure 22:
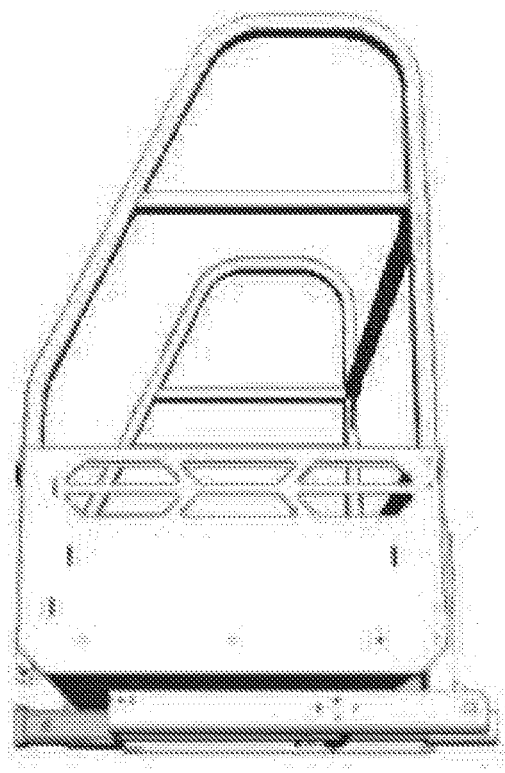
Figure 23:
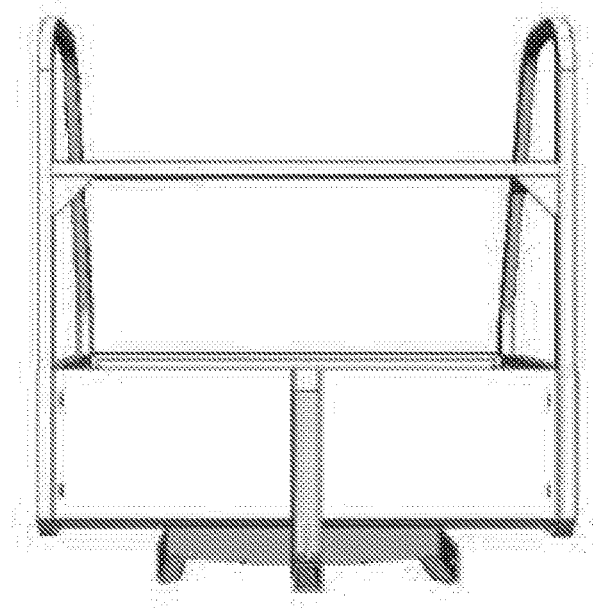
Figure 24:
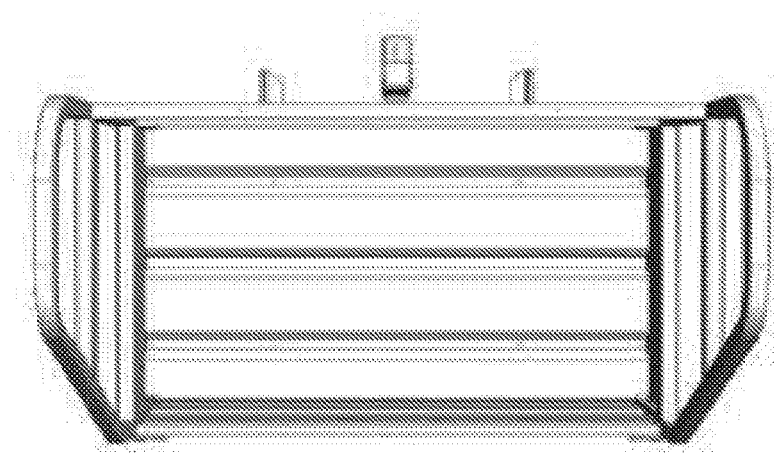
Figure 41:
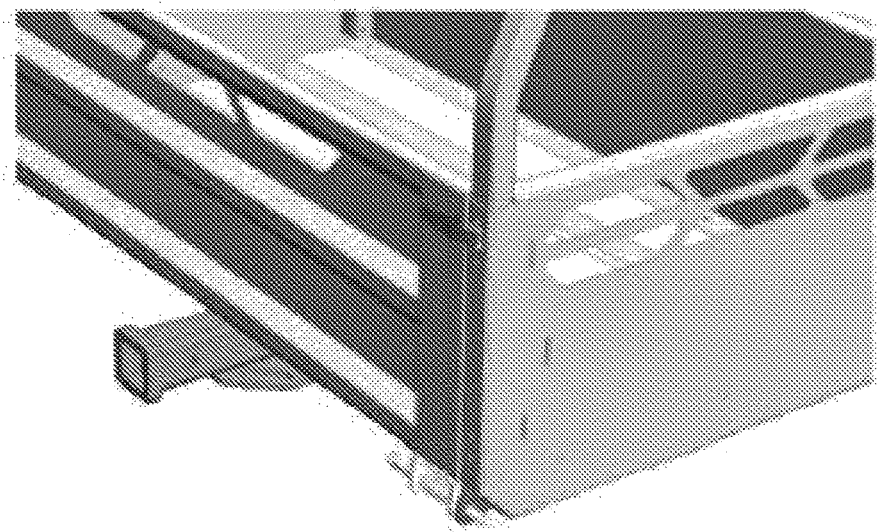
Figure 42:
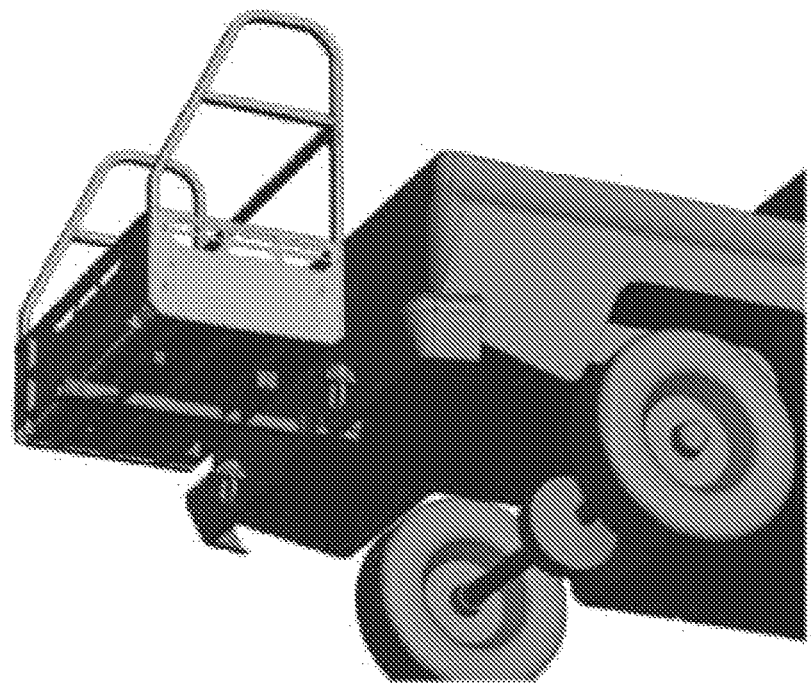
Figure 43:
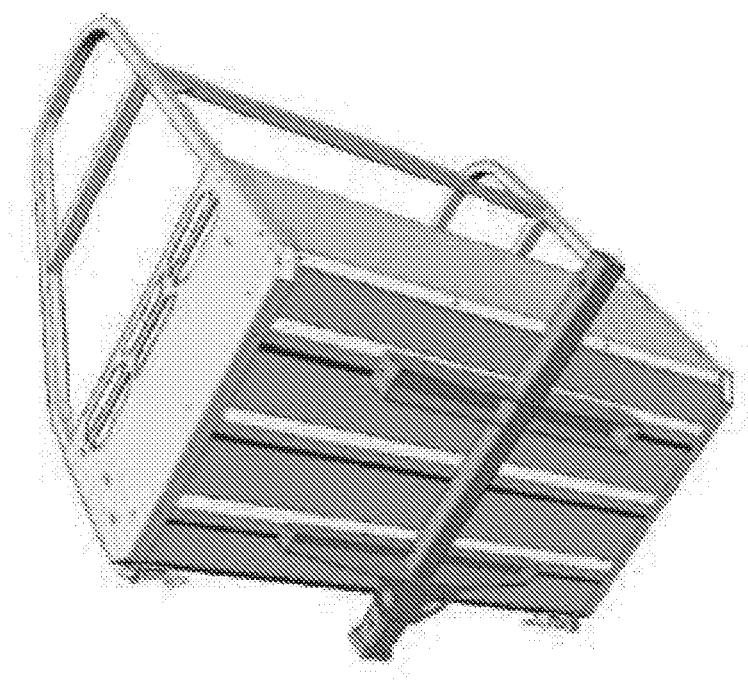

Referring to FIG. 1, a preferred embodiment of rack assembly 10 generally includes upper portion 11 having two curved rail tubes 40 extending to bottom portion 12. Bottom portion 12 includes receptacle 13, including tail gate 15, two bed sides 18 (FIG. 2 shows one), bed back 19 (FIG. 3), and bed floor 20 (FIG. 4). As best shown in FIG. 6, tail gate 15 is connected to bed floor 20 at hinges 17. FIG. 41 depicts tailgate attached to side panels with spring pins for easy removal. Tail gate 15 is preferably a continuous and planar surface with upper surface of bed floor 20 when tail gate 15 is in opened position (FIG. 13). Tail gate 15 can released from vertical position to rest at horizontal position, and be locked at vertical position, by slides 16. Alternatively, tail gate 15 can be released and locked by latches 14, as shown in FIG. 21. Curved rail tubes 40 are preferably constructed of square tubing having approximately 1¼ to 2 inch width, and preferably approximately 1/16 inch wall thickness. Wall and floor structures of receptacle 13 are preferably constructed of between 12 and 16 gauge, and preferably 13 gauge, steel. It is preferred to use cold rolled steel in the construction of rack assembly 10, in order to gain strength and durability. Also, it may be desirable to corrugate panels such as tail gate 15 and bed back 19 in order to gain more rigidity under load.

Figure 25:
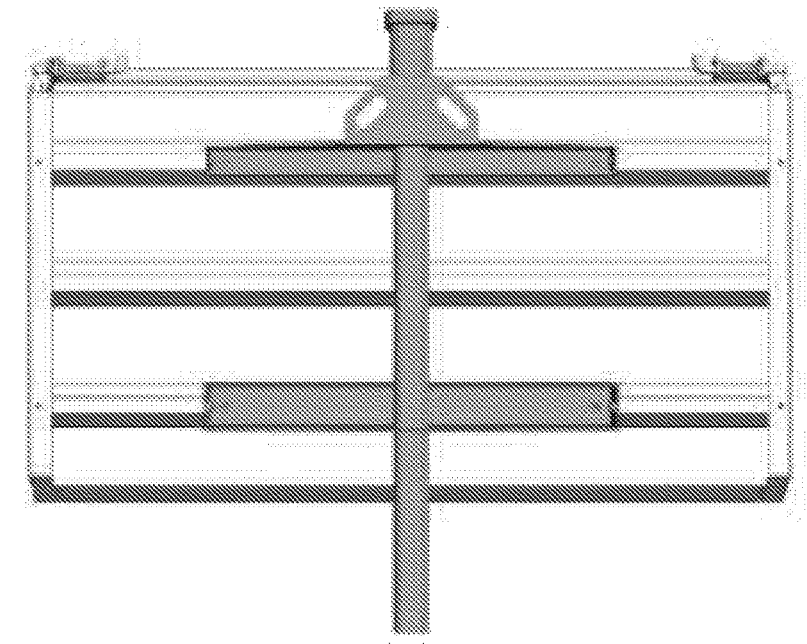
Figure 26:
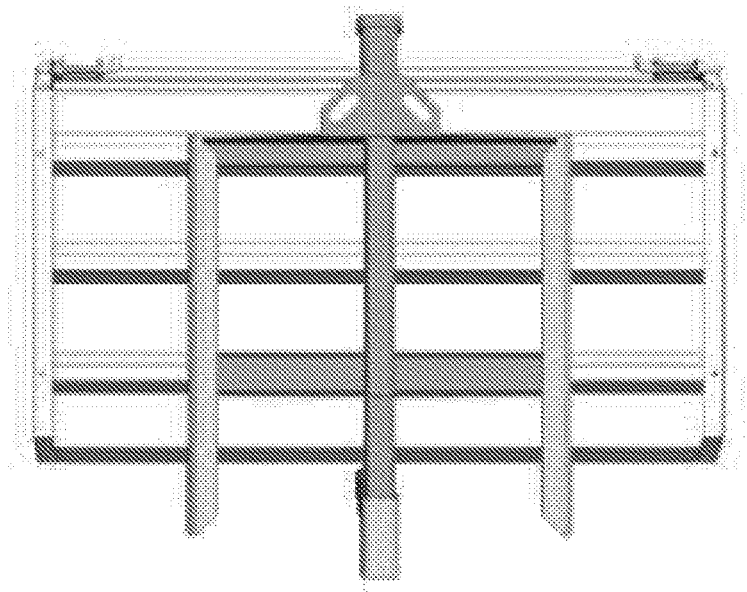
Figure 27:
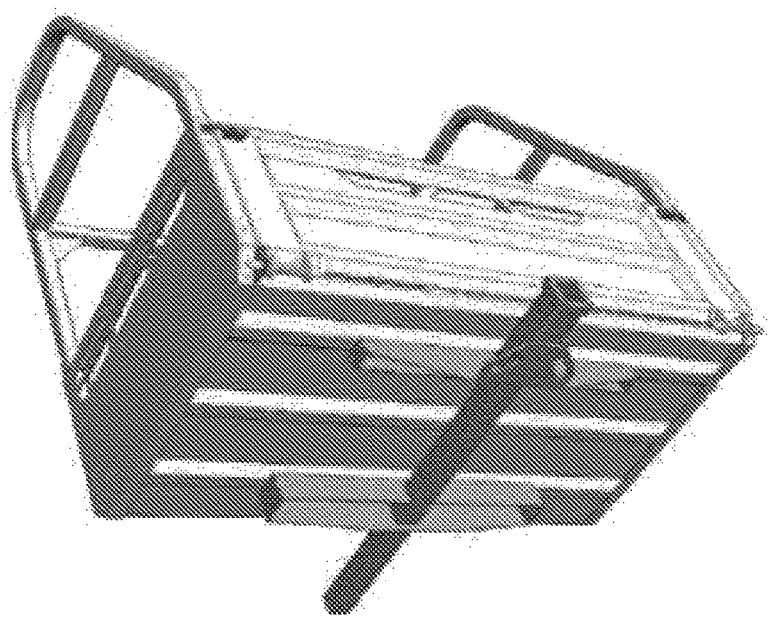
Figure 28:
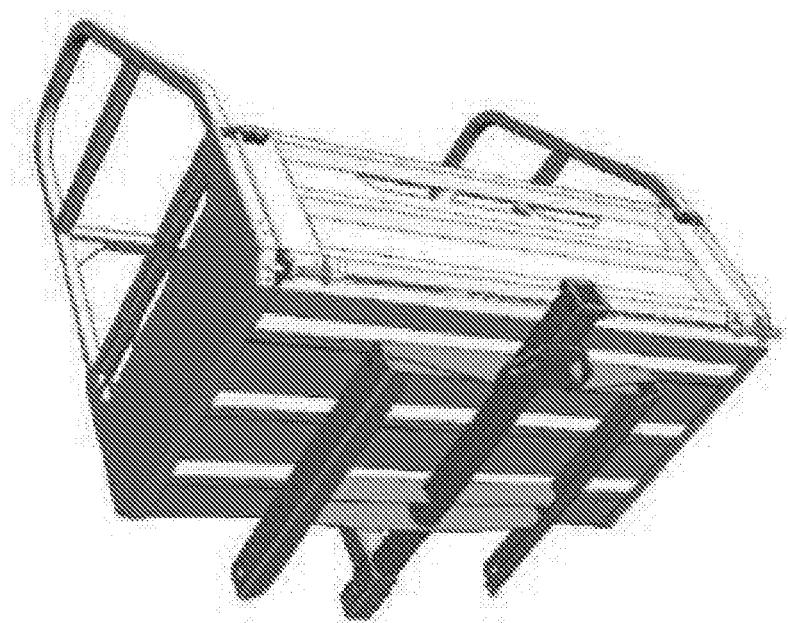
Figure 29:
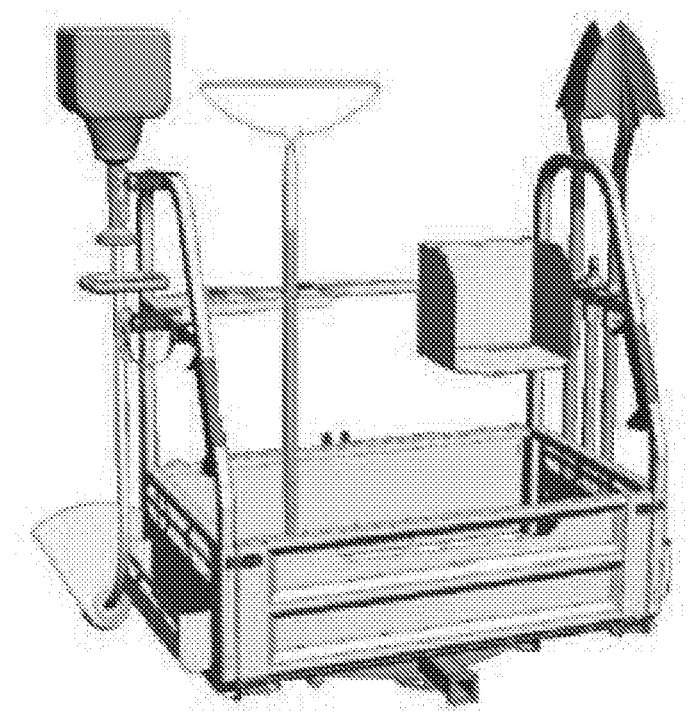
Figure 30:
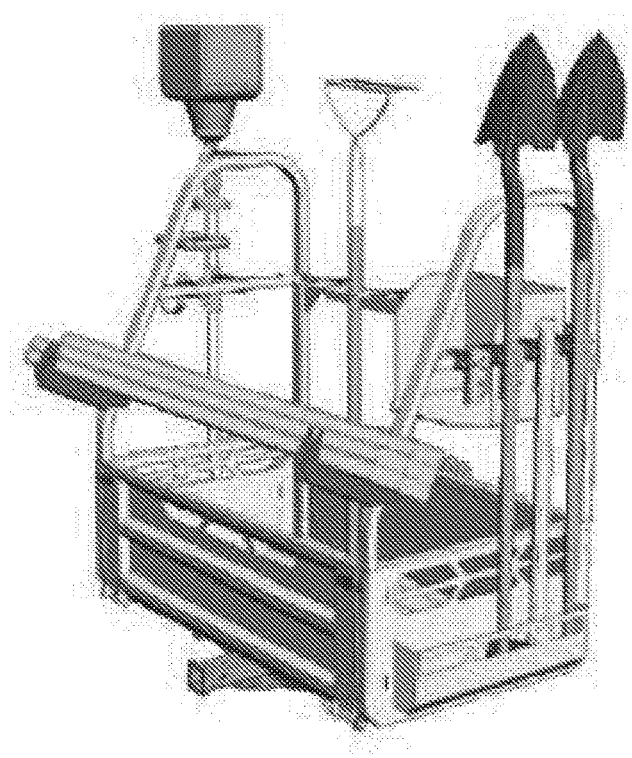
Figure 31:
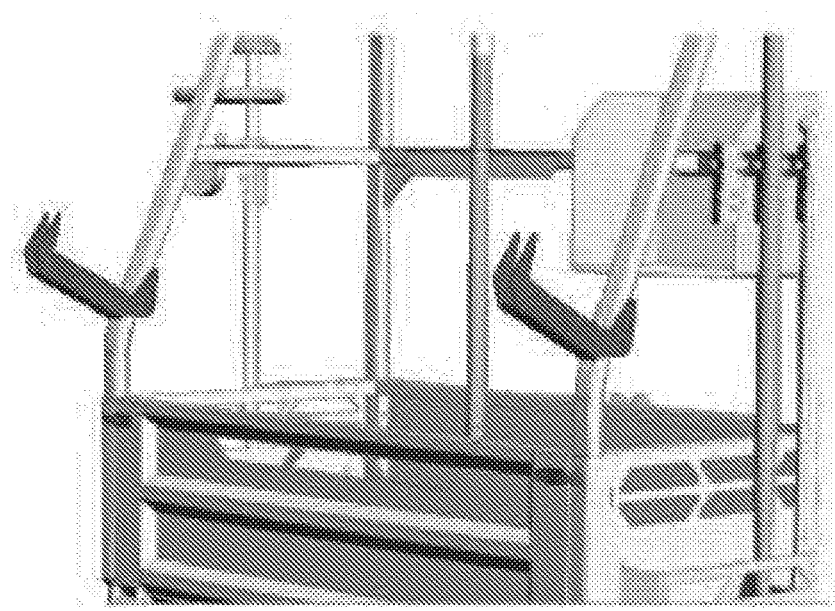
Figure 32:
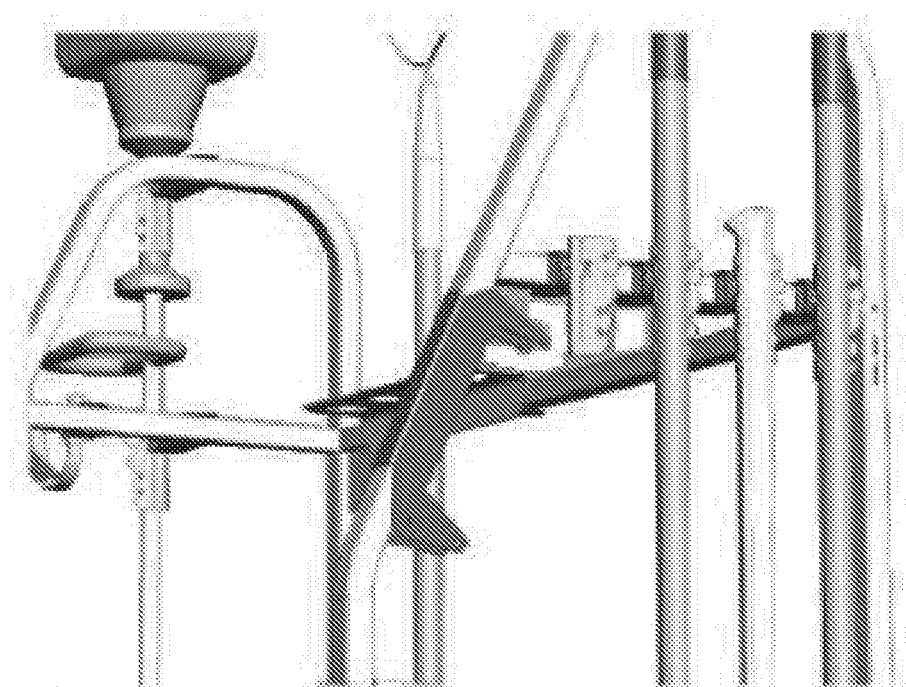
Figure 33:
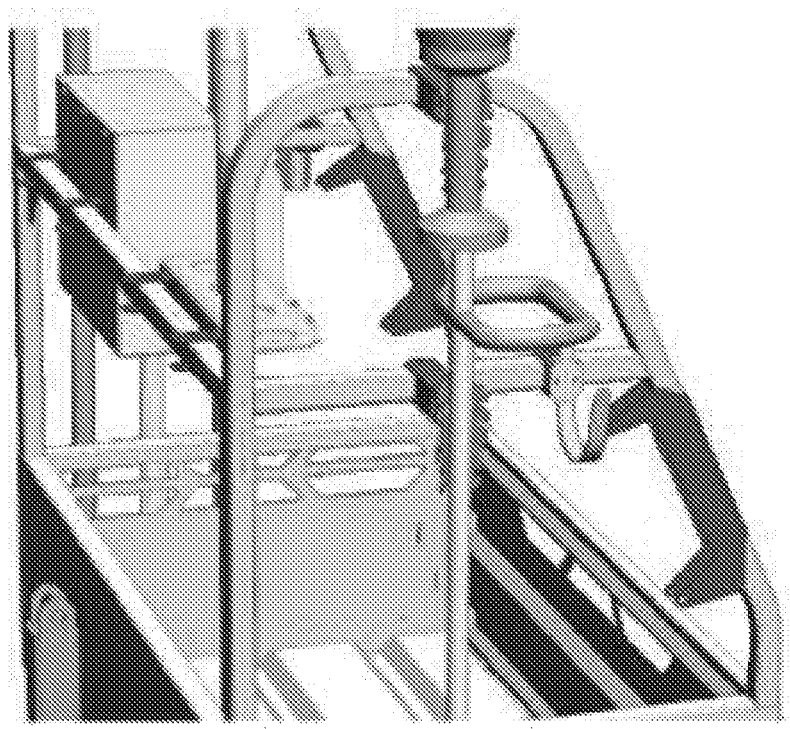
Figure 34:
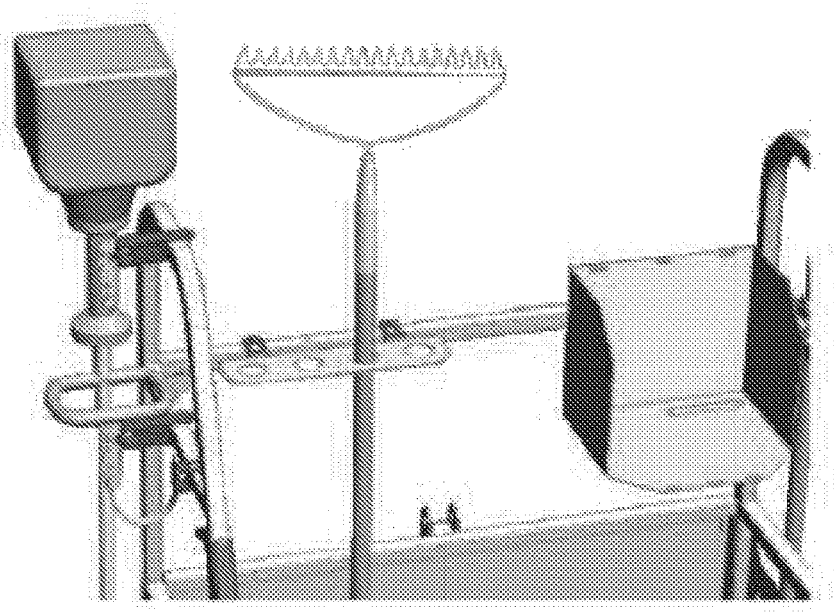
Figure 35:
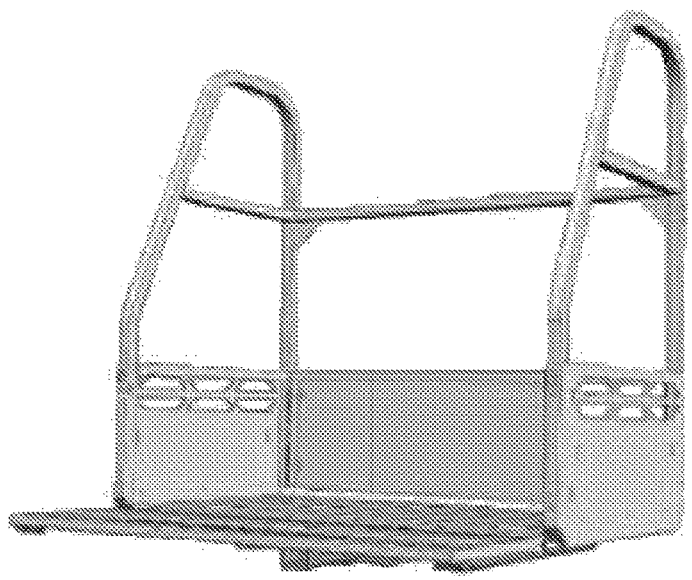
Figure 36:
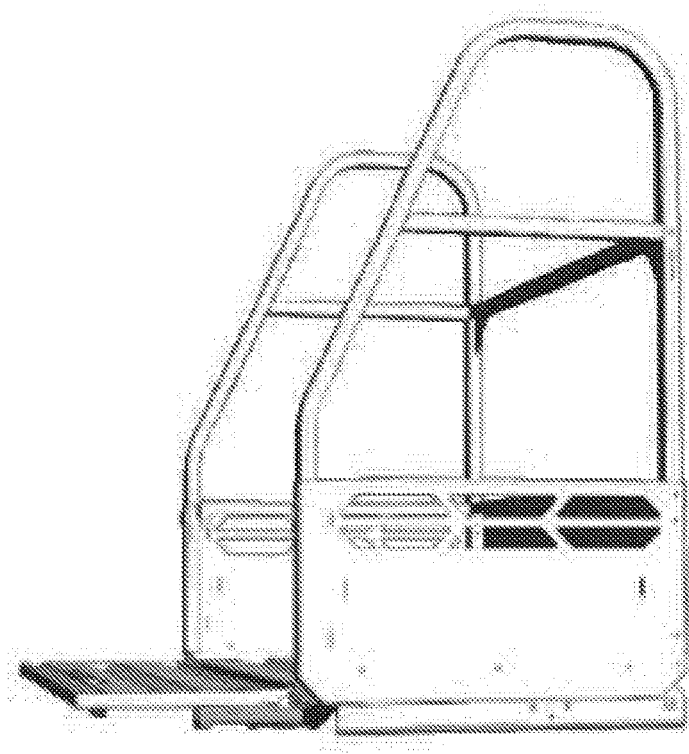
Figure 37:
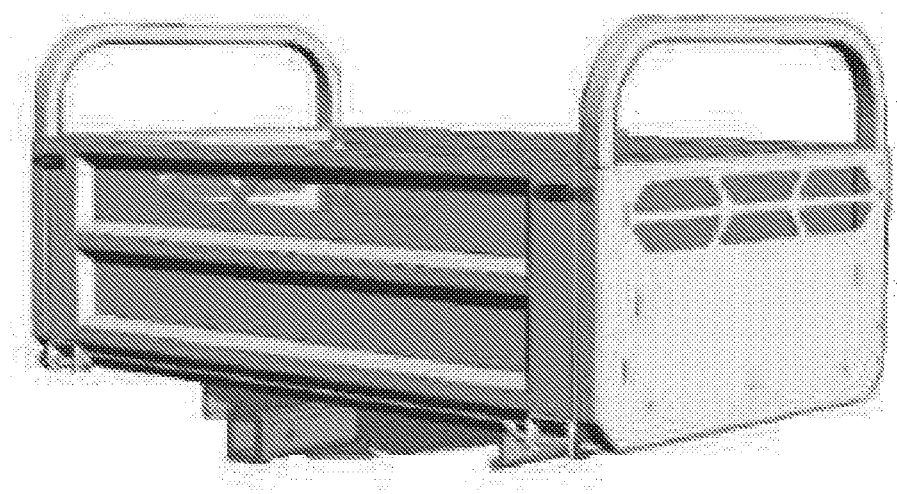
Figure 38:
Figure 39:
Figure 40:
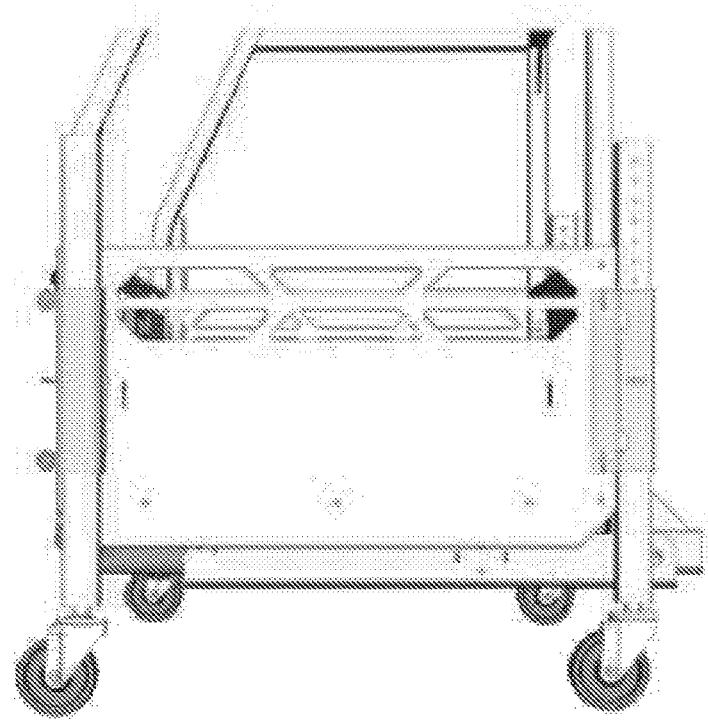
Figure 50:
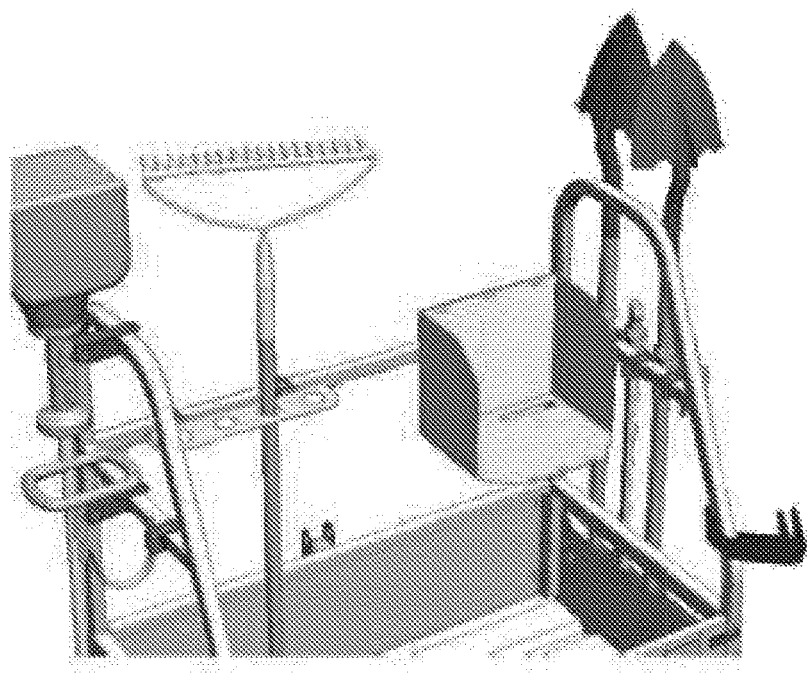
FIGS. 50-52 depict the rack system engaged with a tractor's 3 point hitch assembly.
Figure 51:
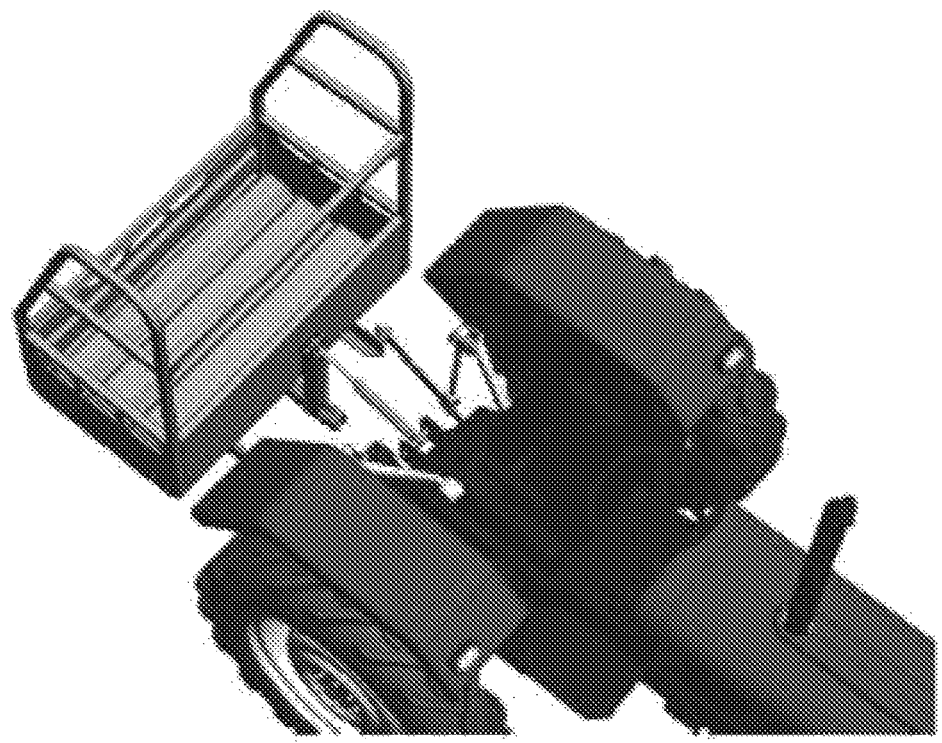
Figure 52:
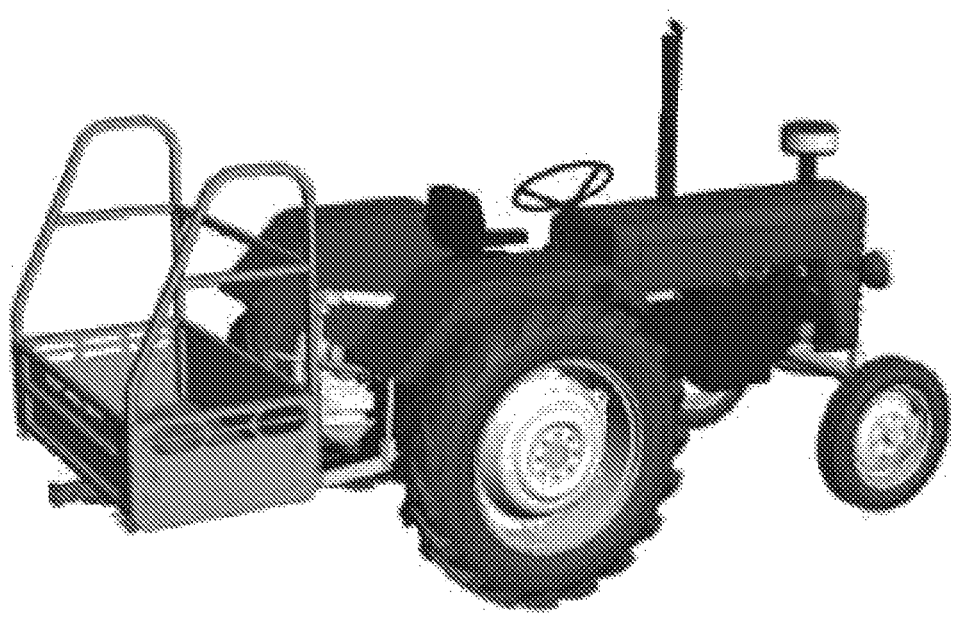
Figure 53:
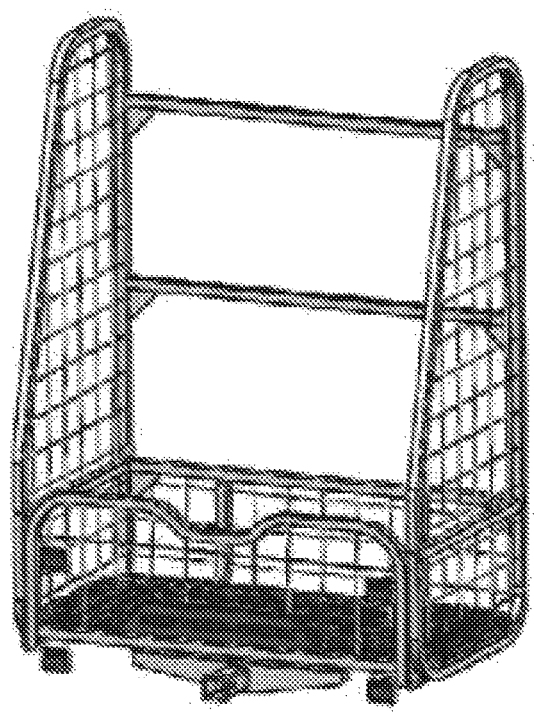
FIGS. 53-66 present the results of a Loading Analysis Study.

As shown in FIG. 2, rack assembly 10 can include an assembly which is compatible with the 3 point hitch system found in many tractors. This assembly includes horizontal top link connector 31, vertical top link connector 33, and lift arm connector 32. As best shown in FIG. 6, horizontal top link connector 31 and vertical top link connector 33 comprise one unitary "L-shaped" piece, with the former forming the short part of the "L", and the latter forming the long part of the "L". FIGS. 50-52 depict a tractor mounted with rack assembly 10. However, it should be understood that rack assembly 10 can be used without the 3 point hitch assembly, as shown in FIGS. 25 & 27. In this embodiment rack assembly 10 plugs directly into a conventional receiver, such as that found on a pickup truck.

Figure 5:
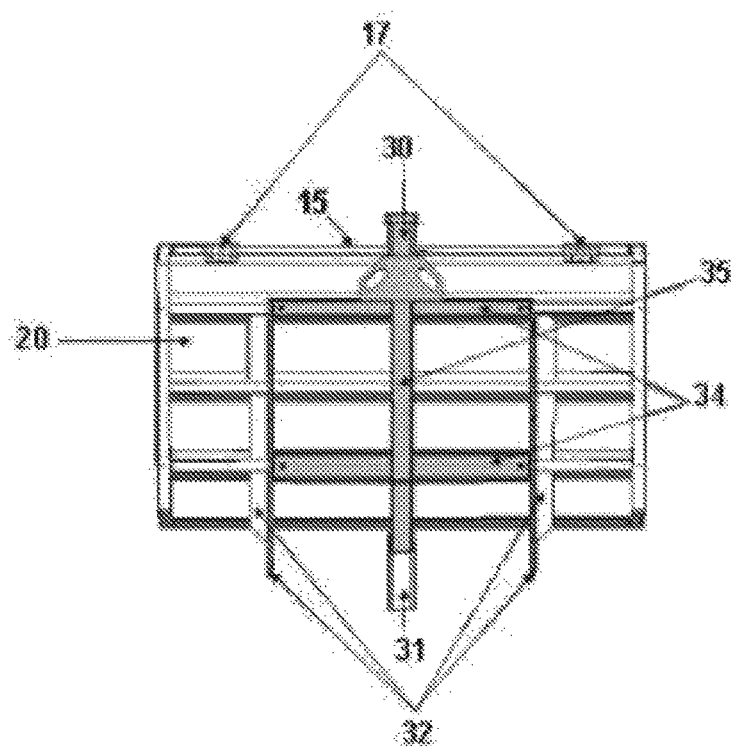
FIG. 5 is a bottom perspective view of the same embodiment of the invention from FIG. 1.
Figure 44:
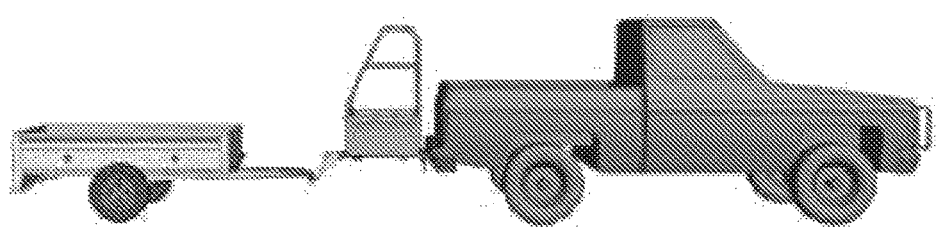
FIGS. 44-46 depict a "daisy chain"
Figure 45:
Figure 46:
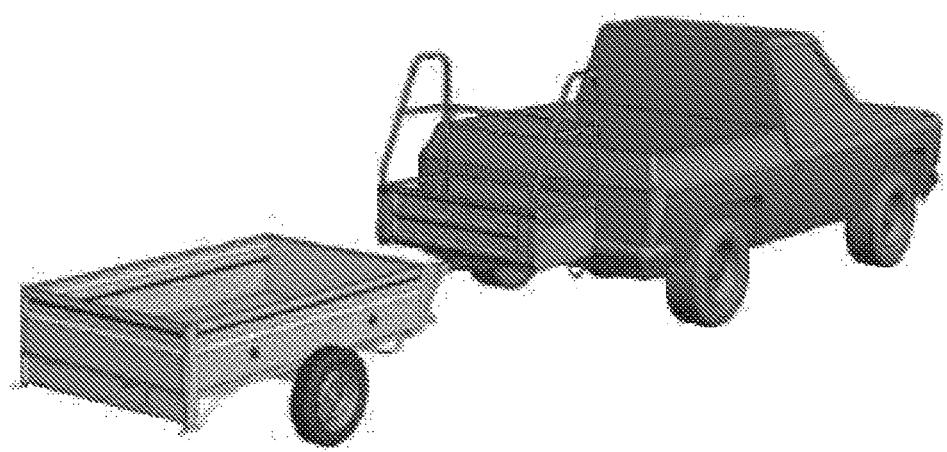
Figure 47:
FIGS. 47-48 depict an embodiment having four separate legs.
Figure 48:
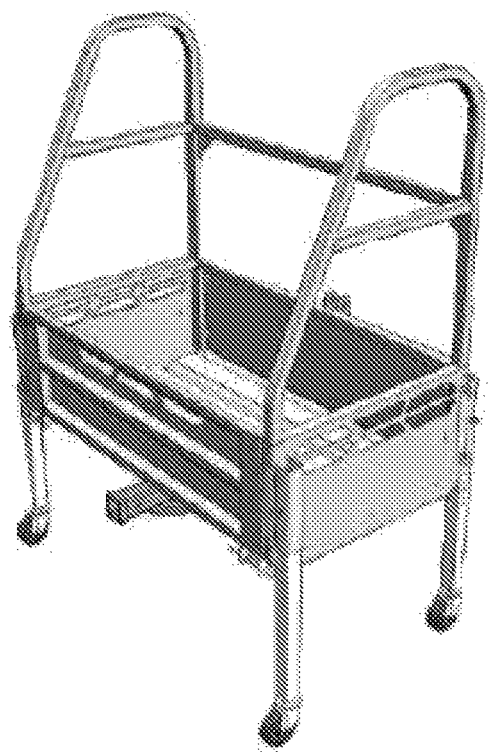
Figure 49:
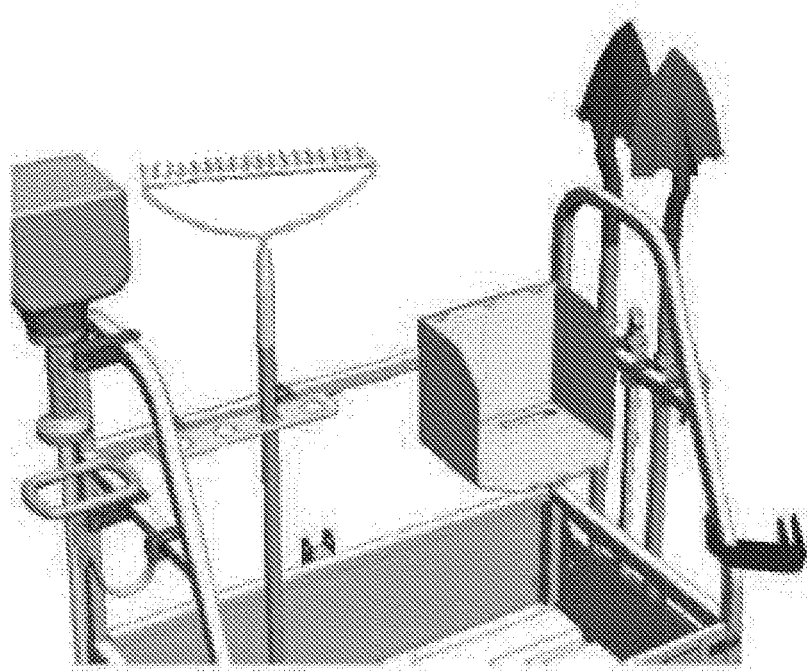

Rack assembly 10 can be engaged with a variety of vehicles including automobiles, trucks, vans, ATV's, UTV's, golf carts, tractors, or others that can accept a 2" receiver hook up and/or that have a 3 point hitch. On the opposite side of horizontal top link connector 31 is trailer hitch 30 (FIG. 5), thereby providing an attachment point for an additional trailer. Having two connection points, for example trailer hitch 30 on one side and 3 point hitch assembly on the other side, permits "daisy chaining" of trailers. Alternatively, "daisy chaining" can be without 3 point hitch assembly, as depicted in FIGS. 44-46. It is desirable that trailer hitch 30 includes a square receiver opening of 1.25 inches (for Class I/II towing), or 2 inches (for Class III/IV/V towing). Class IV/V receivers, in 2.5 inches, are also possible. In this manner a user tow items such as a seed spreader, log splitter, trailers for personal watercraft, and so forth.

As would be understood by those in the art, rack assembly 10 must withstand a tremendous amount of force when used with a vehicle. For one, rack assembly 10 extends outwardly from a vehicle, without being supported underneath. Additionally, a trailer may be connected rearwardly. There is also the weight of rack assembly 10 itself (approximately 170 pounds, depending on the configuration), plus all the implements stored on and inside the device. Finally, the rack assembly 10 is subjected to bouncing when attached to a moving tractor or other vehicle. Rack assembly 10 includes various structures which enable the device to withstand these forces. Of particular importance is tow spine 35, which unifies trailer hitch 30 and horizontal top link connector 31. In addition, a plurality of tow spine supports 34, extending substantially perpendicularly from tow spine 35, also provide structural integrity by strongly reinforcing bed floor 20. This is further strengthened by lift arm connectors 32, as shown in FIG. 6, and the use of a 3 point hitch where compatible.

Tow spine 35 performs the majority of the work in terms of load bearing and resistance to deformation of the structure when under different loading scenarios. While most of the assembly could be delivered as a flat packed bolt together kit, the tow spine 35 is a welded, heavier gauge steel, providing a rigid foundation for the rest of the rack, in addition to the modular hitch features. The tow spine's metal thickness can range from ⅛ inch to ¼ inch.

Figure 56A:
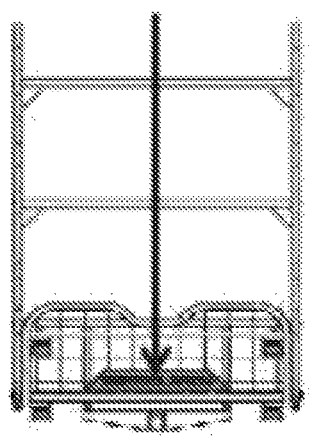
Figure 56B:
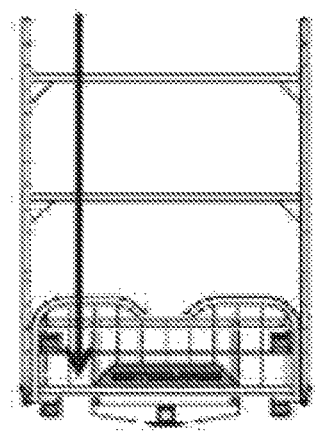
Figure 57:
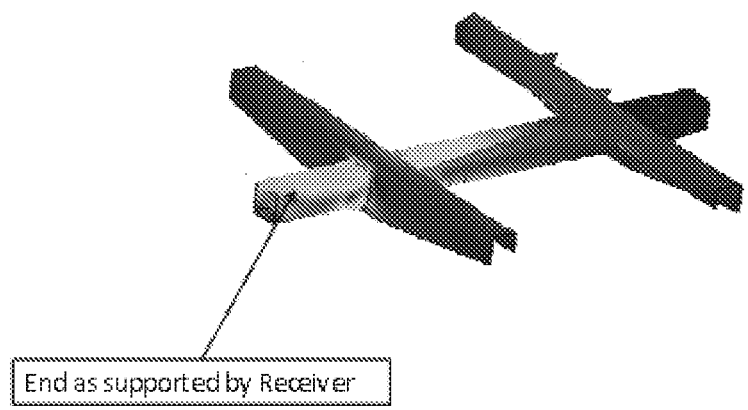

Regarding FIGS. 56A and 56B, two acceptable loading scenarios are demonstrated. FIG. 56A shows a loading scenario with a 480 lbf evenly distributed in the center of the rack, bringing the total static weight to 600 lbf. FIG. 56B shows a loading scenario with a 320 (calculated) load placed asymmetrically all on one side up to the maximum the rack can handle.

FIGS. 53-66 set forth Finite Element Analysis results. Although this analysis was conducted with an earlier rack design, consisting of mostly square tubing, the focus was on determining the strength of the spine component. Accordingly, much of the data is relevant to the present invention.

Figure 54:
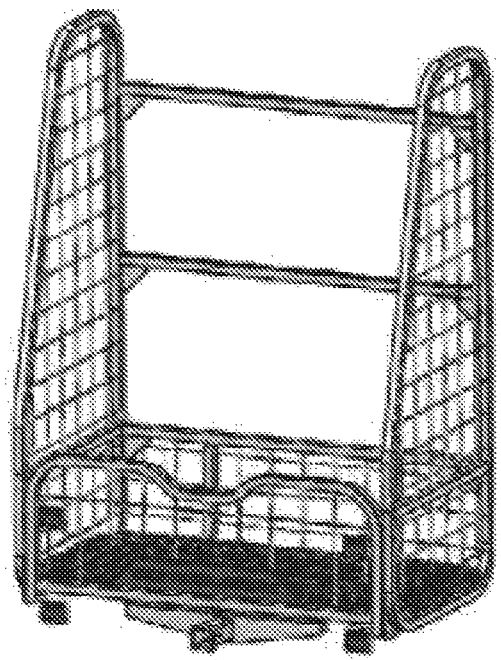

Regarding FIG. 54, for the finite element analysis, the rack weight was configured for 2" square receiver, approximately 120 lbs, and the analysis was based on 1020 Cold Rolled Steel material properties.

Figure 55:
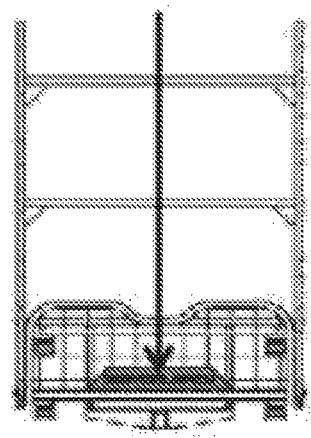

Regarding FIG. 55, the following support specifications are preferred:

Support (Receiver and Hitch) Specifications.

| | |
|---|---|
| 3 Point Hitch (category 0), 12" behind LP | 450 lbf (JD) |
| 3 Point Hitch (category 1), 24" behind LP | 680-1450 lbf (JD) |
| 2" Square Receiver (class III, standard) | 600 lbf (TW) |
| 1¼" Square Receiver (class I) * | 200 lbf (TW) |
| 1¼" Square Receiver (class II) | 300 lbf (TW) |

Reasonable design limit for standard configuration (2" square receiver) is 600 lbf (static). This would be an acceptable load for all class 3 rated receivers and receivers on class 1 or higher 3 point hitches.
* Possible to design 1¼" configuration such that system only fits class II receivers Regarding FIG. 57, a spine component designed with ⅛" walls, appr. 16 lbs, is depicted with a symmetric loading of 1200 lbf total load (120 lbf plus 480 lbf payload, 2×FoS), showing that the highest stresses are at the square tube where it exits the receiver, but the stresses should not cause yielding of rack.

Figure 58:
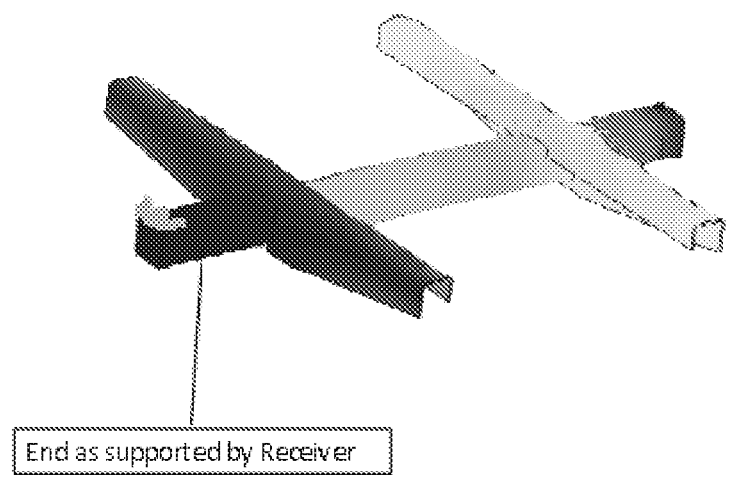
Figure 59A:
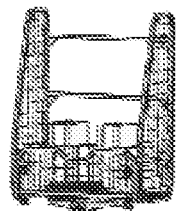
Figure 59B:
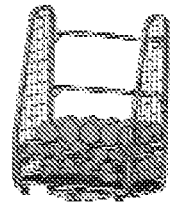
Figure 59C:
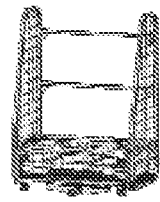
Figure 59D:
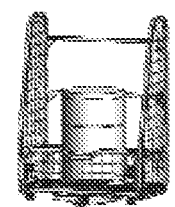
Figure 60:
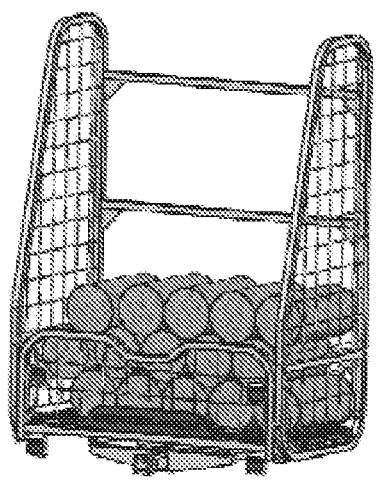
Figure 60:
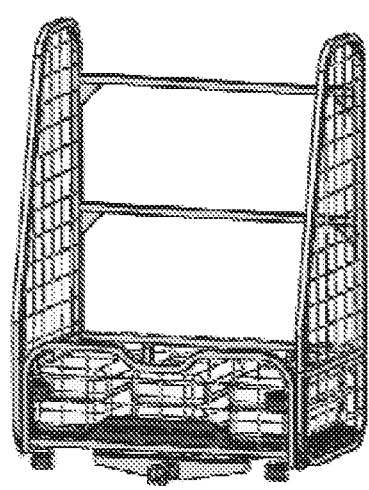

Regarding FIG. 58, a spine component is depicted with a symmetric loading, showing that at maximum load and 2× gravity (driving over a bump), the point furthest from the receiver will flex downward approx. 0.144".

FIG. 59 depicts maximum payloads of different materials, evenly distributed. FIG. 59A depicts 12 concrete blocks evenly distributed at 30-40 lbf each. FIG. 59B depicts 12 cubic feet of Green Oak at 40 lbf/ft$^3$ evenly distributed (other woods weigh less, so larger volume could be carried.) FIG. 59C depicts 6 bags of cement evenly distributed at 80 lbf each. FIG. 59D depicts one 55 gallon drum filled with water at 500 lbf (slightly over max) evenly distributed.

Figure 61:
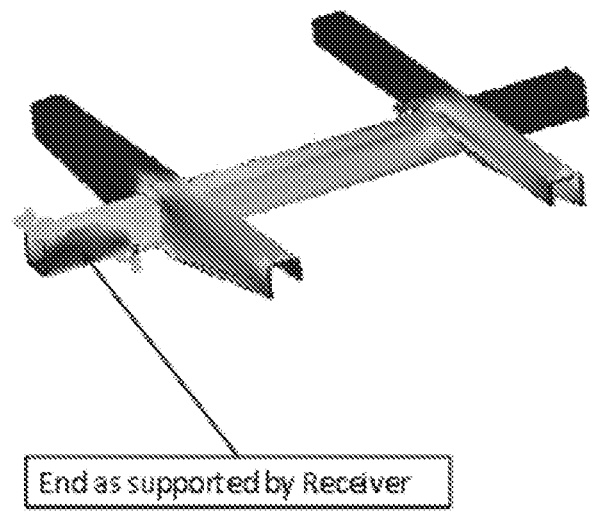

FIG. 61 depicts 320 lbf asymmetrically loaded at extremes of ribs and 120 lbf representing weight of rack (2×FoS for a total of 880 lbf). System has highest stresses where 2" tube exits hitch receiver but should not yield. Additional strength can be gained (if needed) by using 3/16" wall tubing.

Figure 62:
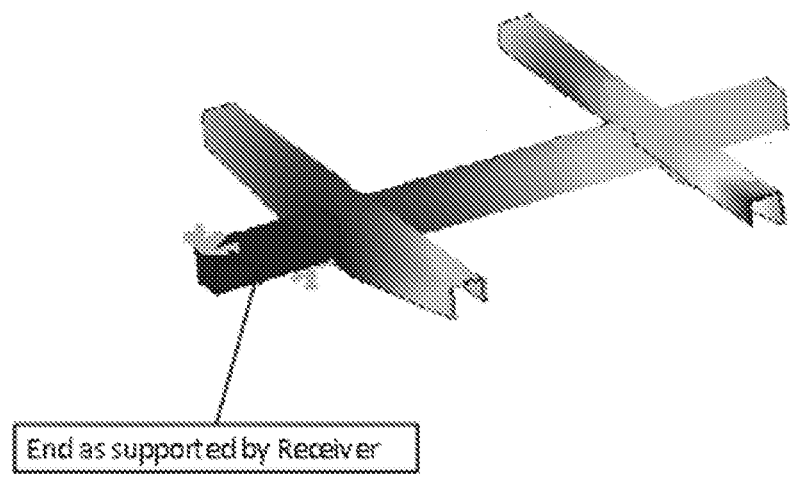

FIG. 62, depicts 640 lbf asymmetrically loaded at extremes of ribs (2×FoS) and 240 lbf representing weight of rack (2×FoS). Deflection at worst position is approximately 0.25" vertically.

Figure 63:
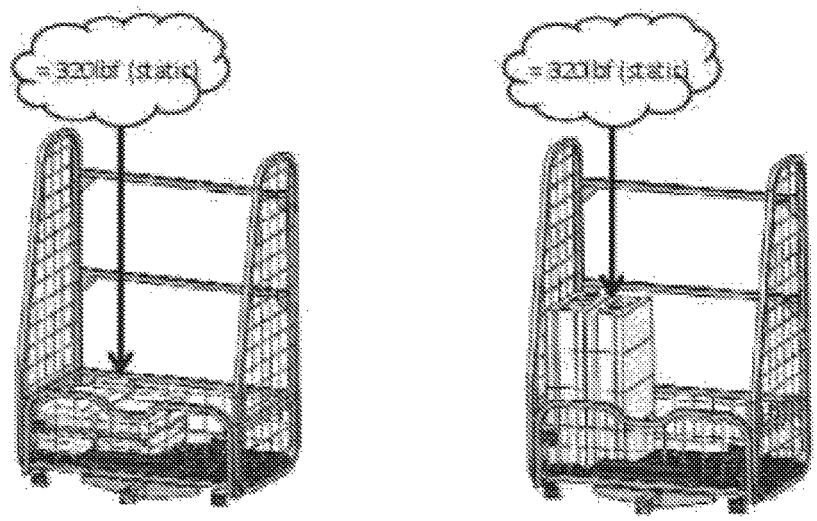
Figure 64:
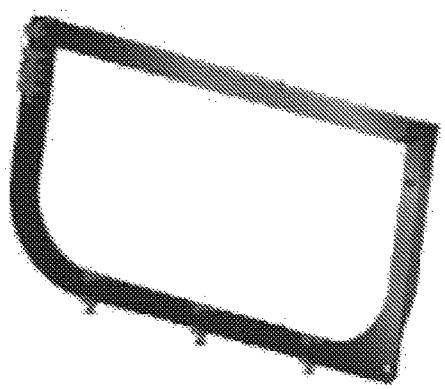
Figure 65:
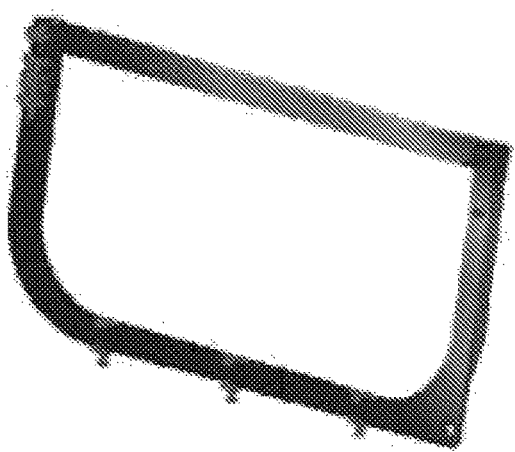
Figure 66:
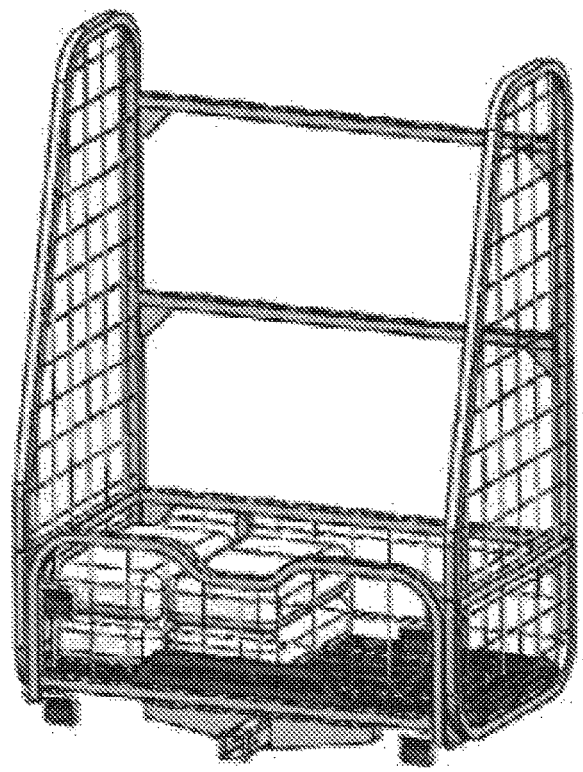
Figure 67:
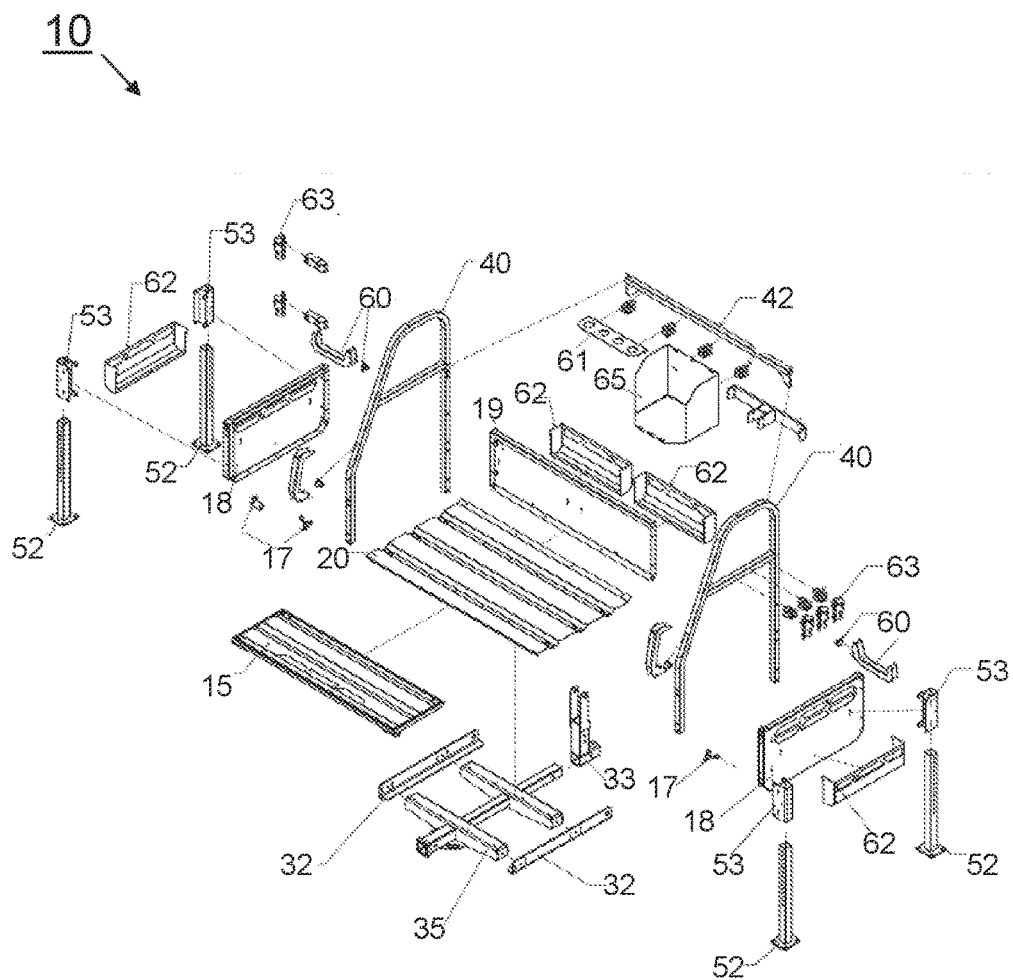
FIGS. 67-68 depict exploded views of the main frame of the rack assembly.
Figure 68:
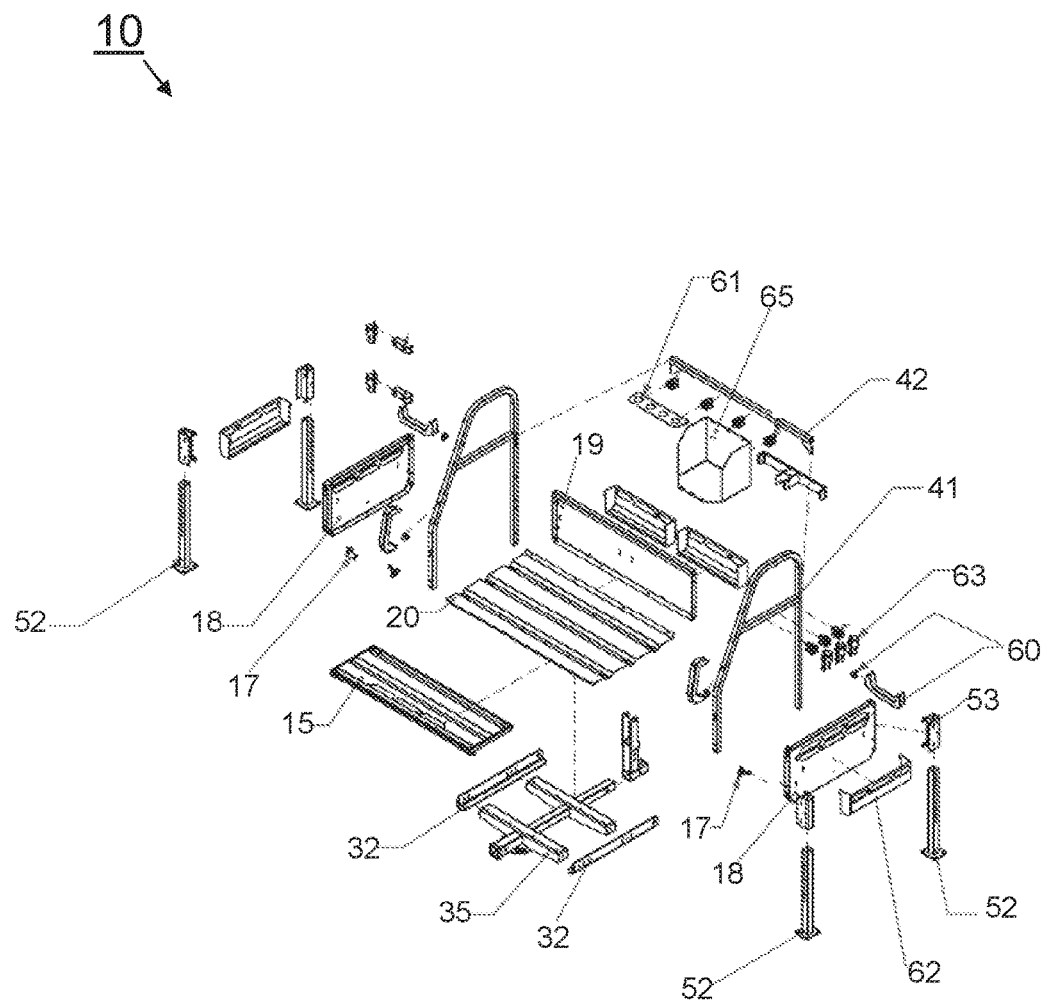
Figure 69:
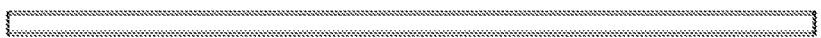
FIGS. 69-72 depict various views of the back panel of the bed.
Figure 70:
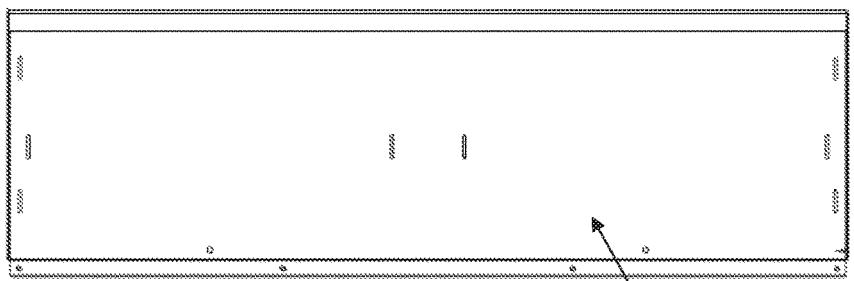
Figure 71:
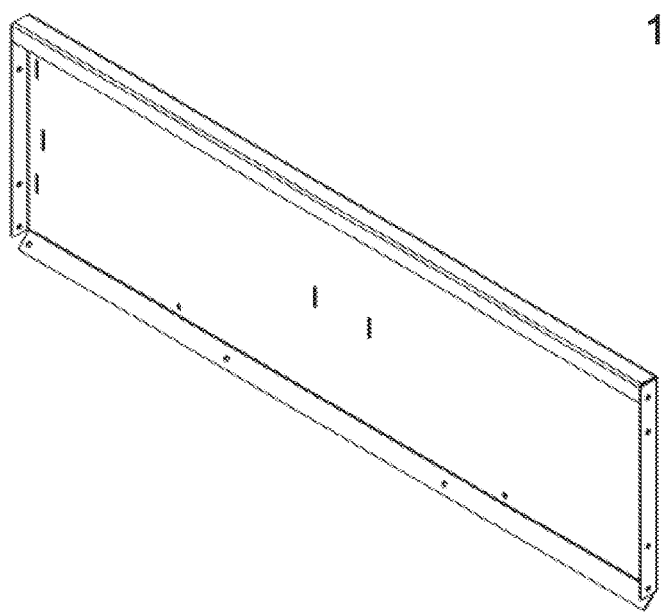
Figure 72:
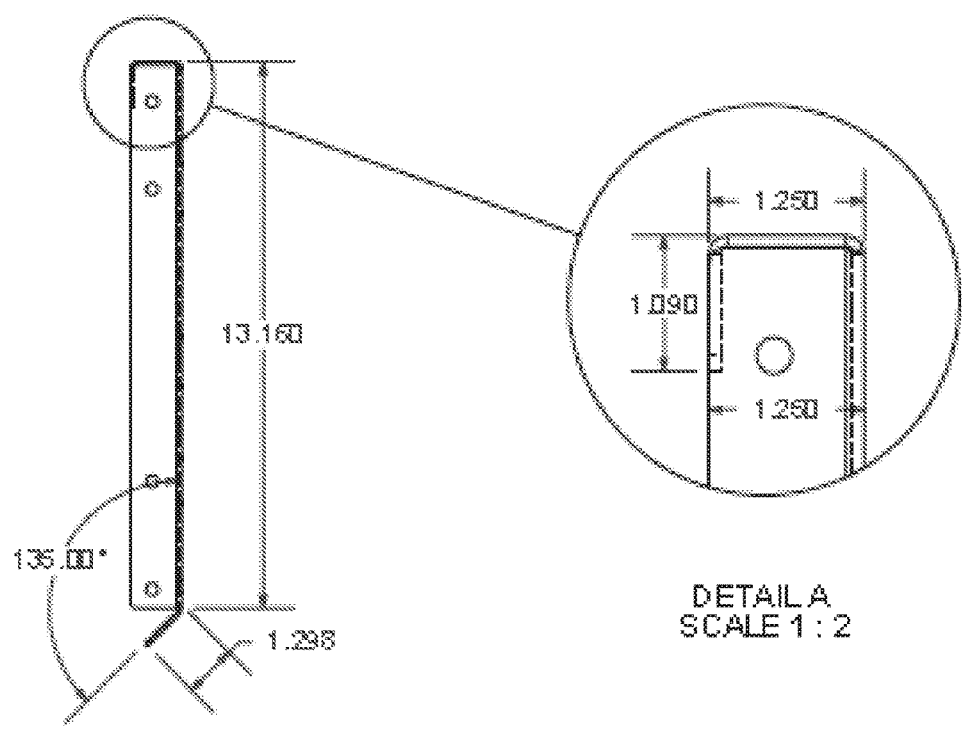
Figure 73:
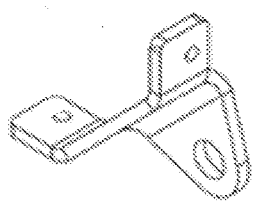
FIGS. 73-76 depict various views of the hinge tab.
Figure 74:
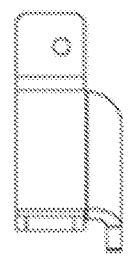
Figure 75:
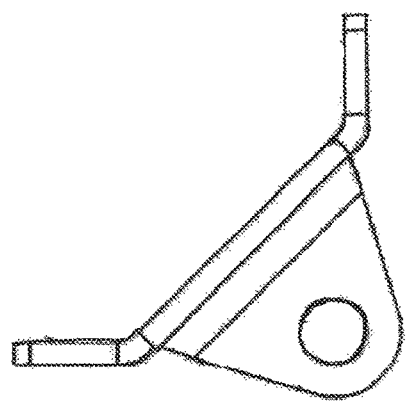
Figure 76:
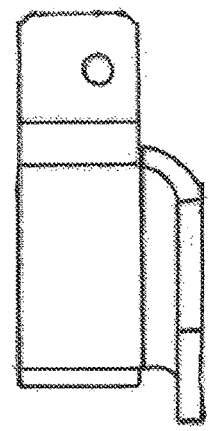
Figure 77:
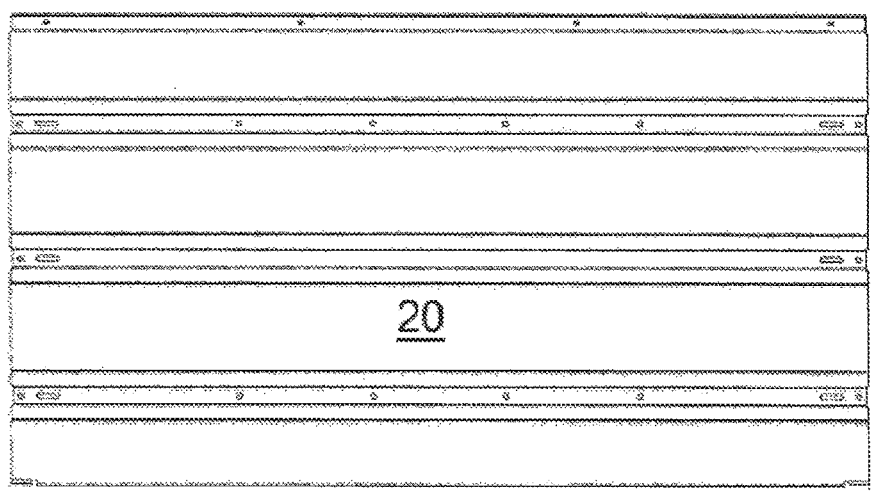
FIGS. 77-80 depict various views of the rack bed floor.
Figure 78:
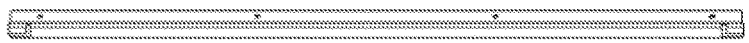
Figure 79:
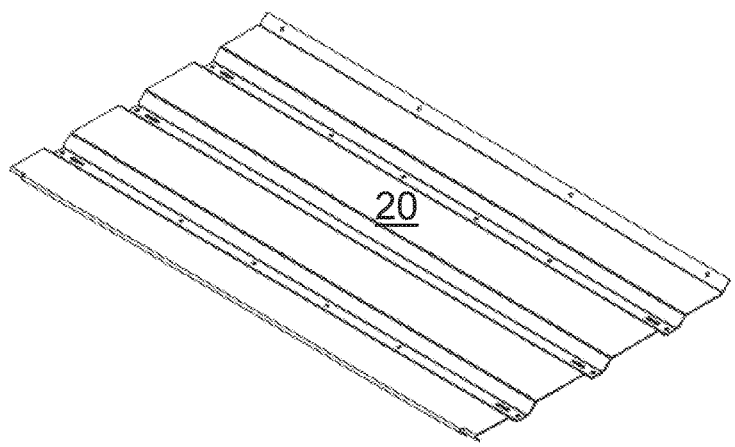
Figure 80:
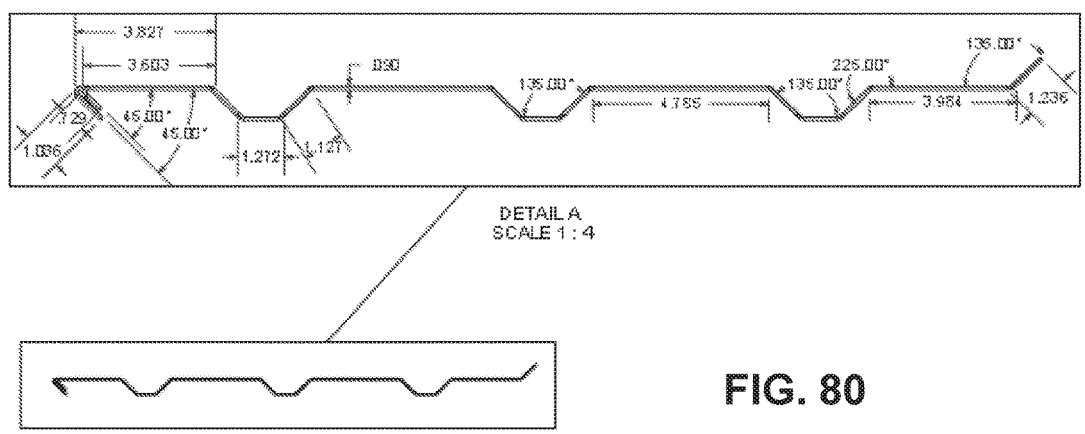
Figure 81:
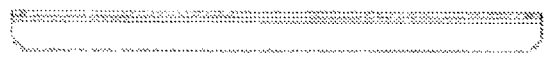
FIGS. 81-84 depict various views of the right-side lift arm.
Figure 82:
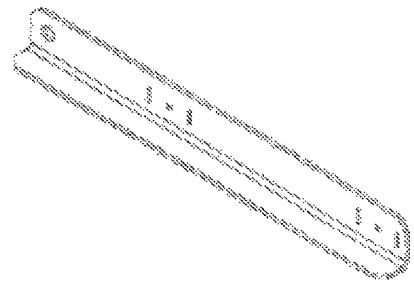
Figure 83:
Figure 84:
Figure 93:
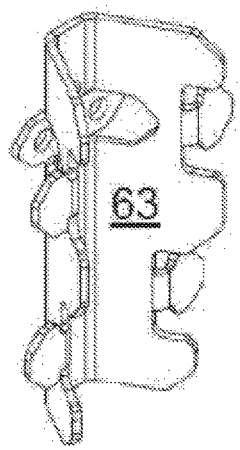
FIGS. 93-97 depict various views of the strap tool bracket.
Figure 94:
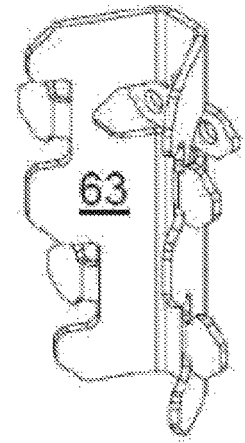
Figure 95:
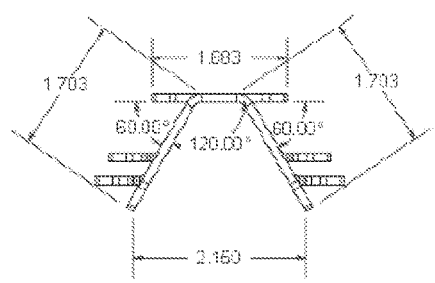
Figure 96:
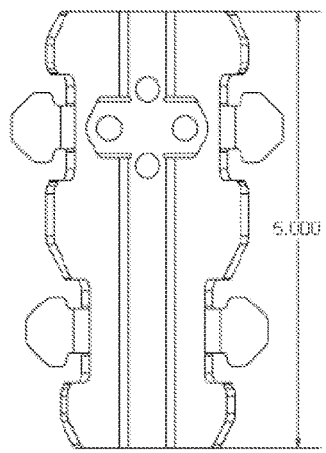
Figure 97:
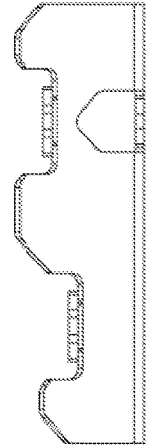
Figure 98:
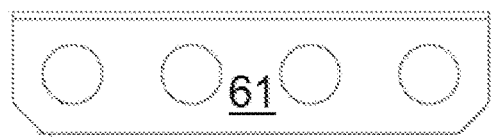
FIGS. 98-101 depict various views of the ring tool bracket.
Figure 99:
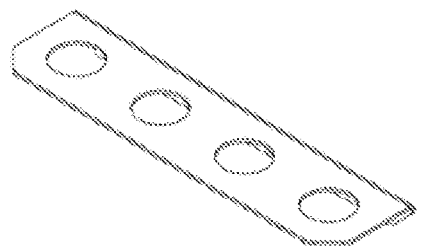
Figure 100:
Figure 101:
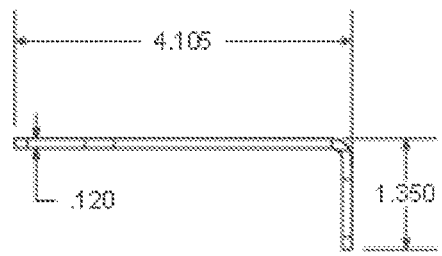
Figure 102:
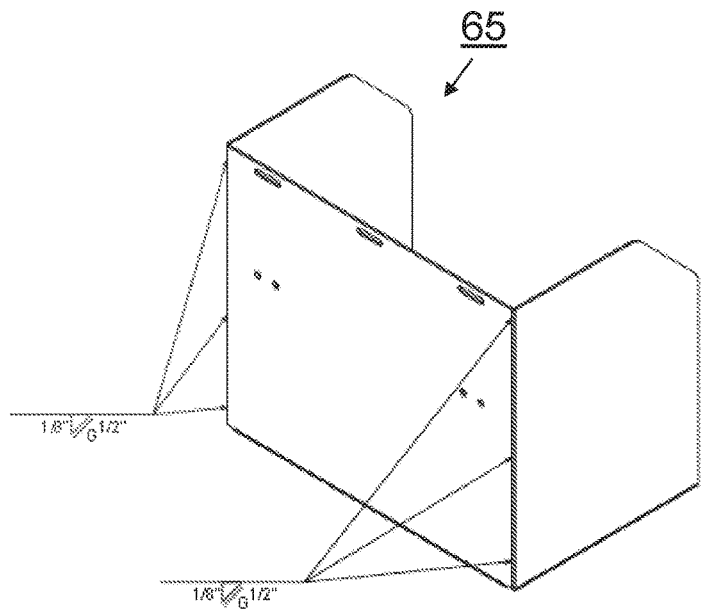
FIGS. 102-107 depict various views of the chain saw holder.
Figure 103:
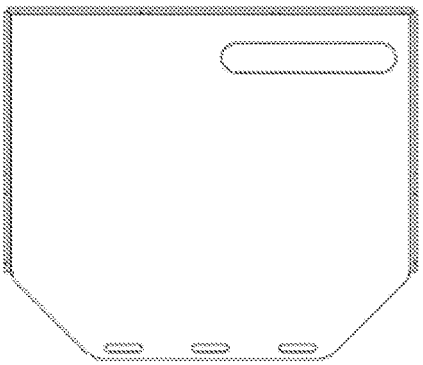
Figure 104:
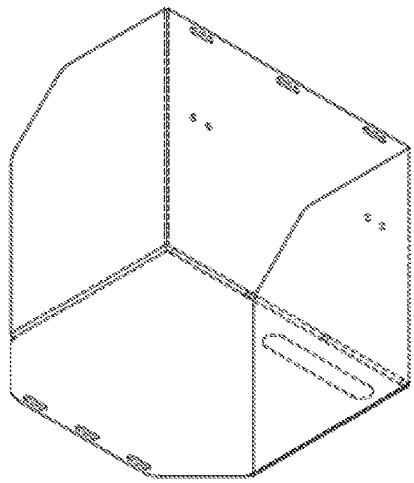
Figure 105:
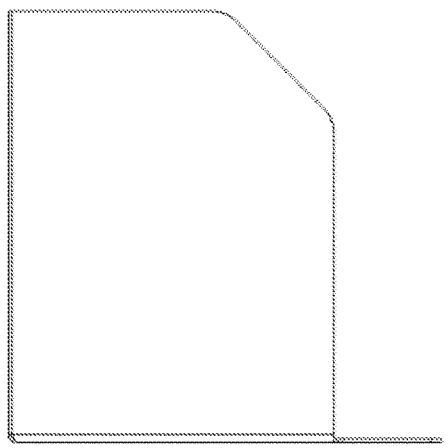
Figure 106:
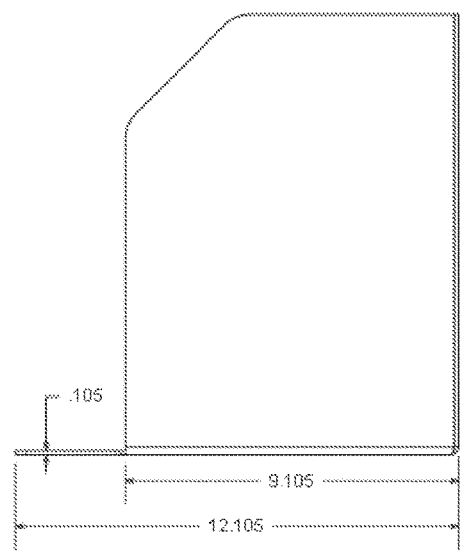
Figure 107:
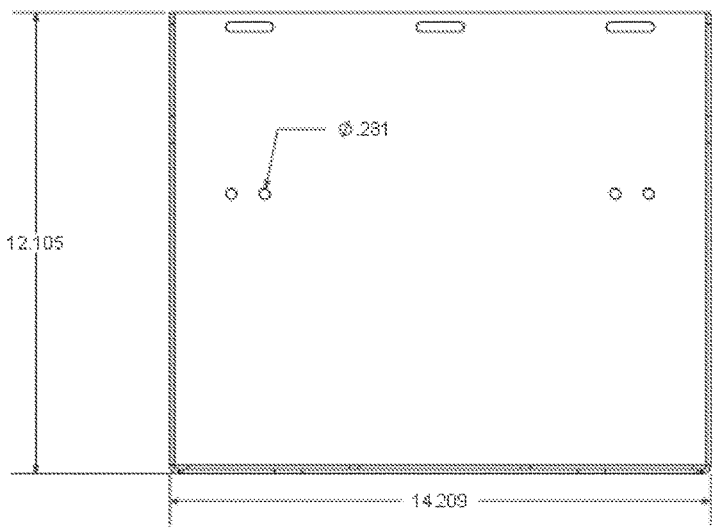
Figure 108:
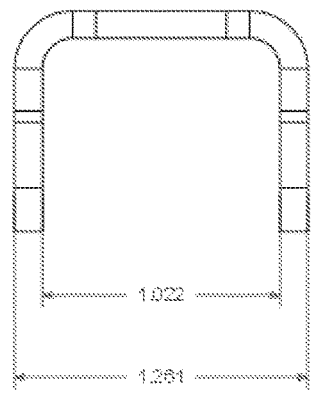
FIGS. 108-111 depict various views of the lumber rack bracket hinge.
Figure 109:
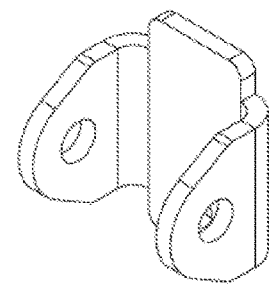
Figure 110:
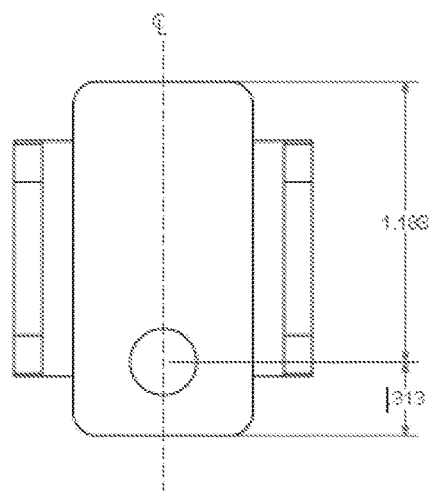
Figure 111:
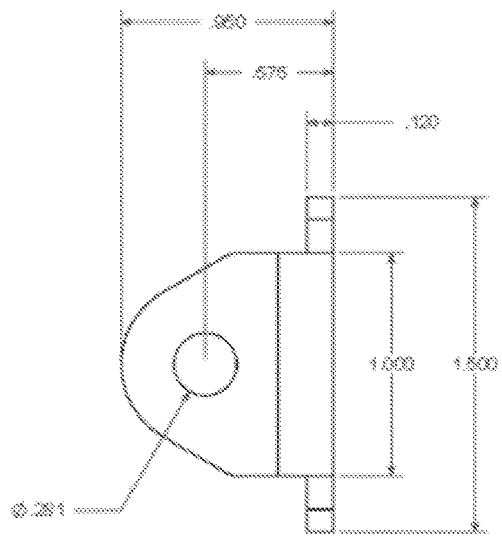
Figure 116:
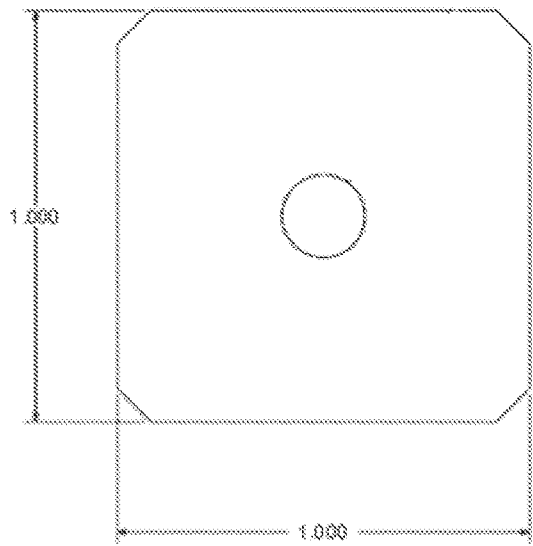
FIGS. 116-117 depict various views of the replacement tube insert.
Figure 117:
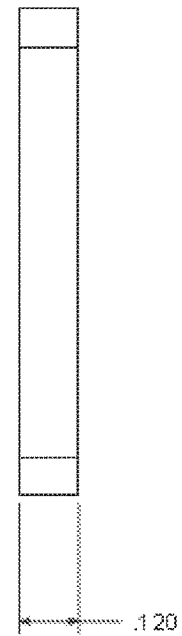
Figure 118:
FIGS. 118-126 depict various views of the tail gate.
Figure 119:
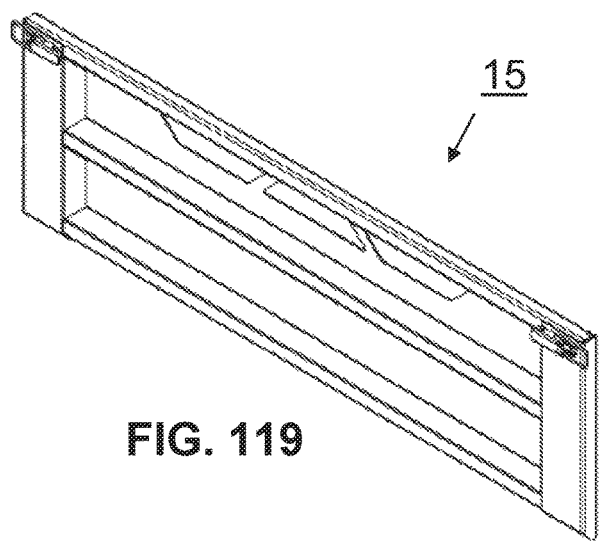
Figure 120:
Figure 121:
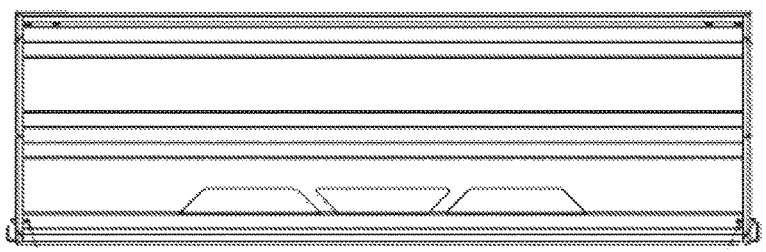
Figure 122:
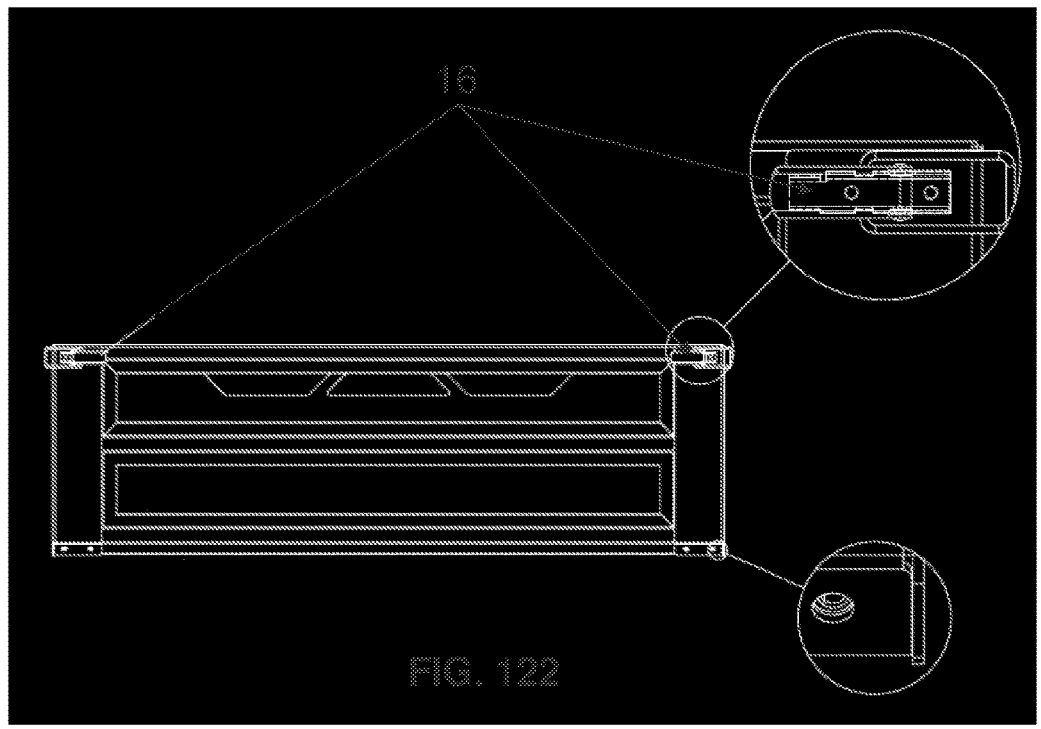
Figure 123:
Figure 124:
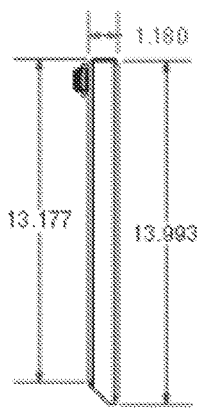
Figures 125, 126:
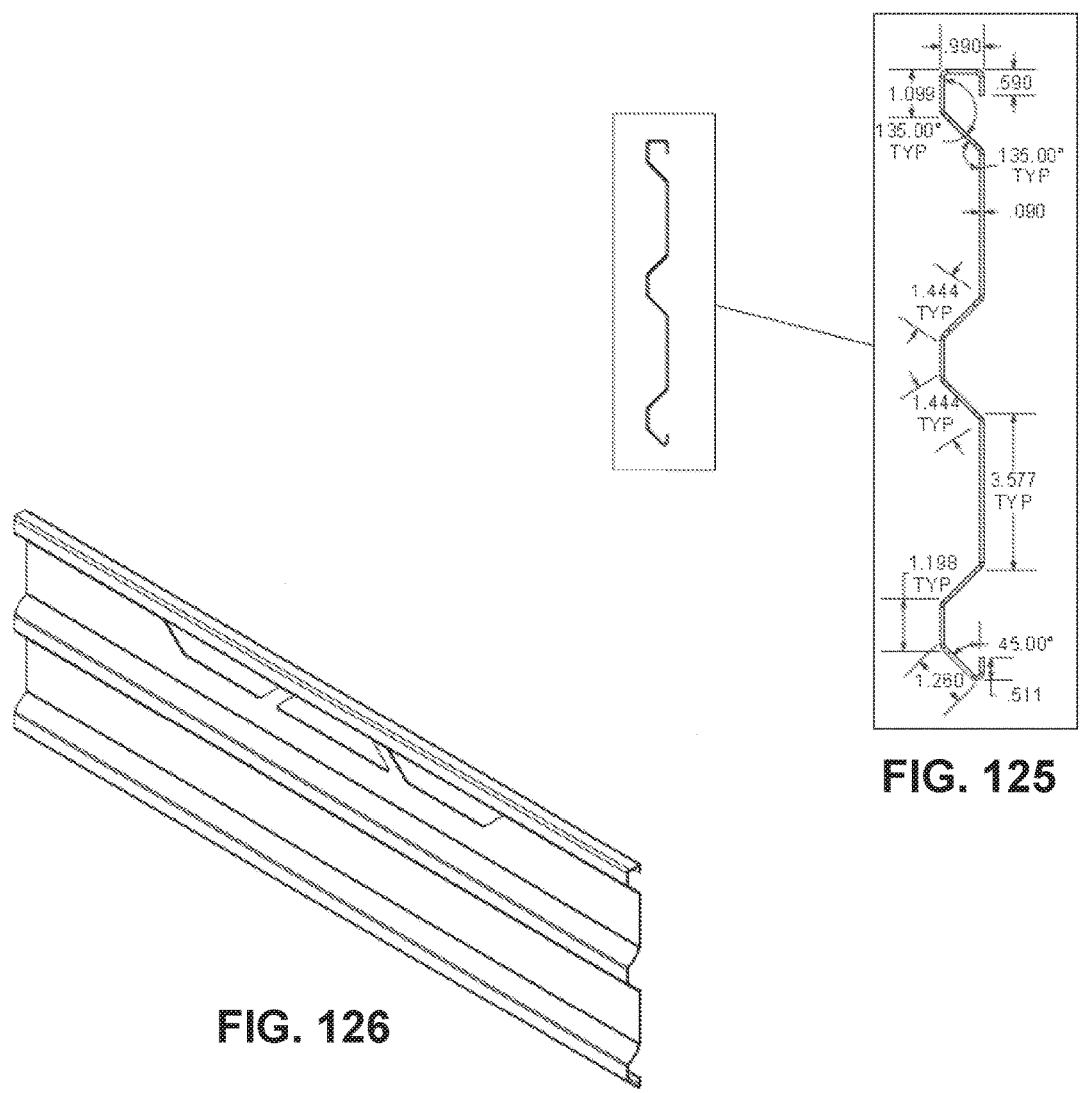
Figure 127:
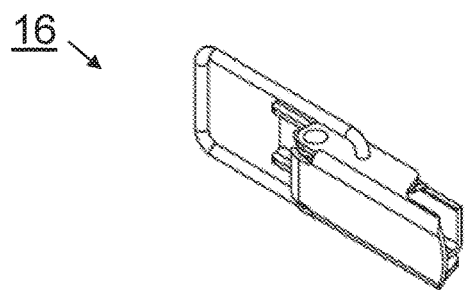
FIGS. 127-130 depict various views of the tail gate slide latch.
Figure 128:
Figure 129:
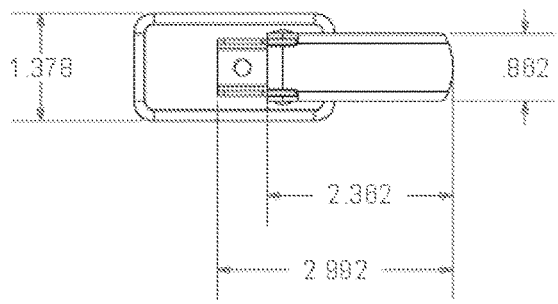
Figure 130:
Figure 131:
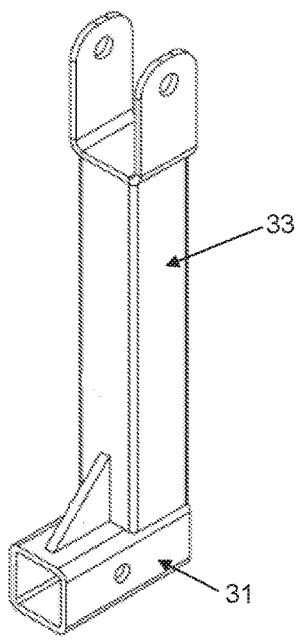
FIGS. 131-134 depict various views of the top link connector.
Figure 132:
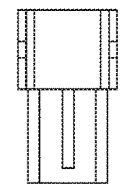
Figure 133:
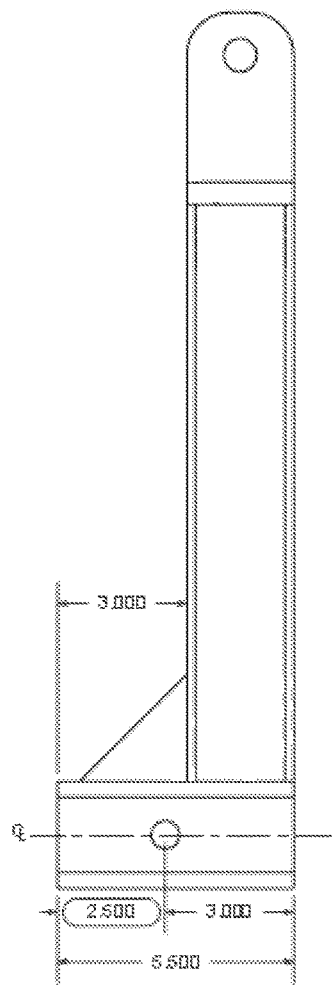
Figure 134:
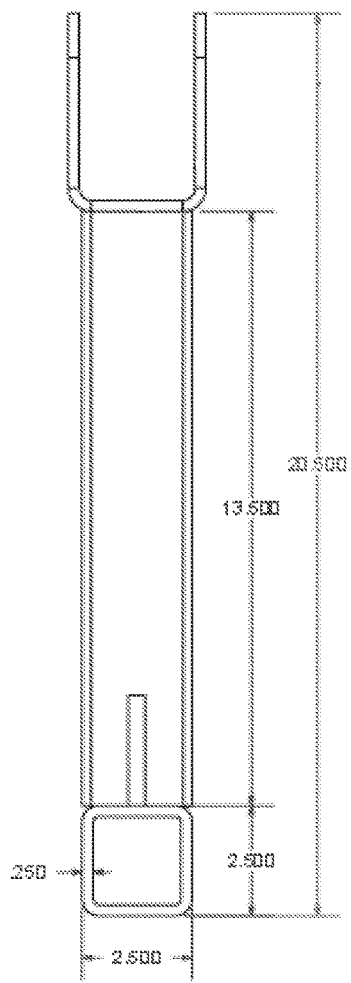
Figure 135:
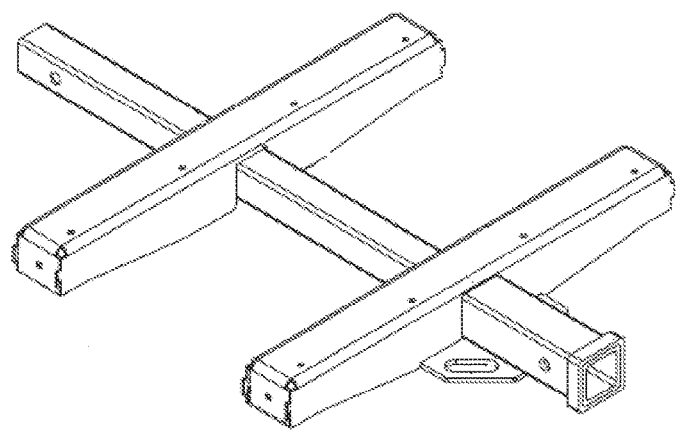
FIGS. 135-158 depict various views of the support spine with 3-point hitch assembly.
Figure 136:
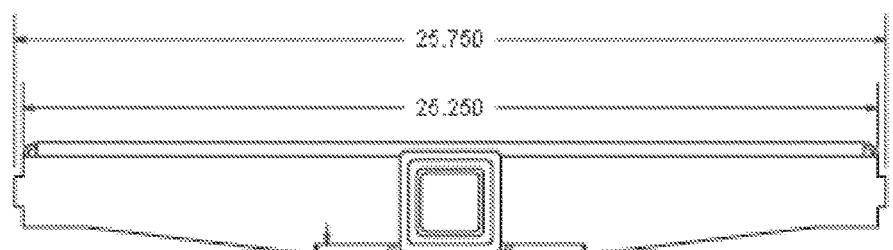
Figure 137:
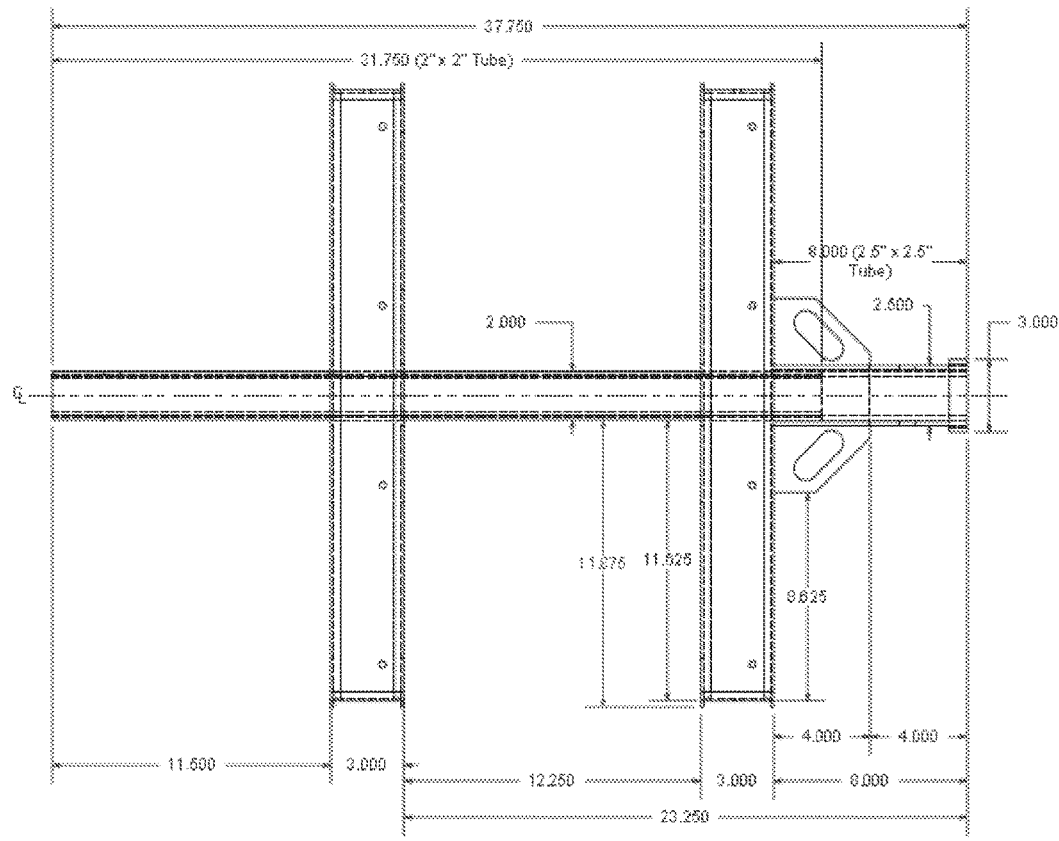
Figure 138:
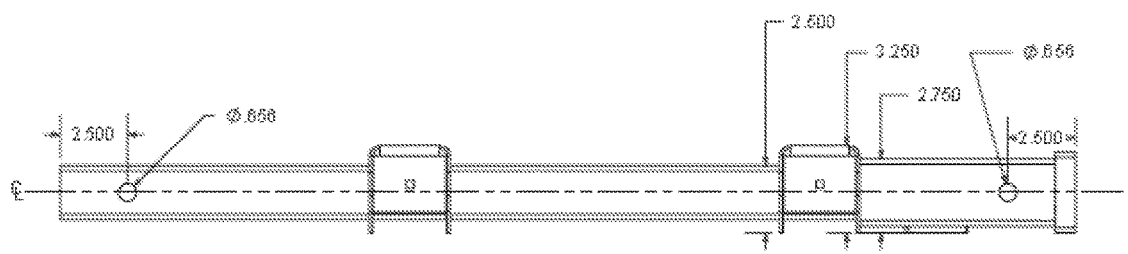
Figure 139:
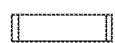
Figure 140:
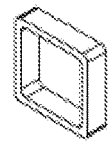
Figure 141:
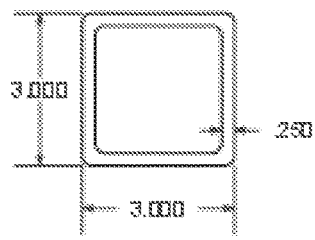
Figure 142:
Figure 143:
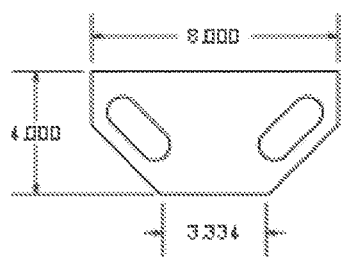
Figure 144:
Figure 145:
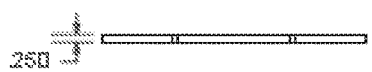
Figure 146:
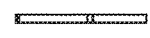
Figure 147:
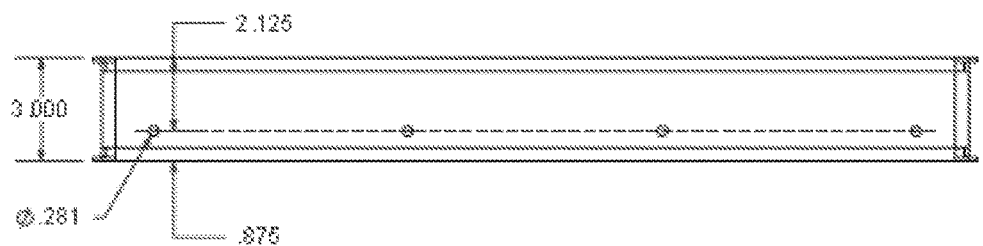
Figure 148:
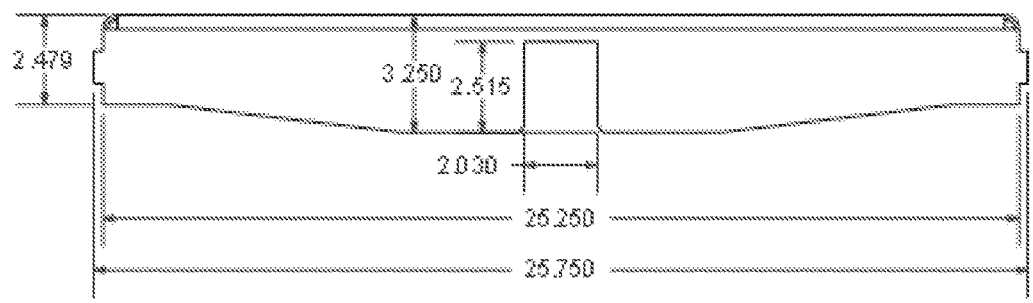
Figure 149:
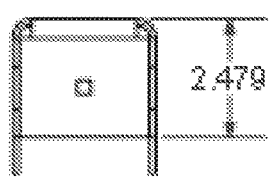
Figure 150:
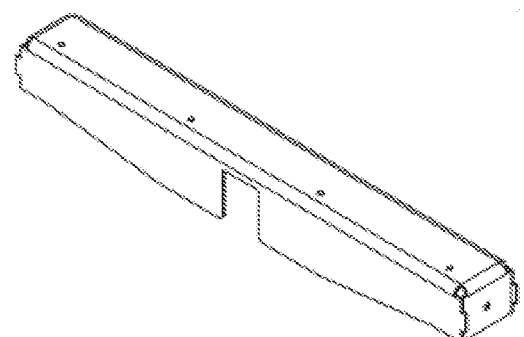
Figure 151:
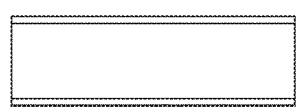
Figure 152:
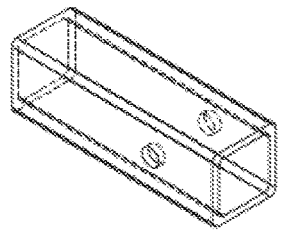
Figure 153:
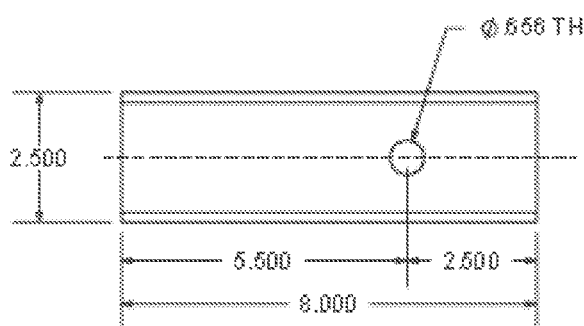
Figure 154:
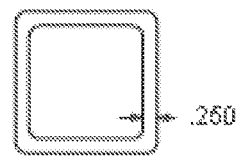
Figure 155:
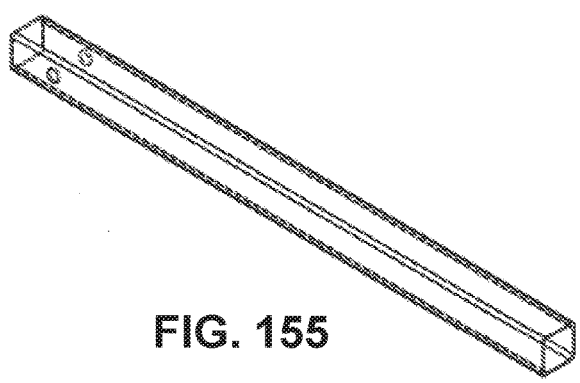
Figure 156:
Figure 157:
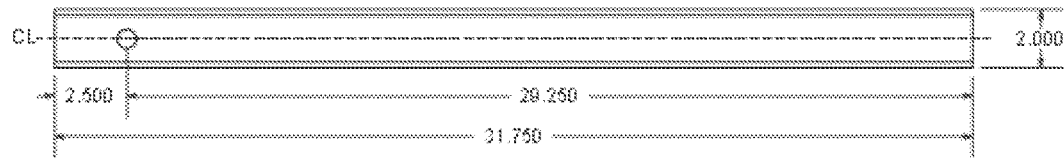
Figure 158:
Figure 159:
FIGS. 159-170 depict various views of the lateral tube.
Figure 160:
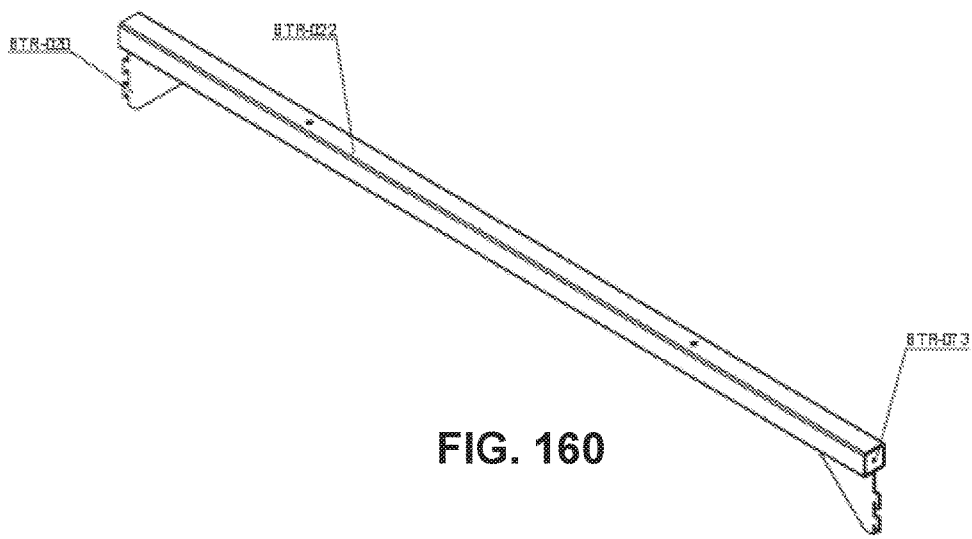
Figure 161:
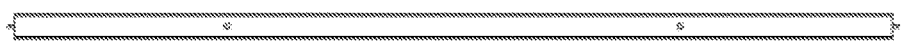
Figure 162:
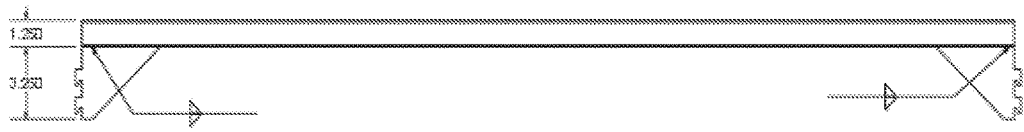
Figure 163:
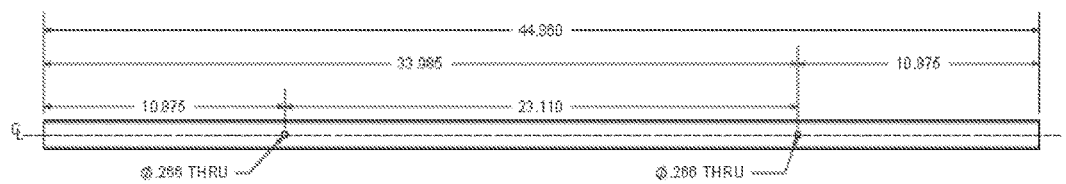
Figure 164:
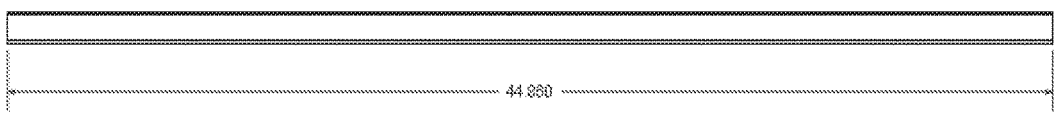
Figure 165:
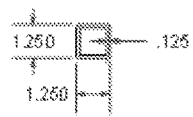
Figure 166:
Figure 167:
Figure 168:
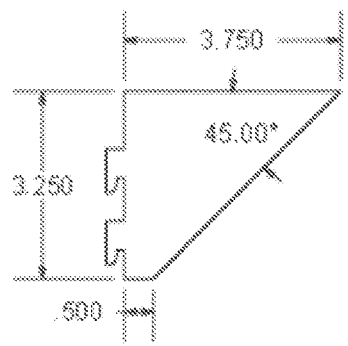
Figure 169:
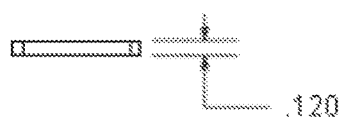
Figure 170:
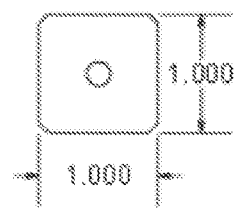
Figure 171:
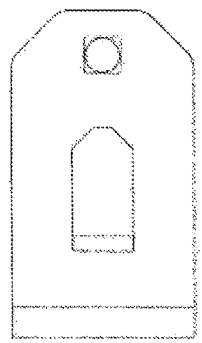
Figure 172:
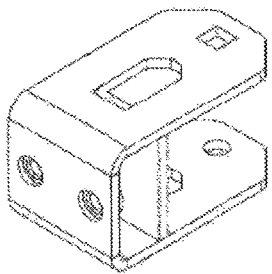
Figure 173:
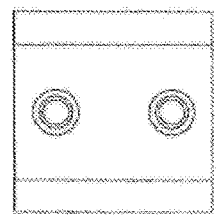
Figure 174:
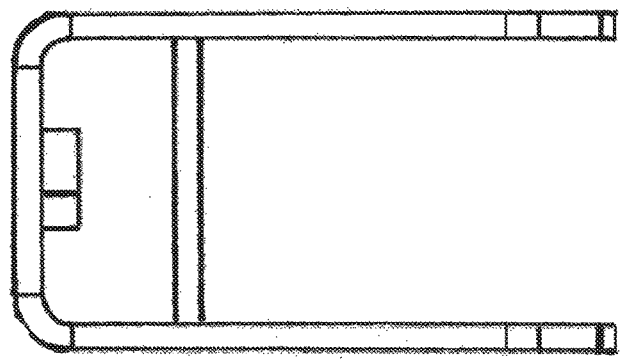
Figure 175:
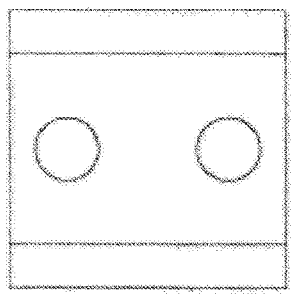
Figure 176:
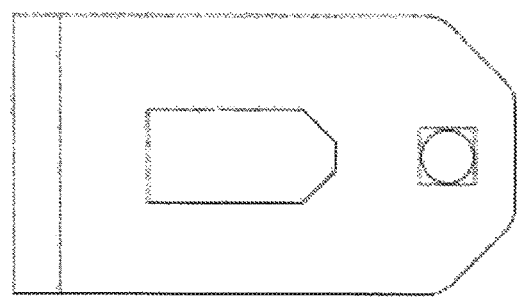
Figure 177:
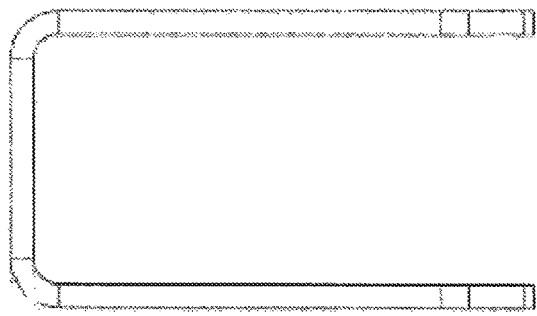
Figure 178:
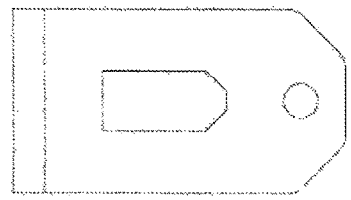
Figure 185:
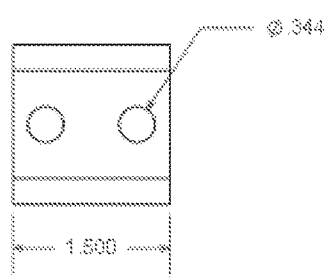
Figure 186:
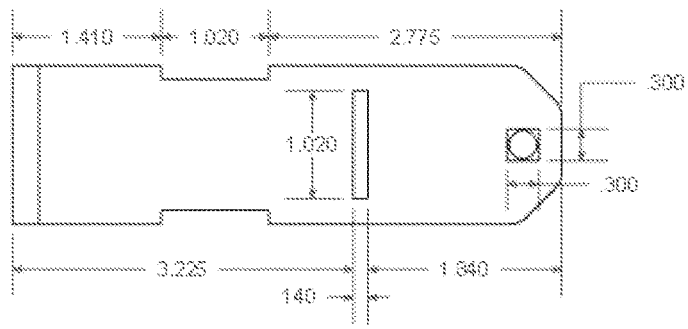
Figure 187:
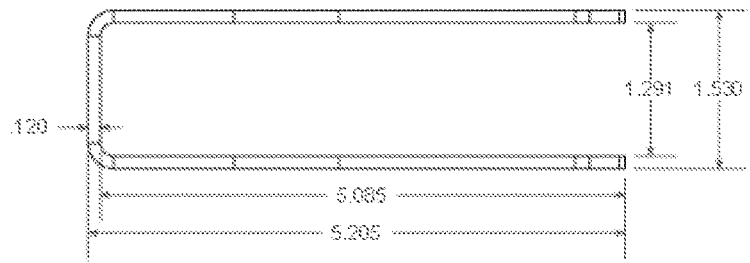
Figure 188:
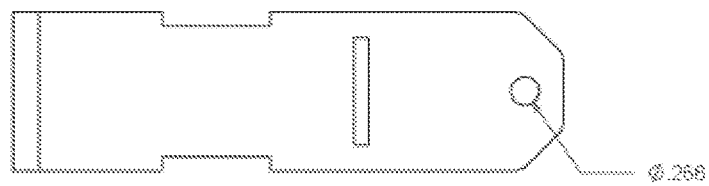
Figure 189:
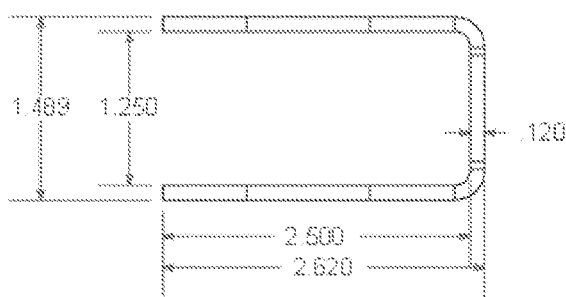
Figure 190:
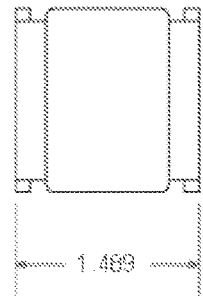
Figure 191:
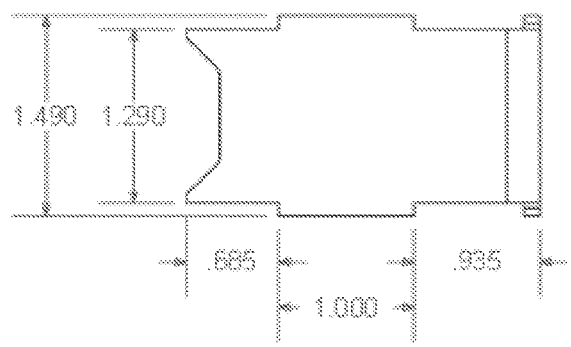
Figure 192:
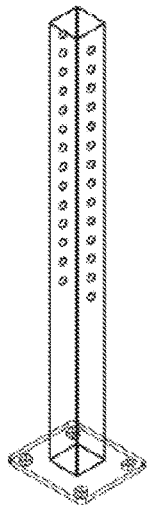
FIGS. 192-200 depict various views of the wheel legs.
Figure 193:
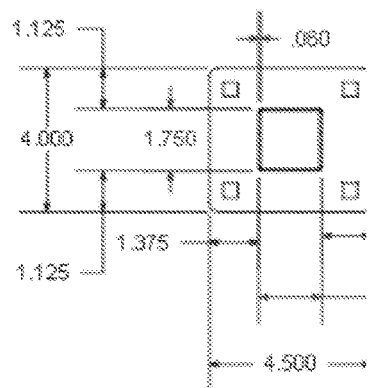
Figure 194:
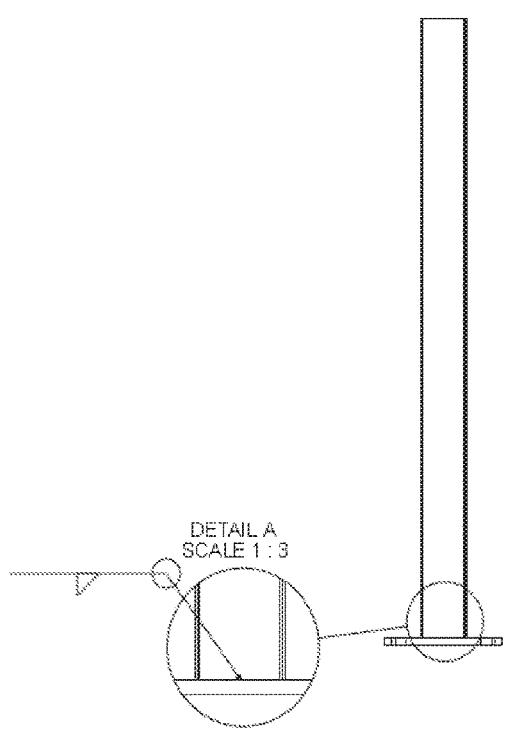
Figure 195:
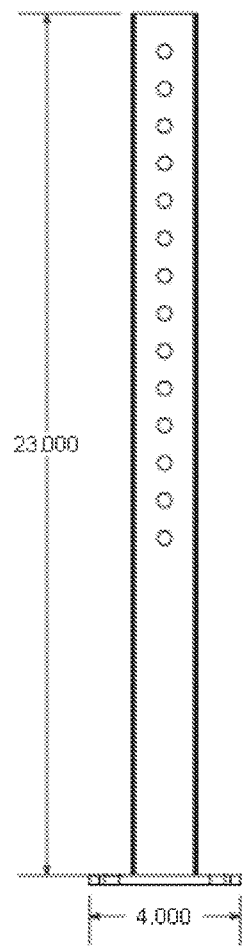
Figure 196:
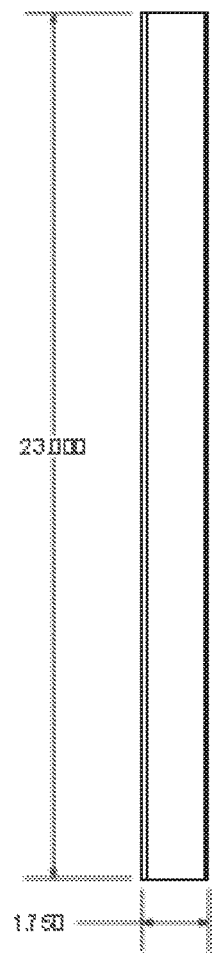
Figure 197:
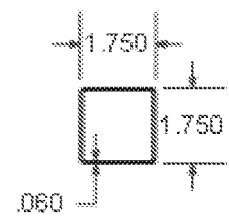
Figure 198:
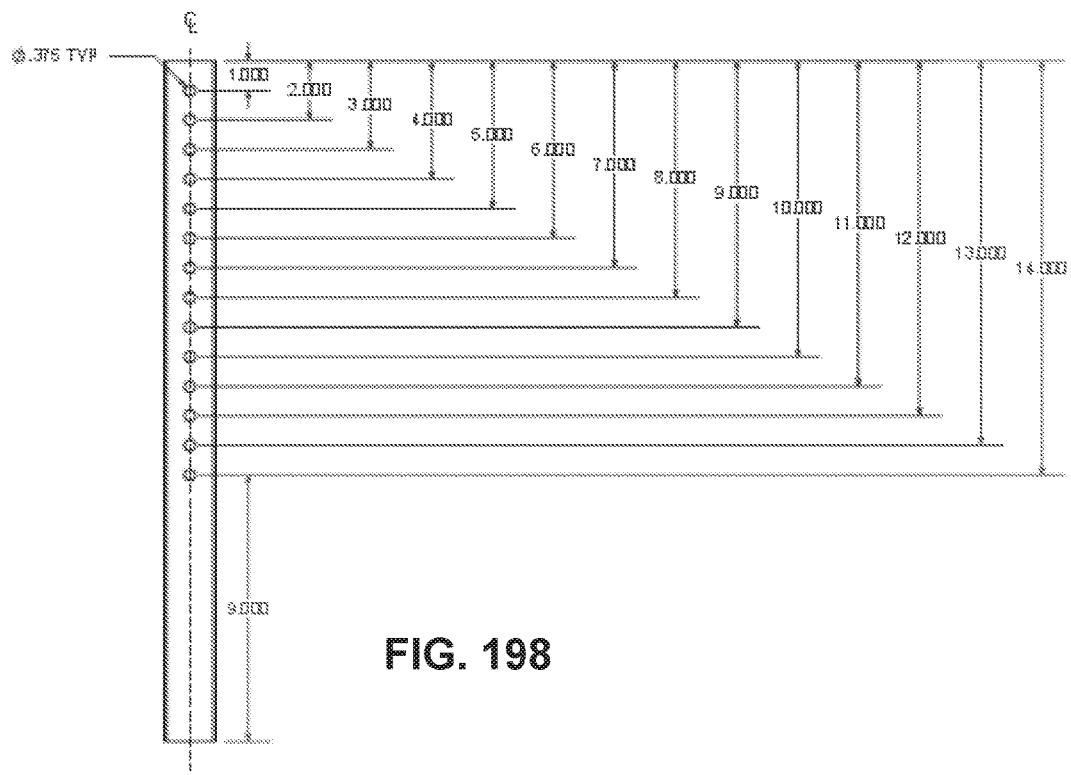
Figure 199:
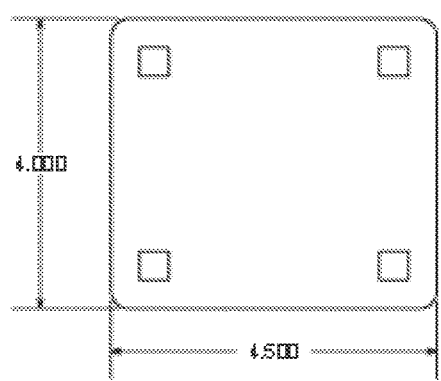
Figure 200:
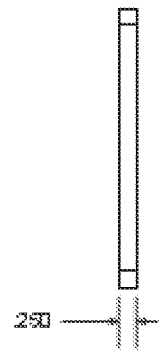
Figure 201:
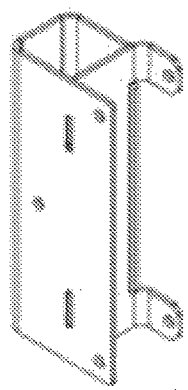
FIGS. 201-214 depict various views of the wheel assembly bracket.
Figure 202:
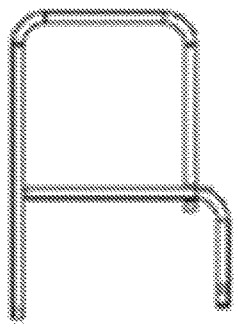
Figure 203:
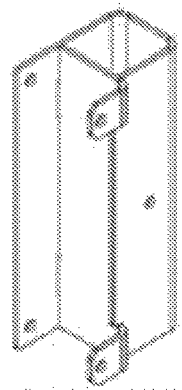
Figure 204:
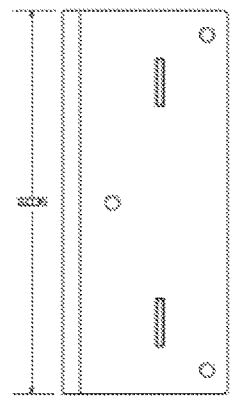
Figure 205:
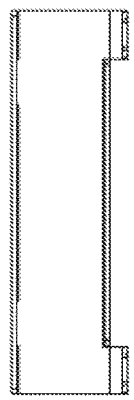
Figure 206:
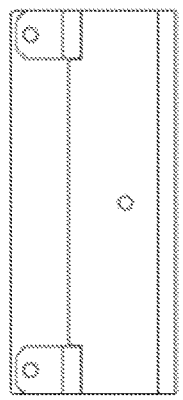
Figure 207:
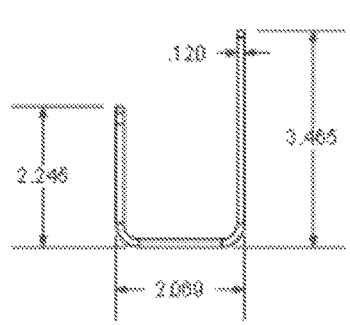
Figure 208:
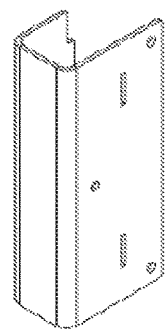
Figure 209:
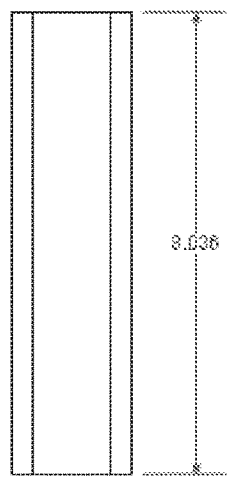
Figure 210:
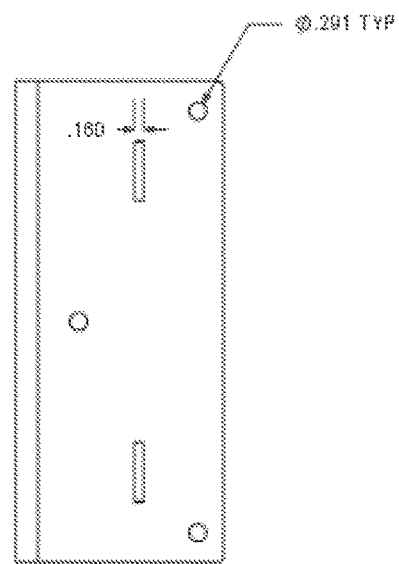
Figure 211:
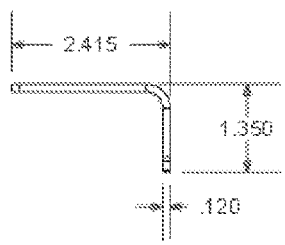
Figure 212:
Figure 213:
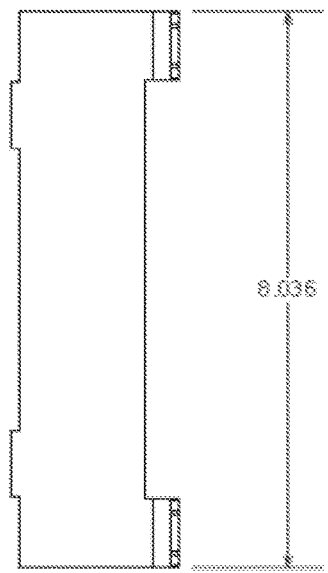
Figure 214:
Figure 215:
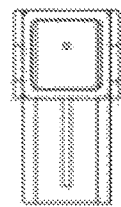
FIGS. 215-230 depict various views of the top link connector including hold for weight bracket.
Figure 216:
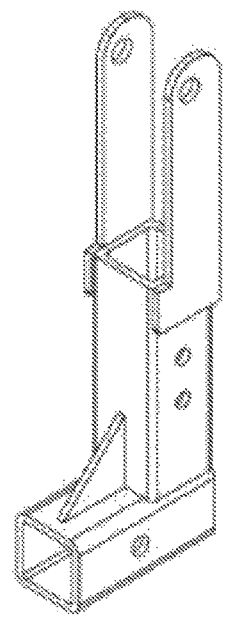
Figure 217:
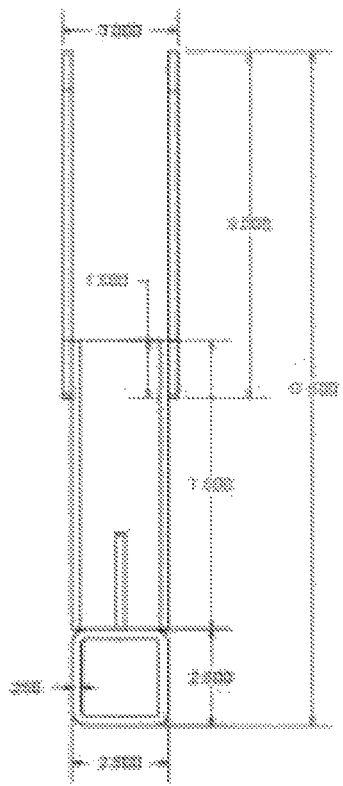
Figure 218:
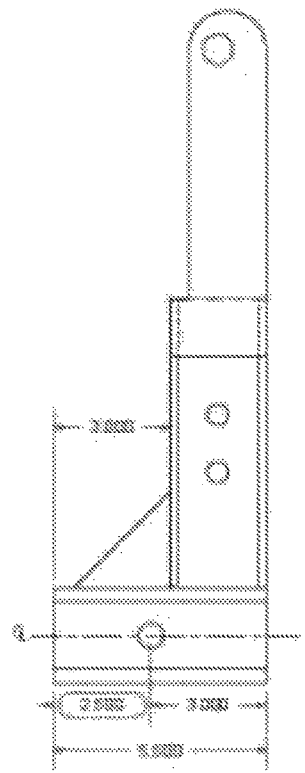
Figure 219:
Figure 220:
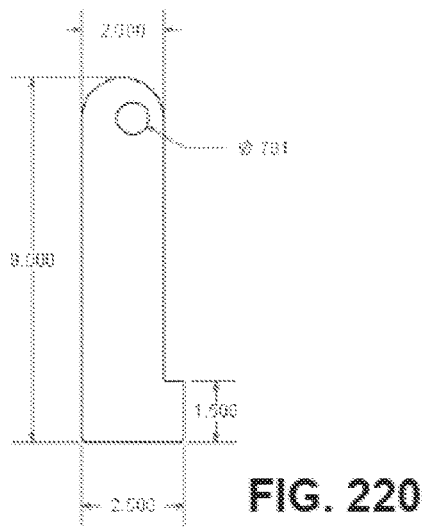
Figure 221:
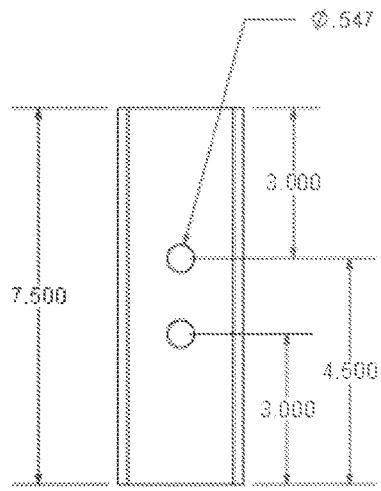
Figure 222:
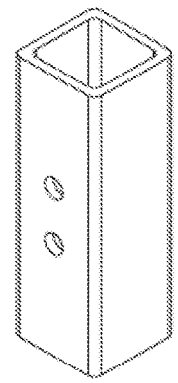
Figure 223:
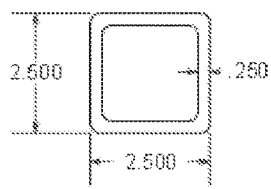
Figure 224:
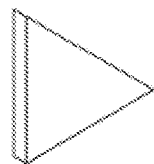
Figure 225:
Figure 226:
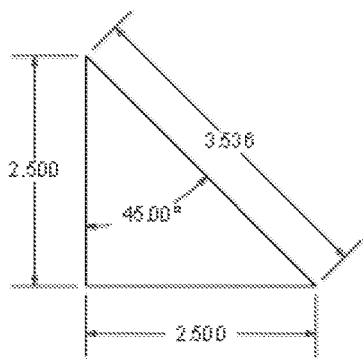
Figure 227:
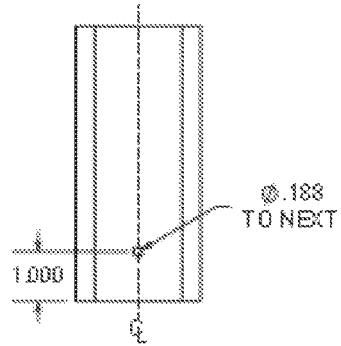
Figure 228:
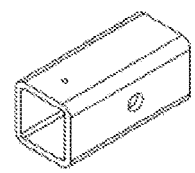
Figure 229:
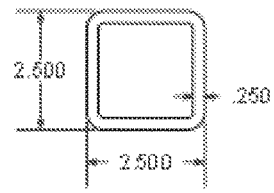
Figure 230:
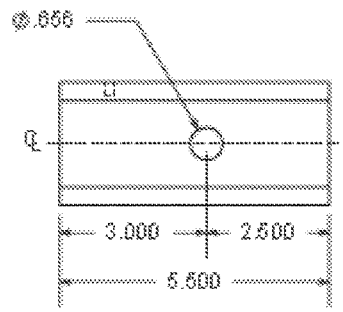
Figure 231:
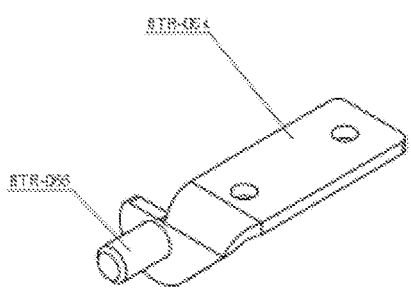
FIGS. 231-240 depict various views of the hinge pin and plate.
Figure 233:
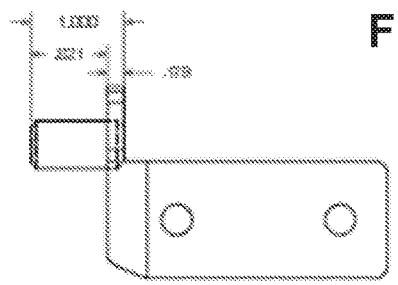
Figure 232:
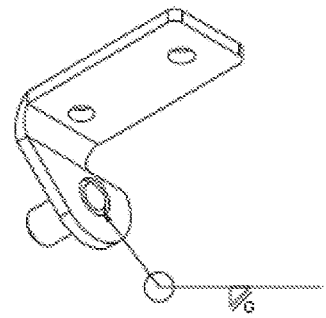
Figure 234:
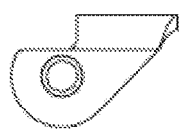
Figure 235:
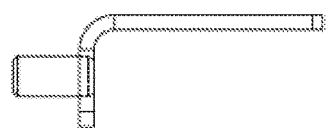
Figure 236:
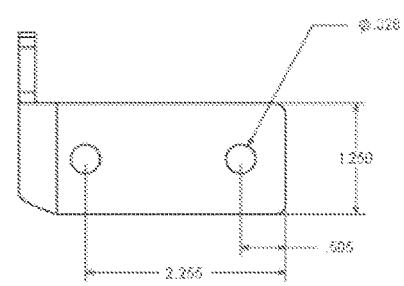
Figure 237:
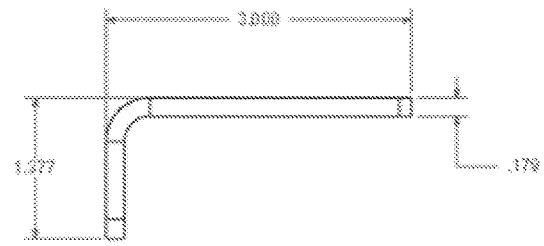
Figure 238:
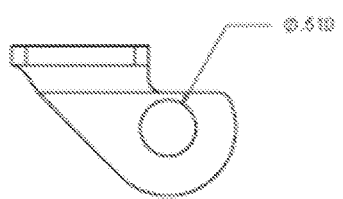
Figure 239:
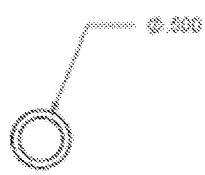
Figure 240:
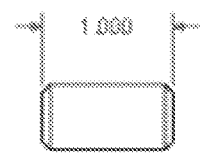
Figure 241:
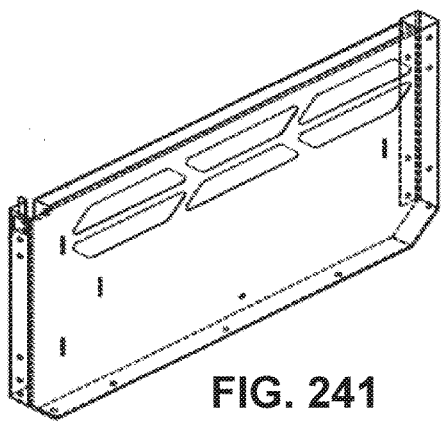
Figures 242, 243:
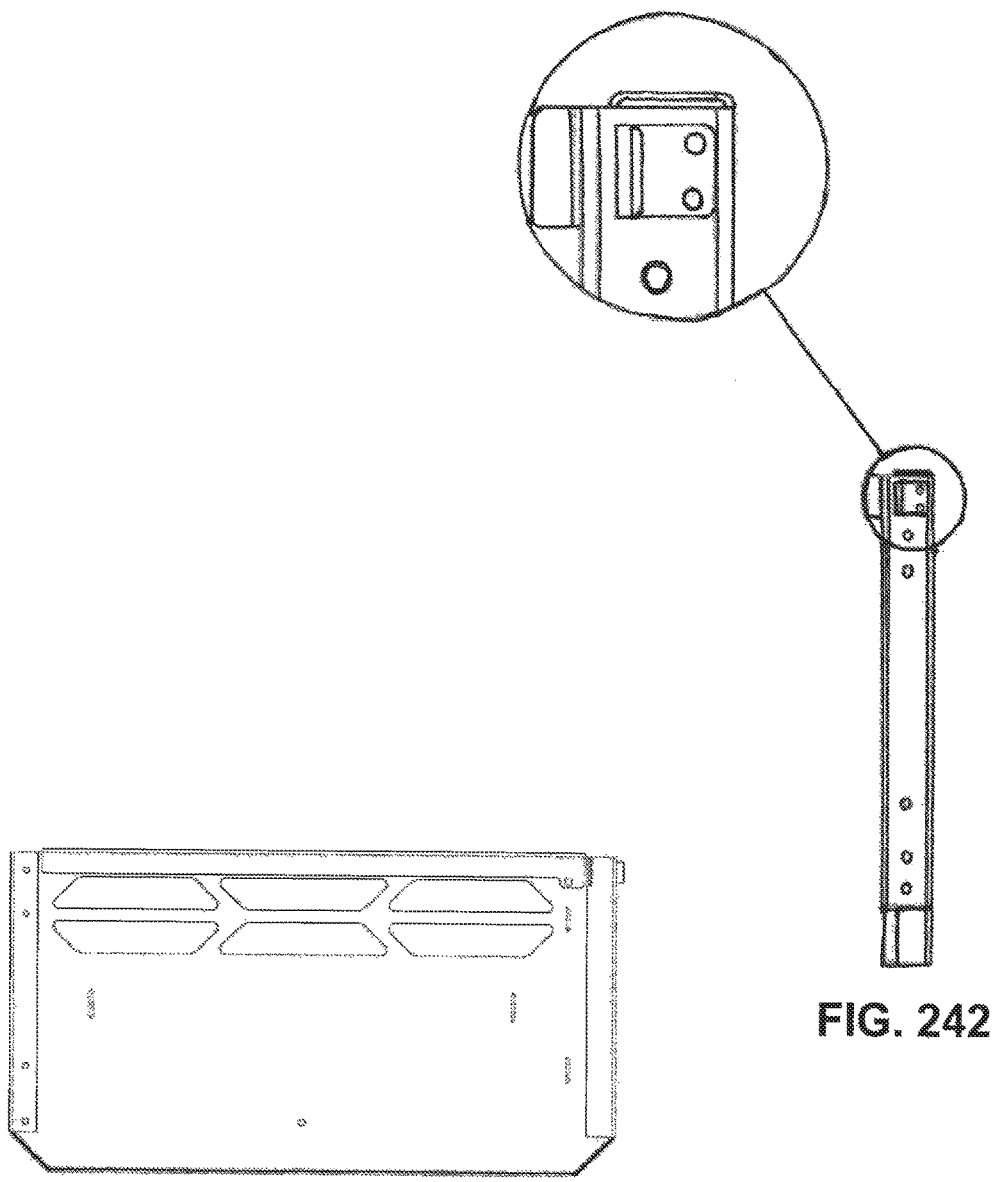
Figure 244:
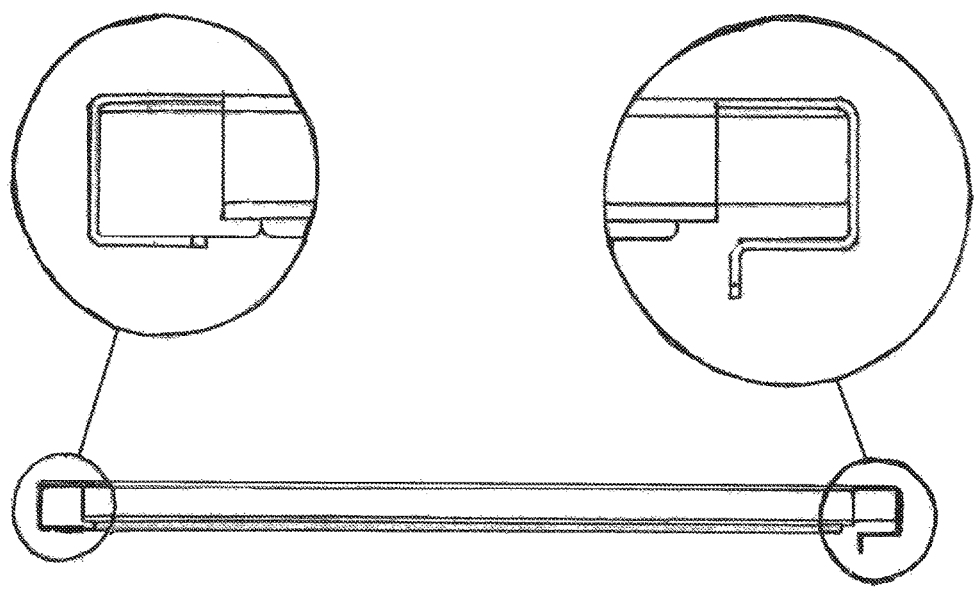
Figure 249:
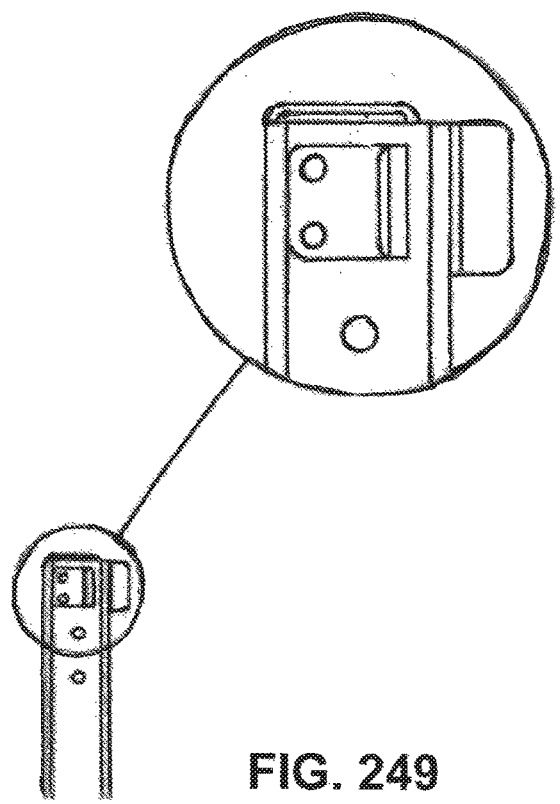
Figure 250:
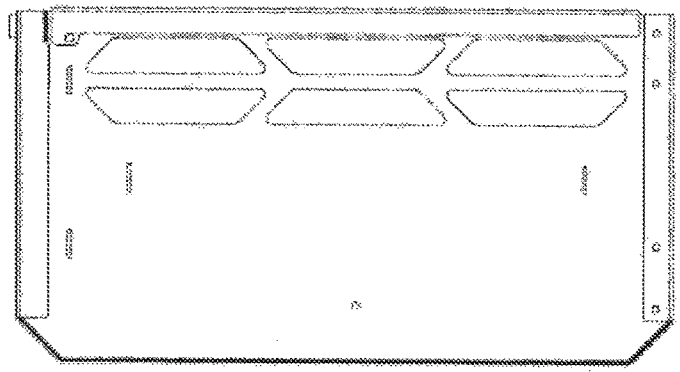
Figure 251:
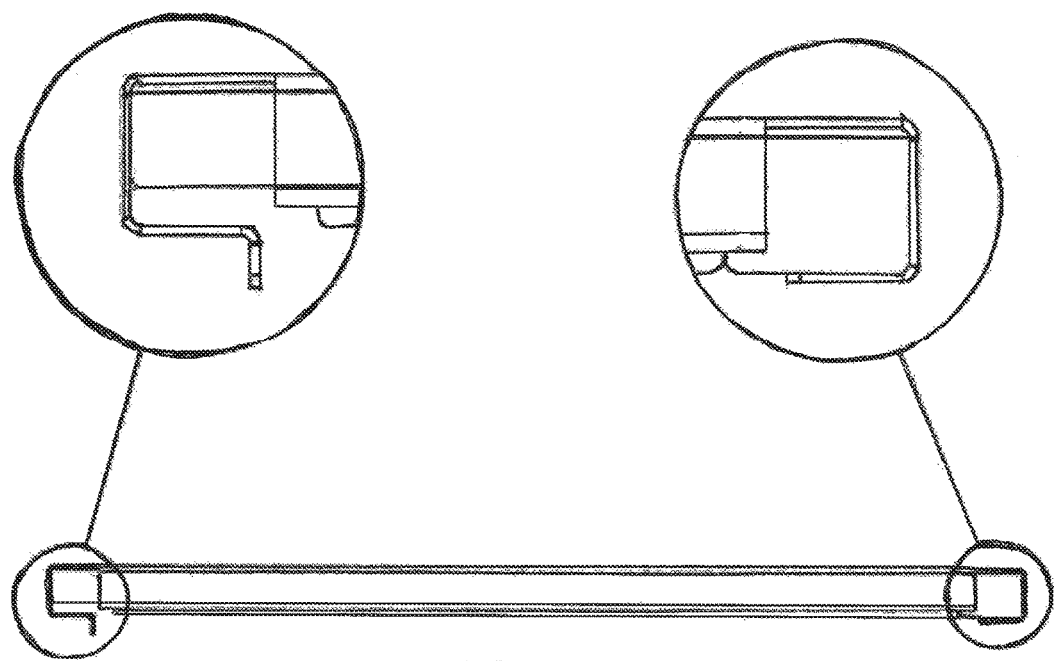
Figure 252:
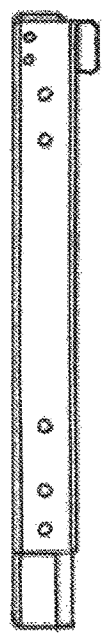
Figure 253:
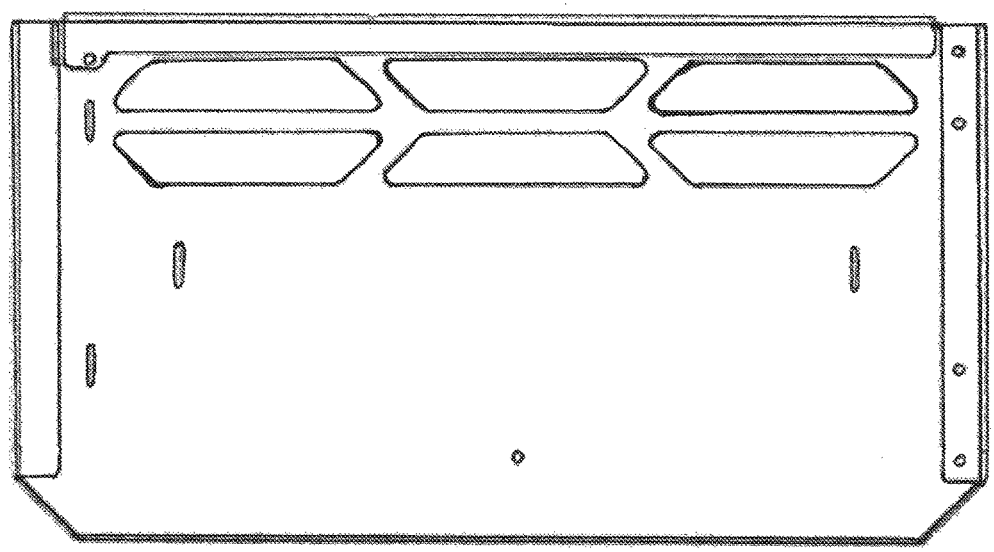
Figure 254:
Figure 255:
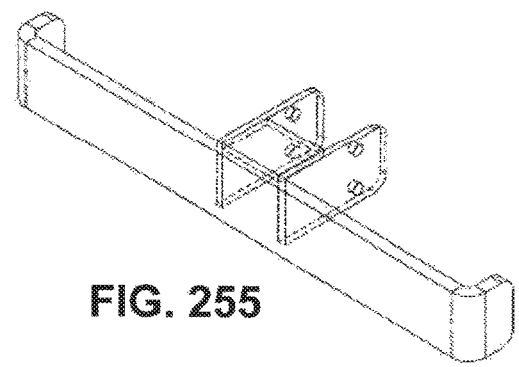
FIGS. 255-266 depict various views of the weighted cross beam accessory.
Figure 256:
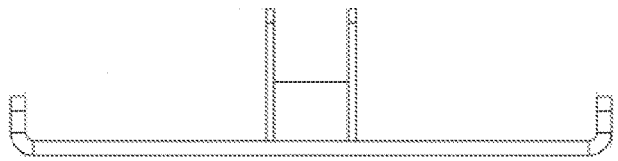
Figure 257:
Figure 258:
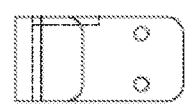
Figure 259:
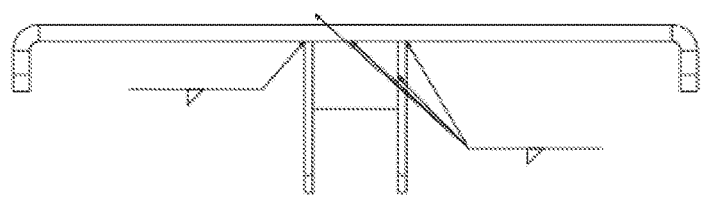
Figure 260:
Figure 261:
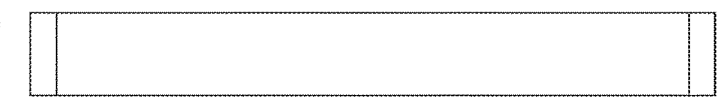
Figure 262:
Figure 263:
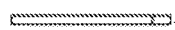
Figure 264:
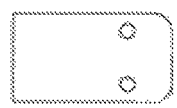
Figure 265:
Figure 266:
Figure 267:
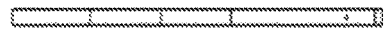
Figure 268:
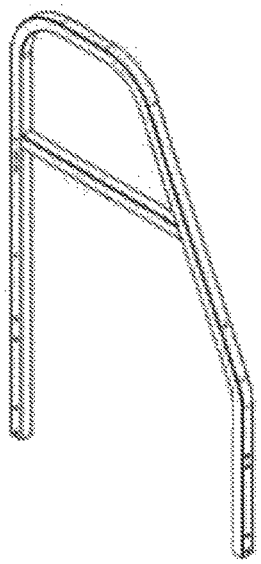
Figure 269:
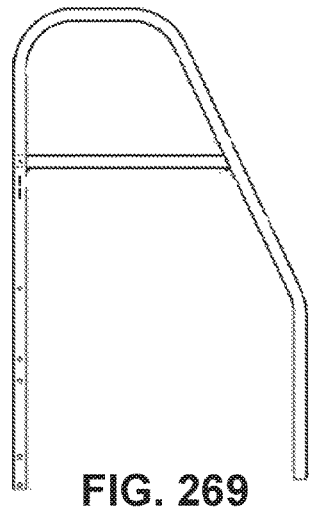
Figure 270:
Figure 271:
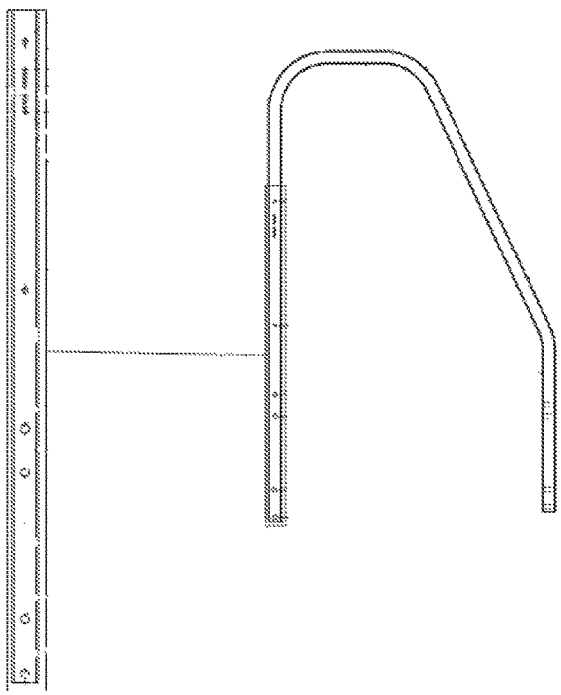
Figure 272:
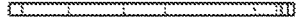
Figure 273:
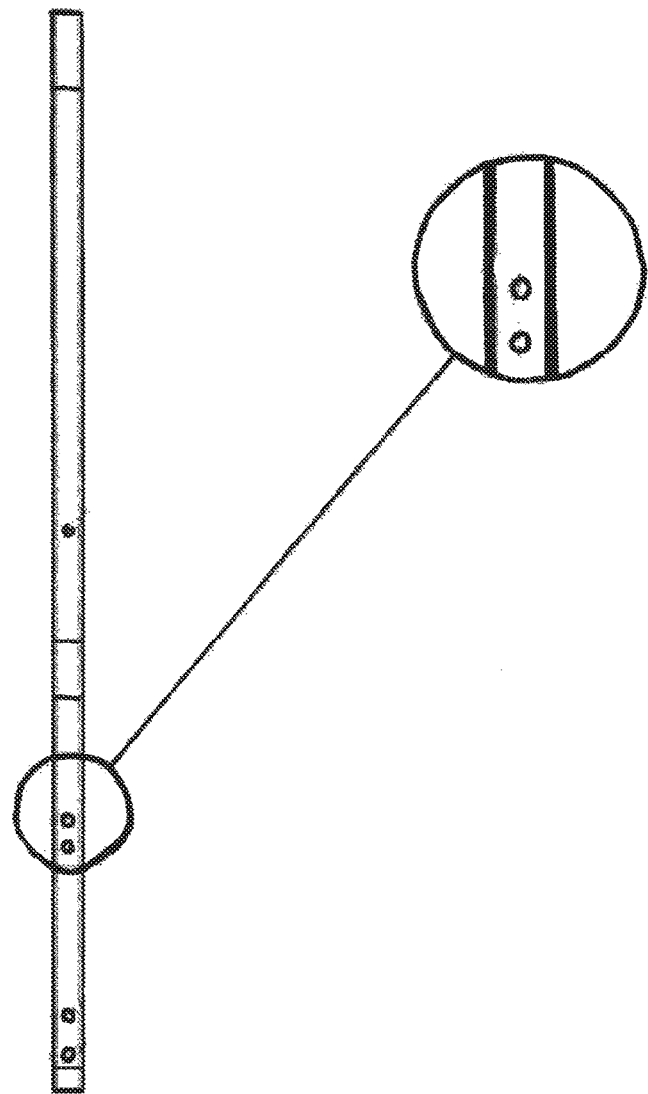
Figure 284:
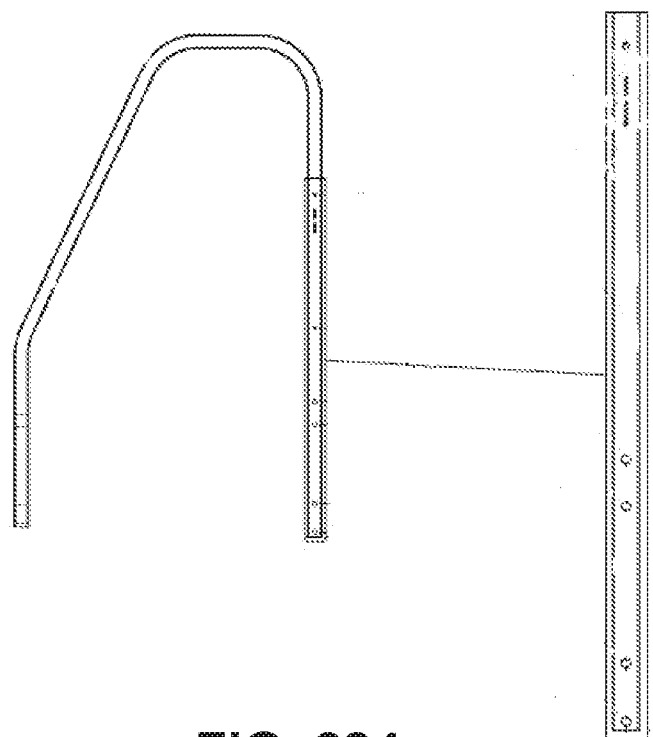
Figure 285:
Figure 286:
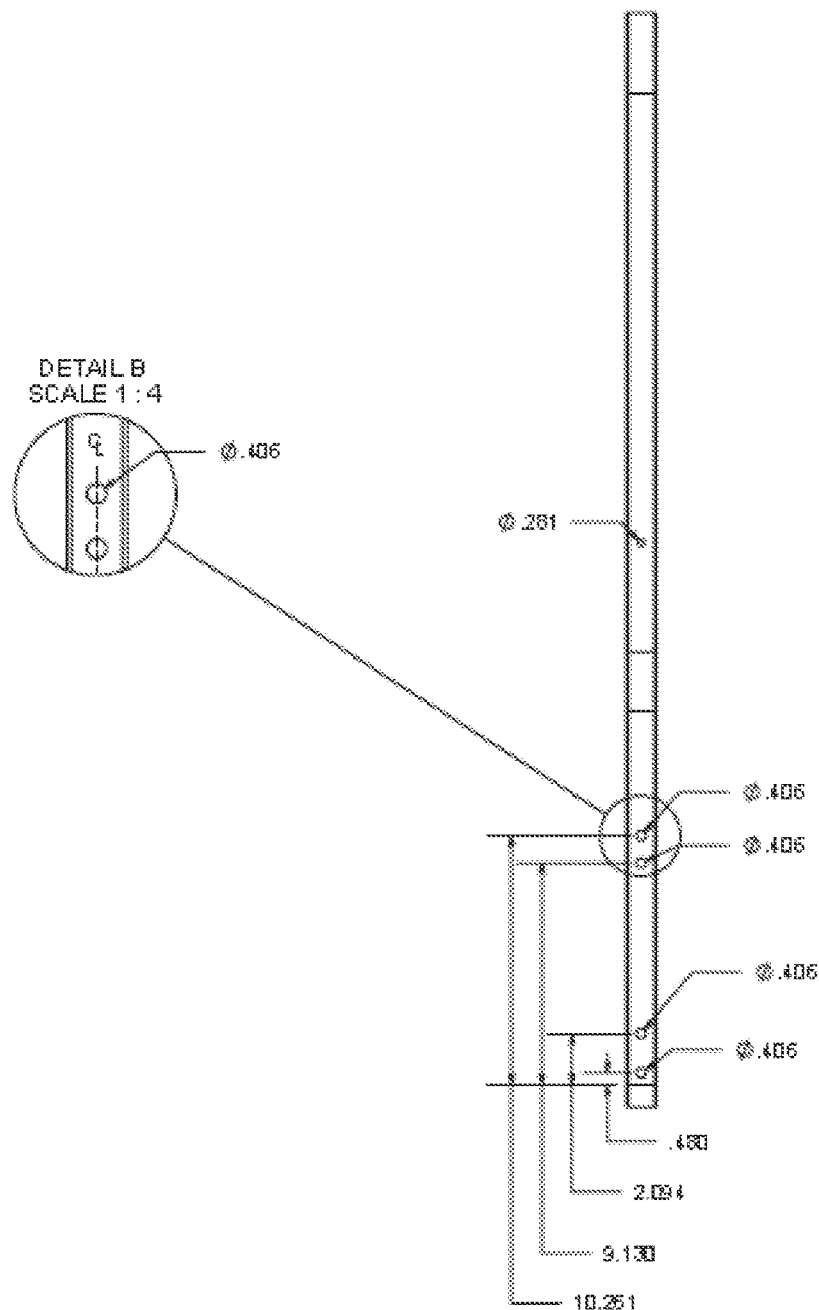
Figure 287:
Figure 288:
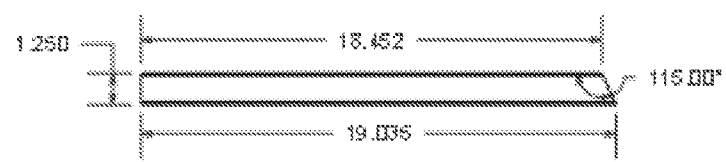
Figure 289:
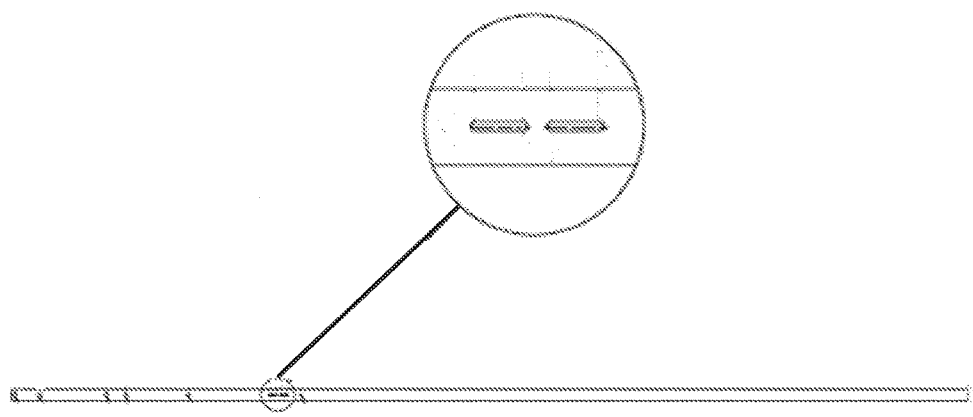
Figure 290:
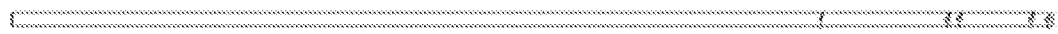

FIG. 63 depicts maximum payloads equal to 320 lbf (static), unevenly distributed. Although it is difficult to predict how the rack will be loaded, the rack will handle 4 bags of cement or 8 concrete blocks when subjected to 2 times G (gravity).

Figure 7:
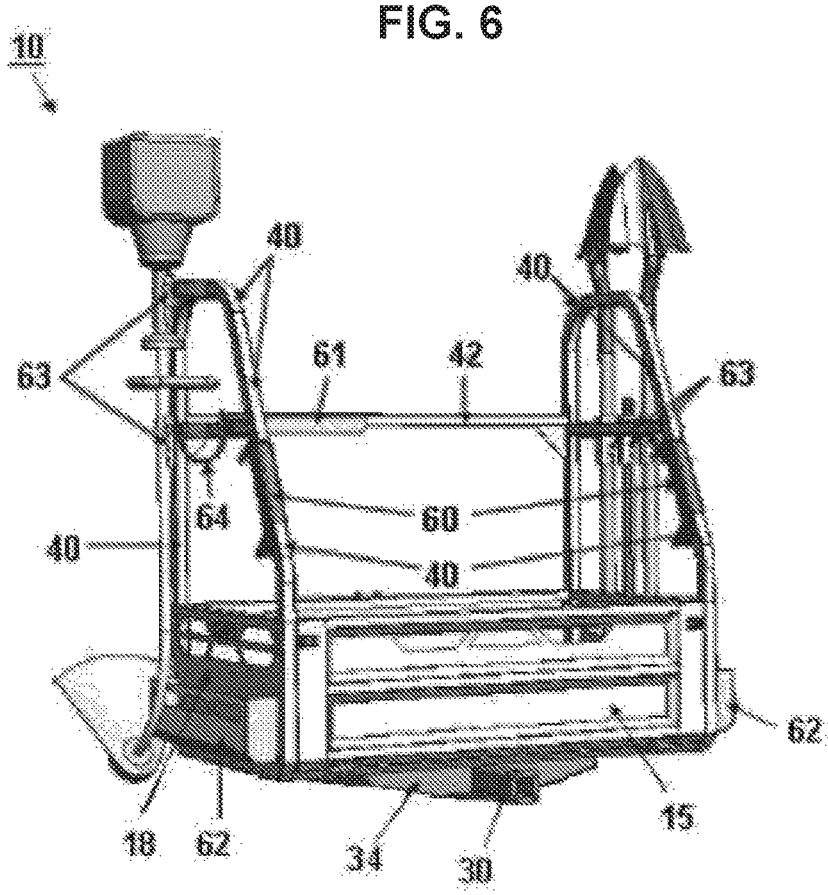
FIG. 7 depicts an embodiment of the invention in use, with tools attached to main frame using removable rack accessories, and with lumber carrier accessory shown in the retracted position.
Figure 8:
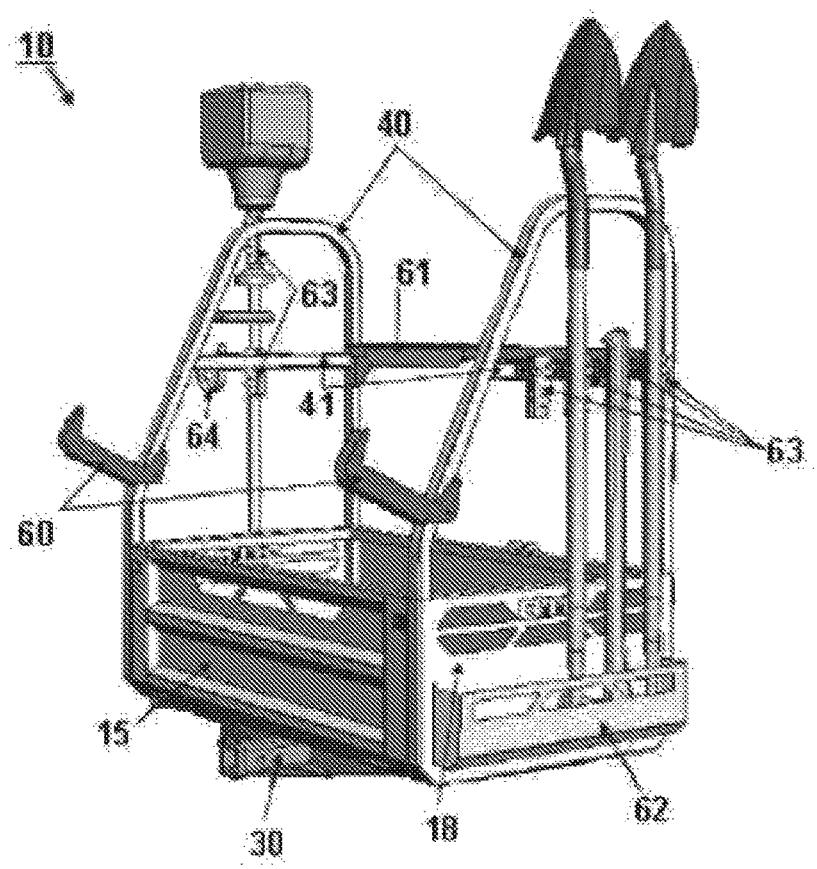
FIG. 8 depicts the same embodiment of the invention from FIG. 7 in use, with tools attached to main frame using removable rack accessories, and with lumber carrier accessory shown in the engaged position.
Figure 9:
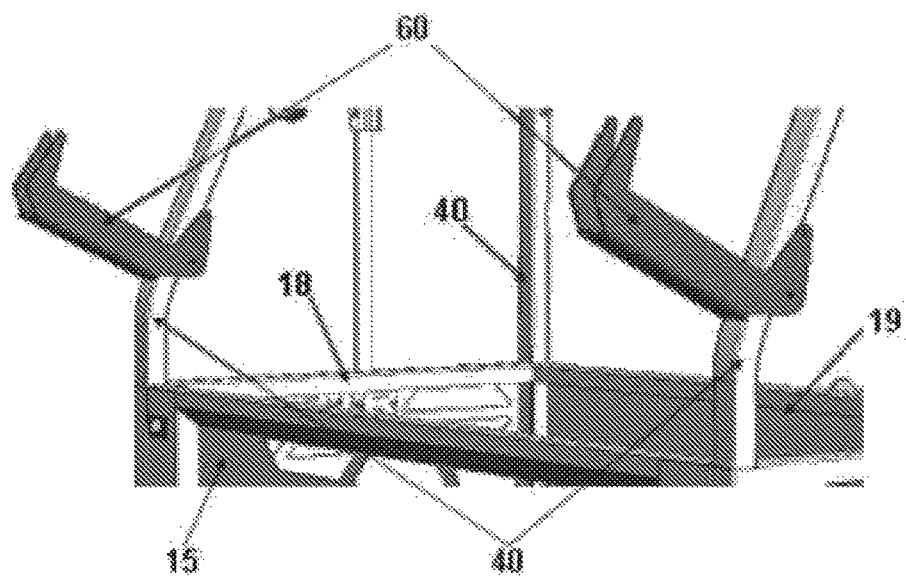
FIG. 9 is a close-up view of the embodiment of the invention from FIG. 7 depicting the lumber carrier accessory attached to the main frame in the engaged position.
Figure 10:
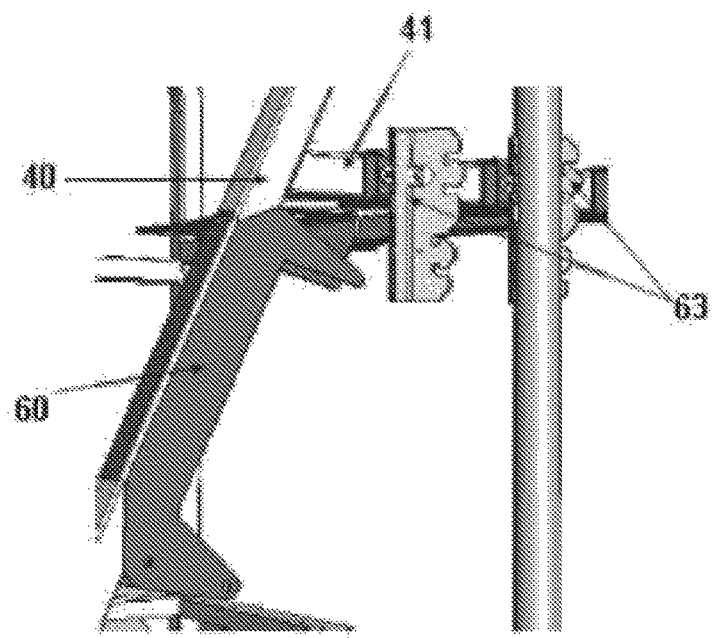
FIG. 10 is a close-up view of the embodiment of the invention from FIG. 7 depicting a strap tool bracket attached to the main frame, and the lumber carrier accessory attached in the retracted position.
Figure 11:
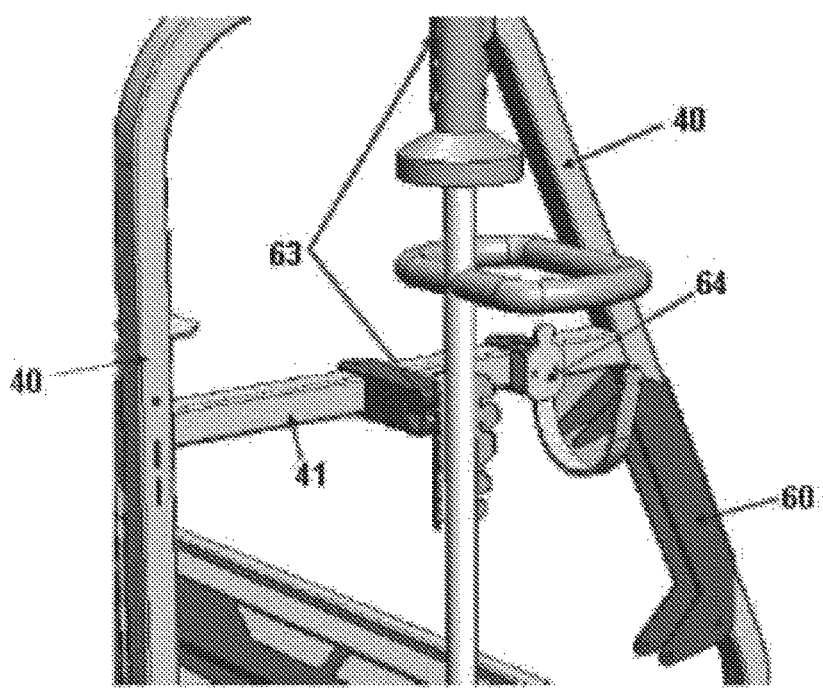
FIG. 11 is a close-up view of the embodiment of the invention from FIG. 7 depicting a J hook bracket attached to the main frame, in conjunction with strap tool brackets in use and the lumber carrier accessory in the retracted position.
Figure 12:
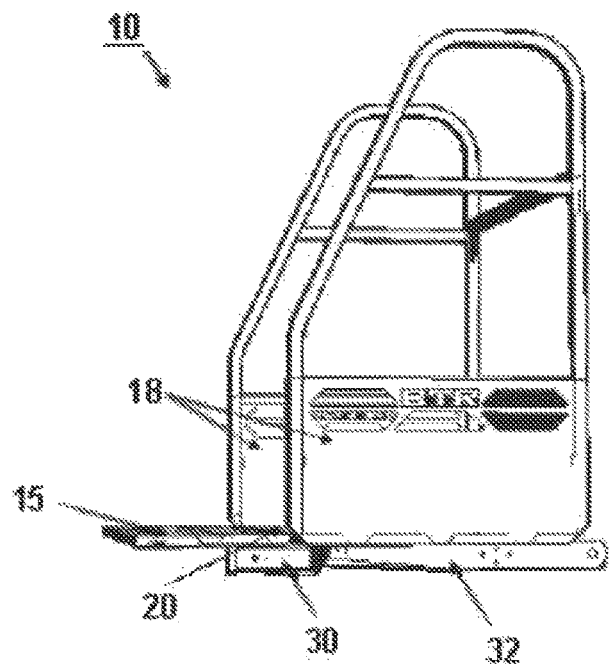
FIG. 12 is a close-up view of the embodiment of the invention from FIG. 7 depicting a ring tool bracket attached to the main frame, in conjunction with strap tool brackets and a J hook bracket.

As can be seen in FIGS. 7-12, and 29-34, a variety of add-on brackets and holders may be added to rack assembly 10 in order to customize the device according to the needs of the user. Examples of add-ons include lumber bracket 60, ring tool bracket 61, side bin bracket 62, strap tool bracket 63, J hook bracket 64, and chain saw holder (unnumbered in FIGS. 29, 30, 31 and 34). As shown in FIG. 7, cross bar 42 may also be used, which adds additional structural integrity to the device and provides an attachment site for additional add-ons.

Figure 15:
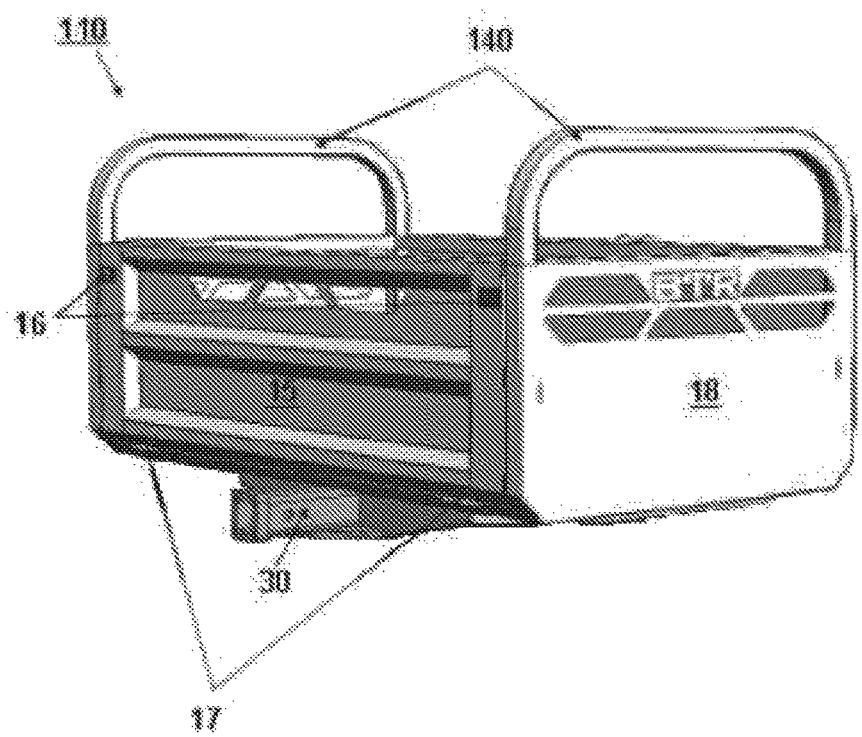
FIG. 15 depicts a first alternative embodiment of the present invention.

FIG. 15 depicts alternative rack assembly 110, having alternative rail tube 140, which is substantially rectangular in shape.

Figure 14:
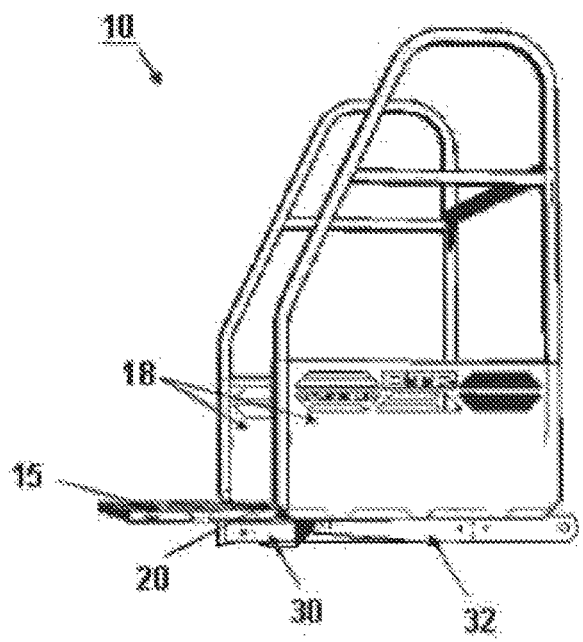
FIG. 14 depicts a side perspective view of the same embodiment of the invention from FIG. 1, with the pivoting tail gate in the open position.
Figure 16:
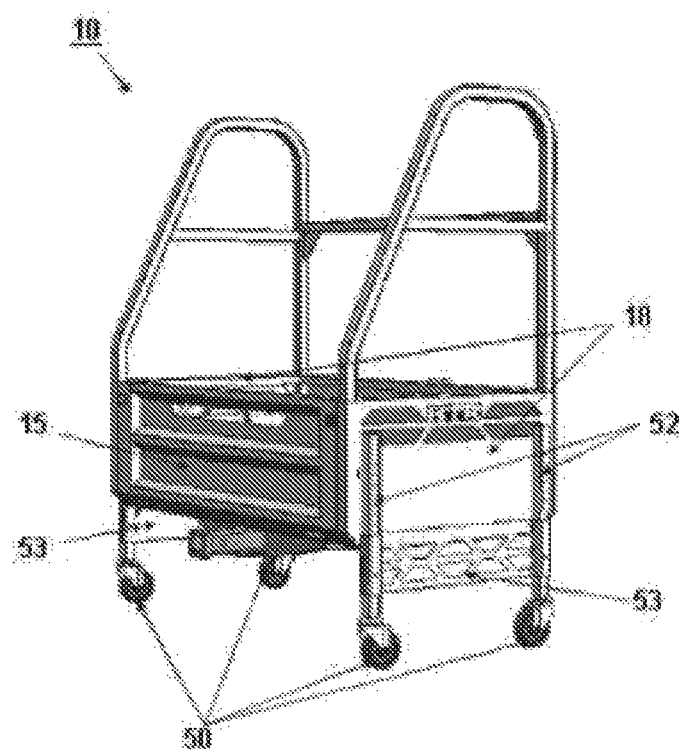
FIG. 16 depicts a perspective view of the same embodiment of the invention from FIG. 1, with wheels attached.
Figure 17:
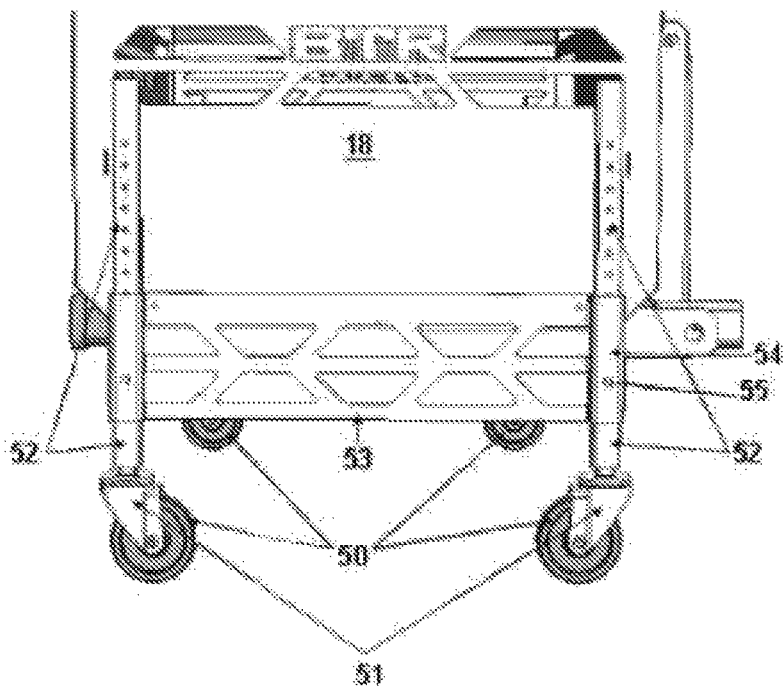
FIG. 17 is a close-up view of the embodiment of the invention from FIG. 16 depicting the wheels and associated attachment means.
Figure 18:
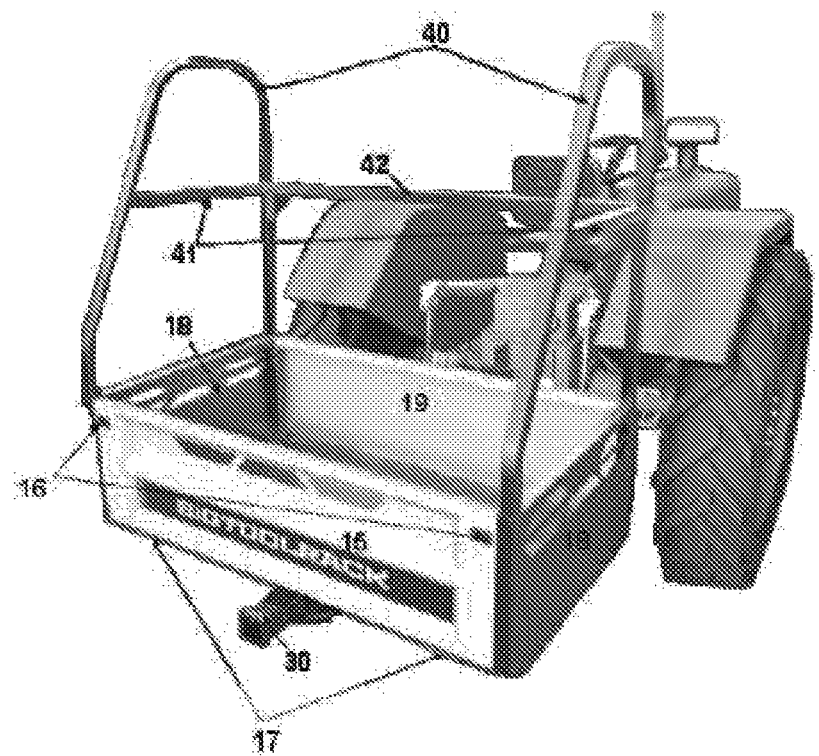
FIG. 18 depicts a perspective view of the embodiment of the device from FIG. 1, with a yellow core, engaged with a tractor.
Figure 19:
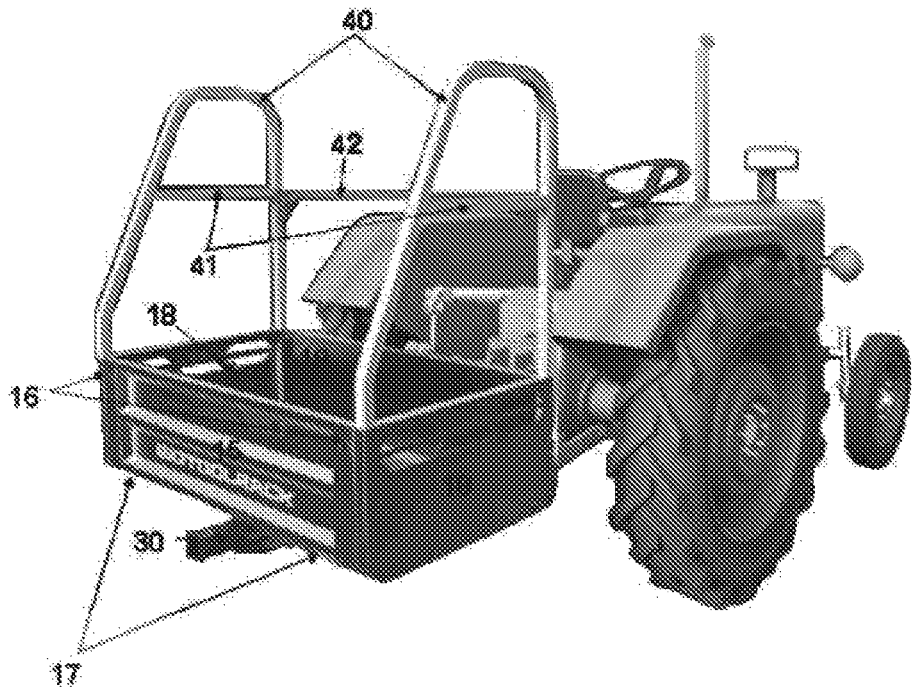
FIG. 19 depicts another perspective view of the embodiment of the device from FIG. 1, with a yellow frame bar, engaged with a tractor.
Figure 20:
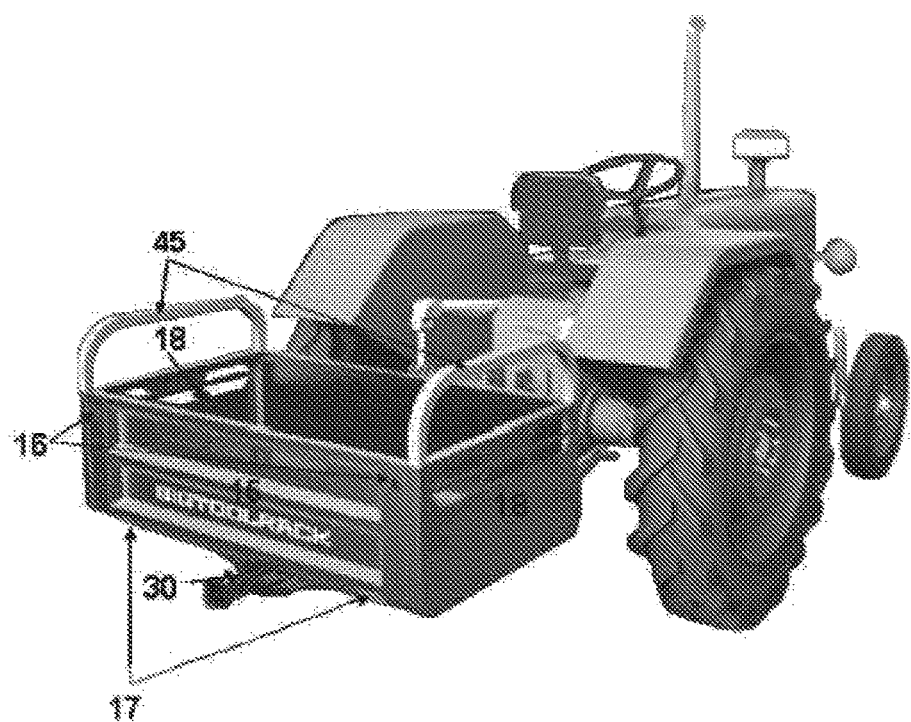
FIG. 20 depicts a perspective view of the alternate embodiment of the device from FIG. 15, with a short yellow frame bar, engaged with a tractor.

One advantage of rack assembly 10 is that it may be removed from a vehicle and used as a semi-stationary storage device (FIG. 14), or as a tool cart (FIG. 16). As shown in FIG. 17, rolling functionality is provided for by connecting one wheel mount plate 53 to each bed side 18. Each wheel mount plate 53 includes a pair of hollow leg sleeves 54 which releasably receive legs 52. Vertical displacement of rack assembly 10 can be changed by adjusting position of legs 52 within leg sleeves 54, then securing with pins (not shown) that pass through apertures 55. In this manner rack assembly 10 can be rolled on wheels 50 from one location to another. This functionality may be particularly helpful when engaging and disengaging rack assembly 10 and vehicle. By way of example, a user can roll fully loaded rack assembly 10 to the vicinity of a vehicle's hitch, connect the rack to the vehicle, remove wheel mount plate 53, and use the vehicle-mounted rack in the ordinary manner. When it is desirable to remove the rack from the vehicle the user can attach mount plates 53, and then roll the rack (fully loaded) to a desired location. In this manner a user adjusts leg lengths once, and then simply attaches the wheel mount plates (and connected legs) as desired.

In another embodiment, depicted in FIGS. 38-40, 47 and 48 there are four individual legs that are mounted. This embodiment is used in the manner described, except it is necessary to attach legs one at a time.

Another important structure of the present invention is the suitcase weight bracket accessory of FIGS. 255-266. This bracket holds suitcase weights (not shown) for counter weight. More specifically, FIGS. 255-266 depict a mounting bar that attaches to the 3 pt riser arm, and is used to hang counterweights.

It should be understood, of course, that the foregoing relates to exemplary embodiments of the invention and that modifications may be made without departing from the spirit and scope of the invention as set forth in the following claims. By way of example the rack assembly can be modified for other specific uses such as transporting cargo, tailgating, camping, and hunting. Add-ons can secure items such as hunting rifles, bows, bird cages, fishing gear, fishing poles and so forth. Also accessories such as work tables, table saw work surfaces, and chop saw work surfaces can be used with the rack assembly's 2 inch receiver. All ranges set forth herein include increments there between; "approximate" and the like mean+/−10%

What is claimed is:

1. A rack assembly including:
   A) A receptacle including two lateral sides, a back side, and a floor;
   B) A tail gate hingedly engaged with said floor;
   C) A horizontal top link connector engaged with said receptacle;
   D) A tow spine engaged at a proximal end with said horizontal top link connector, said tow spine supporting said floor;
   E) A trailer hitch engaged with a distal end of said tow spine, said trailer hitch positioned opposite of said horizontal top link connector; and
   F) A plurality of tow spine supports engaged with said floor and extending in pairs substantially perpendicularly from said tow spine.

2. The rack assembly of claim 1 wherein each of said tow spine support in a pair is oriented 180 degrees one from another.

3. The rack assembly of claim 1 wherein said plurality of tow spine supports consists of exactly three pairs of tow spine supports.

4. The rack assembly of claim 2 further comprising a plurality of lift arm connectors engaged with said floor and parallel to said tow spine.

5. The rack assembly of claim 4 wherein said tow spine supports connect said tow spine to said lift arm connectors.

6. The rack assembly of claim 1 wherein said horizontal top link connector is perpendicularly connected to a vertical top link connector, said vertical top link connector extending upwardly along said back side.

7. A modifiable rack system including:
   A) A receptacle including four vertical walls and a floor;
   B) A tow spine engaged with said floor;
   C) A plurality of tow spine supports perpendicularly intersecting said tow spine;
   D) A plurality of lift arm connectors perpendicularly intersecting said tow spine supports;
   E) A trailer hitch engaged with a distal end of said tow spine;
   F) A 3-point hitch assembly engaged with a proximal end of said tow spine; and
   G) A plurality of wheels engaged with said receptacle.

8. The modifiable rack system of claim 7 wherein at least one of said four vertical walls is a hinged tail gate.

9. The modifiable rack system of claim 8 wherein said hinged tail gate forms a continuous planar surface with said floor when said hinged tail gate is in the horizontal position.

10. The modifiable rack system of claim 7 wherein said trailer hitch includes a square receiver having an opening selected from the group consisting of 1.25 inches, 2 inches, and 2.5 inches.

11. The modifiable rack system of claim 7 wherein said plurality of wheels consists of exactly 4 wheels.

12. The modifiable rack system of claim 11 wherein said plurality of wheels are mounted on two wheel mount plates, each wheel mount plate engaging two wheels.

13. The modifiable rack system of claim 7 further comprising rail tubes releasably engaged with said receptacle.

14. The modifiable rack system of claim 13 further comprising at least one add-on selected from the group consisting of lumber bracket, ring tool bracket, side bin bracket, strap tool bracket, J hook bracket, chain saw holder and combinations thereof.

15. A method of transporting items including the steps of:
A) Engaging a vehicle with a modifiable rack system:
B) Placing items into a receptacle of said modifiable rack system, said receptacle including a floor, a tow spine engaged with said floor, a plurality of tow spine supports perpendicularly intersecting said tow spine, and a plurality of lift arm connectors perpendicularly intersecting said tow spine supports;
C) Driving said vehicle to a desired location;
D) Connecting wheels to said modifiable rack system;
E) Disengaging said modifiable rack system from said vehicle;
E) Rolling said modifiable rack system to a desired location; and
F) Engaging a trailer to a trailer hitch on said modifiable rack system wherein said trailer hitch is engaged with a distal end of said tow spine.

16. The method of claim 15 wherein said step of engaging a vehicle with a modifiable rack system includes the step of engaging a 3-point hitch assembly to said vehicle wherein said 3-point hitch assembly is engaged with a proximal end of said tow spine.

17. The method of claim 15 wherein said step of connecting wheels to said modifiable rack system includes the step of connecting two wheel mount plates, each of said wheel mount plates having exactly two wheels.

* * * * *